March 27, 1973 — E. RUDY — 3,723,104
REFRACTORY METAL ALLOY BONDED CARBIDES FOR CUTTING TOOL APPLICATIONS
Filed July 29, 1970 — 12 Sheets-Sheet 5

FIG.—5

INVENTOR.
ERWIN RUDY
BY
Finkelstein+Mueth
ATTORNEYS

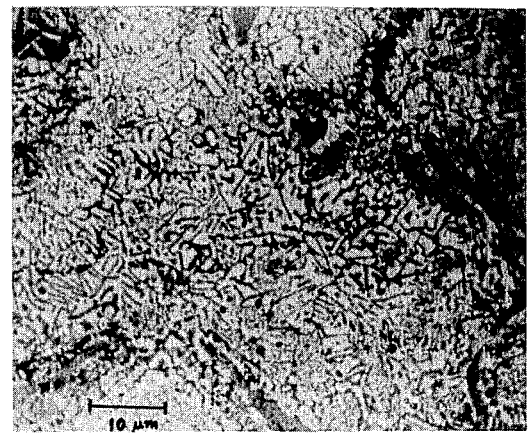
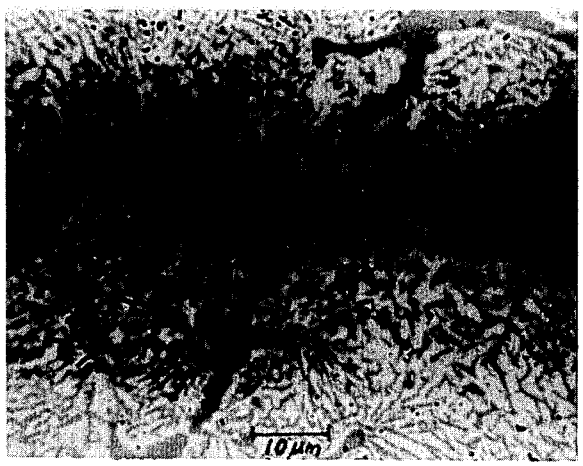
FIG.-12

3,723,104 
REFRACTORY METAL ALLOY BONDED CARBIDES FOR CUTTING TOOL APPLICATIONS
Erwin Rudy, Beaverton, Oreg., assignor to Aerojet-General Corporation, El Monte, Calif.
Filed July 29, 1970, Ser. No. 59,063
Int. Cl. C22c 29/00
U.S. Cl. 75—134 M
44 Claims

ABSTRACT OF THE DISCLOSURE

This patent describes a refractory metal bonded carbide alloy for use in cutting tools and in other applications where high hardness and abrasion resistance are required. The desired fine-grained composite structure is obtained preferably by metal phase precipitation of metal alloys within the carbide grains, of previously prepared certain ternary or higher alloys of refractory transition metals with carbon. Consolidation of the composites can be accomplished by melting and casting or powder metallurgy techniques.

BACKGROUND OF THE INVENTION

Figure 1:
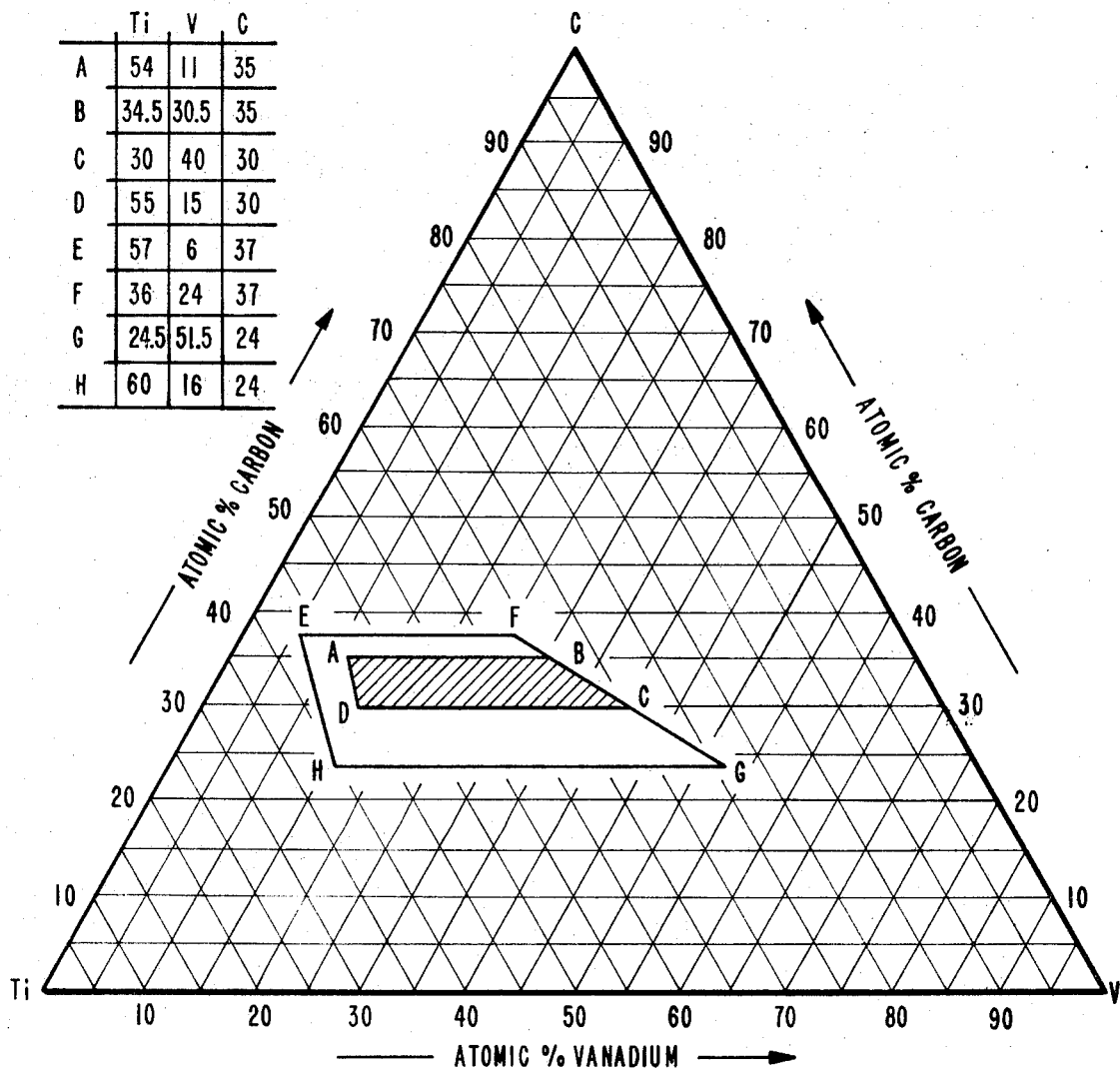

Modern carbide cutting tools generally consist of a mechanically pulverized, hard carbide phase dispersed in a matrix or binder of an iron group metal, usually cobalt or nickel. The binder phase contributes toughness to the composite and also serves as an aid in sintering the carbide particles. The loss of strength of iron group metal-based binder phases at relatively low temperatures can cause thermal wear to become the dominant wear mechanism at high cutting speeds and on worn tools, and the low melting temperatures of these binder phases also precludes their use as abrasion resistant composites at temperatures above 800° C. to 1000° C. Binderless cast carbides such as tungsten carbide eutectics played a role in the initial development of carbide-based tools and die materials but became obsolete with the advent of the tougher cobalt bonded carbides fabricated by powder metallurgical techniques. Despite the attractive features of refractory metal bonded cutting tools, lack of pertinent phase equilibria data precluded the possibility of randomly selecting compatible carbide-refractory metal alloy combinations. Such combinations were not developed until my recent development of Group IVa, tungsten and carbon ternary alloys described in my co-pending application Ser. No. 802,625, filed Feb. 26, 1969, the disclosure of which is expressly incorporated herein by reference. The present invention provides still a further development in this art, and involves new Group IVa (Ti, Zr, Hf), Group Va (V, Nb, Ta), and carbon; Group IVa, Group VIa (Mo, W), and carbon; Group Va, Group VIa, and carbon, ternary alloys.

SUMMARY OF THE INVENTION

Briefly, the present invention comprises a refractory metal bonded carbide alloy for use in cutting tools and in other applications where high hardness and abrasion resistance are required. The desired fine-grain microstructure is obtained preferably by melting or casting ternary alloys of a Group IVa metal, Group Va metal and carbon; Group IVa metal, Group VIa metal and carbon; or Group Va metal, Group VIa metal and carbon. The invention further comprises a process of machining an object, said process comprising engaging the object with a carbide cutting tool having a fine-grain microstructure composed of a Group IVa-Group Va-carbon; Group IVa-Group VIa-carbon; or Group Va-Group VIa-carbon base alloy, and characterized by a carbide phase and a refractory metal phase formed through solidification and solid state precipitation reactions of said complex carbide alloy.

The invention also comprehends a method of forming an improved carbide-refractory metal alloy bonded composite comprising preparing a melt of a base alloy composition of a Group VIa metal, Group Va metal and carbon; Group IVa metal, Group VIa metal and carbon; or a Group Va-Group VIa-carbon and rapidly cooling said melt to form a carbide composite having a fine-grained, microstructure characterized by a carbide phase and a metal phase. The desired fine grained microstructure in melted alloys is achieved in part by permitting a compatible refractory metal alloy to precipitate out within the carbide grains; the matrix in which the carbide grains are embedded comprises a fine-grained, lamellar eutectic of metal and monocarbide phase. In the utilization of the precipitation phenomenon, it will be appreciated that the desired fine grained microstructure within the carbide grains may also be obtained by powder metallurgical techniques involving specific heat treatments to induce precipitation.

It is an object of the present invention to provide a novel group of ternary carbide alloys particularly suitable for cutting tool applications.

Still another object of the present invention is the provision of novel ternary alloy compositions which are easily processed and formed by powder metallurgy-sintering processes to form cutting tools.

These and other objects and advantages of this invention will be apparent from the more detailed description which follows.

DESCRIPTION OF THE PREFERRED EMBODIMENTS

The carbide composite cutting tool of this invention has a complex composition of refractory metals and carbon with the base composition originating from one of the ternaries: Ti—V—C, Ti—Nb—C, Zr—Nb—C, Hf—Nb—C, Ti—Ta—C, Zr—Ta—C, Hf—Ta—C, Nb—Mo—C, Nb—W—C, Ti—W—C, and Ti—Mo—C. Each composition may be alloyed with the elements Ti, Zr, Hf, V, Nb, Ta, Mo or W (when not included in the base alloy) and Cr, either singly or in combination.

While not bound by any theory, it is believed that the principle by which these compositions achieve the properties required for a cutting tool is the formation of a microstructure of finely dispersed phases of carbide and refractory metal alloy. The desired microstructure can be achieved by melting or casting; by pressing, sintering and heat treatment; or by a combination of the two fabrication methods. The microstructure consists of carbide grains in a metal alloy or in a metal alloy/carbide eutectic matrix. In addition, precipitation of metal within the carbide grains may occur and have a beneficial effect by reducing the effective grain size of the carbide.

Uses of the alloys of the invention are many, including hard facings for plows, bulldozer blades, bearings, and for penetrator cores for armorpiercing projectiles. Application of hard facings to various shaped objects by plasma melting and spraying of the powdered alloys of the invention, has been proven feasible. The plasma-arc spraying technique further holds promise for preparing extremely rapidly chilled, and thus very-fine-grained, alloying powders, which then can be consolidated into shapes by powder-metallurgical techniques.

It is important in whatever manner of fabrication that is employed that the molten material be rapidly cooled in order to assure the formation of the fine-grained lamellar matrix structure of the invention. Precipitation of metal in the carbide grains can be induced by subsequent heat treatment of the alloys.

Dense bodies can also be prepared from powdered material by hot pressing and also by cold pressing and sintering, preferably with additions of sintering aids. The starting powders can be the carbides and metals mixed in the desired quantities, but, preferably, the powders should be pre-alloyed materials prepared by comminution of melted and rapidly cooled alloys.

The base alloy compositions which provide the desired microstructure are designated in FIGS. 1 through 11, the respective ternary composition diagrams. The small blocked areas designate the preferred compositions and the larger areas acceptable combinations. The quantities of permissible alloying elements are as follows:

(1) Ti, Zr and Hf may be substituted for each other in all proportions. Ti, Zr and Hf may be substituted for niobium in the base compositions Nb-W-C and Nb-Mo-C, either singly or in combination, in concentrations up to 20 atomic percent.

(2) W and Mo may be substituted for each other in all proportions. W and Mo may be substituted for vanadium, niobium, and tantalum in the base composition not containing either in amounts up to 10 atomic percent.

(2) Ta and Nb may be substituted for each other in all possible combinations. V, Ta and Nb may be substituted for molybdenum and tungsten in those basic compositions not including either in quantities up to 25 atomic percent.

(4) Cr may be substituted for the metals in quantities up to 5 atomic percent.

Certain elements such as Re, Pt, and the rare earths, can be added in quantities up to 10 atomic percent to the base composition without changing structure and basic properties of the tool materials, while other elements such as Fe, Ni, and Co can be added in quantities up to 5 atomic percent. In summary, up to about 10 atomic percent of elements not identified as the base elements or alloy elements (Ti, Zr, Hf, V, Nb, W, Cr, Mo and W) can be used without departing from the scope of this invention. This invention in effect includes all compositions where the base elements and alloy elements previously identified comprise 90 atomic percent of the total composition. The other 10 atomic percent can be considered inert.

The drawings, FIGS. 1–12, are hereinafter described.

The following examples are presented solely to illustrate the invention.

EXAMPLE I

The composition (Hf-Ta-C) base, alloyed with W and Ti in the percentages (atomic) 10Ti-33Hf-16Ta-6W-35C was fabricated in the following manner. The starting materials (TaC, HfC, Ti, W and C) in powder form, were mixed to provide the desired composition and charged into the crucible of an electric-arc furnace. Under helium at reduced pressure, the powders were arc melted, then cooled rapidly and subsequently heat treated to provide the desired fine-grained eutectic and precipitation structure. The micrographs shown in FIG. 12 are typical of the desired structures, showing divorced metal-carbide eutectic (dark) surrounding the carbide grains and metal alloy precipitates within the carbide grains.

EXAMPLE II

The cast alloy of the example above was machine-ground to the desired configuration for a carbide cutting tool and utilized in tests to establish the rate of metal removal in a conventional machining operation. The test consisted of machining a Type 347 stainless steel bar by lathe turning. The cutting conditions were 0.050" cutting depth, a feed rate of 0.010" per revolution and a cutting speed of 400 surface feet/minute. The tool was utilized until the wear depth was 0.014", and the time to reach this wear depth was recorded at 43 minutes.

The ternary composition diagrams of FIGS. 1–11 depict suitable base alloy compositions for producing composites according to this invention. In FIG. 1, which is concerned with titanium-vanadium-carbon alloys, the preferred compositions fall within the inner hatched area E, F, G, H. The larger area A, B, C, D includes compositions of generally less suitable compositions but which are acceptable for some applications. Similarly, the ternary composition digrams of FIGS. 2–11, inclusive, can be summarized as follows:

TABLE I

| Fig. No. | Ternary base alloy | Preferred composition | General composition |
|---|---|---|---|
| 2 | Titanium-niobium-carbon | I, J, K, L | M, N, O, P |
| 3 | Zirconium-niobium-carbon | Q, R, S, T | U, V, W, X |
| 4 | Hafnium-niobium-carbon | A', B', C', D' | E', F', G', H' |
| 5 | Titanium-tantalum-carbon | I', J', K', L' | M', N', O', P' |
| 6 | Zirconium-tantalum-carbon | Q', R', S', T' | U', V', W', X' |
| 7 | Hafnium-tantalum-carbon | A'', B'', C'', D'' | E'', F'', G'', H'' |
| 8 | Niobium-molybdenum-carbon | I'', J'', K'', L'' | M'', N'', O'', P'' |
| 9 | Niobium-tungsten-carbon | Q'', R'', S'', T'' | U'', V'', W'', X'' |
| 10 | Titanium-tungsten-carbon | A''', B''', C''', D''' | E''', F''', G''', H''' |
| 11 | Titanium-molybdenum-carbon | I''', J''', K''', L''' | M''', N''', O''', P''' |

With reference to FIG. 1, the points within the triangular diagram indicate the following compositions in atomic percentages:

|  | Titanium | Vanadium | Carbon |
|---|---|---|---|
| A | 54 | 11 | 35 |
| B | 34.5 | 30.5 | 35 |
| C | 30 | 40 | 30 |
| D | 55 | 15 | 30 |
| E | 57 | 6 | 37 |
| F | 36 | 24 | 37 |
| G | 24.5 | 51.5 | 24 |
| H | 60 | 16 | 24 |

Figure 2:
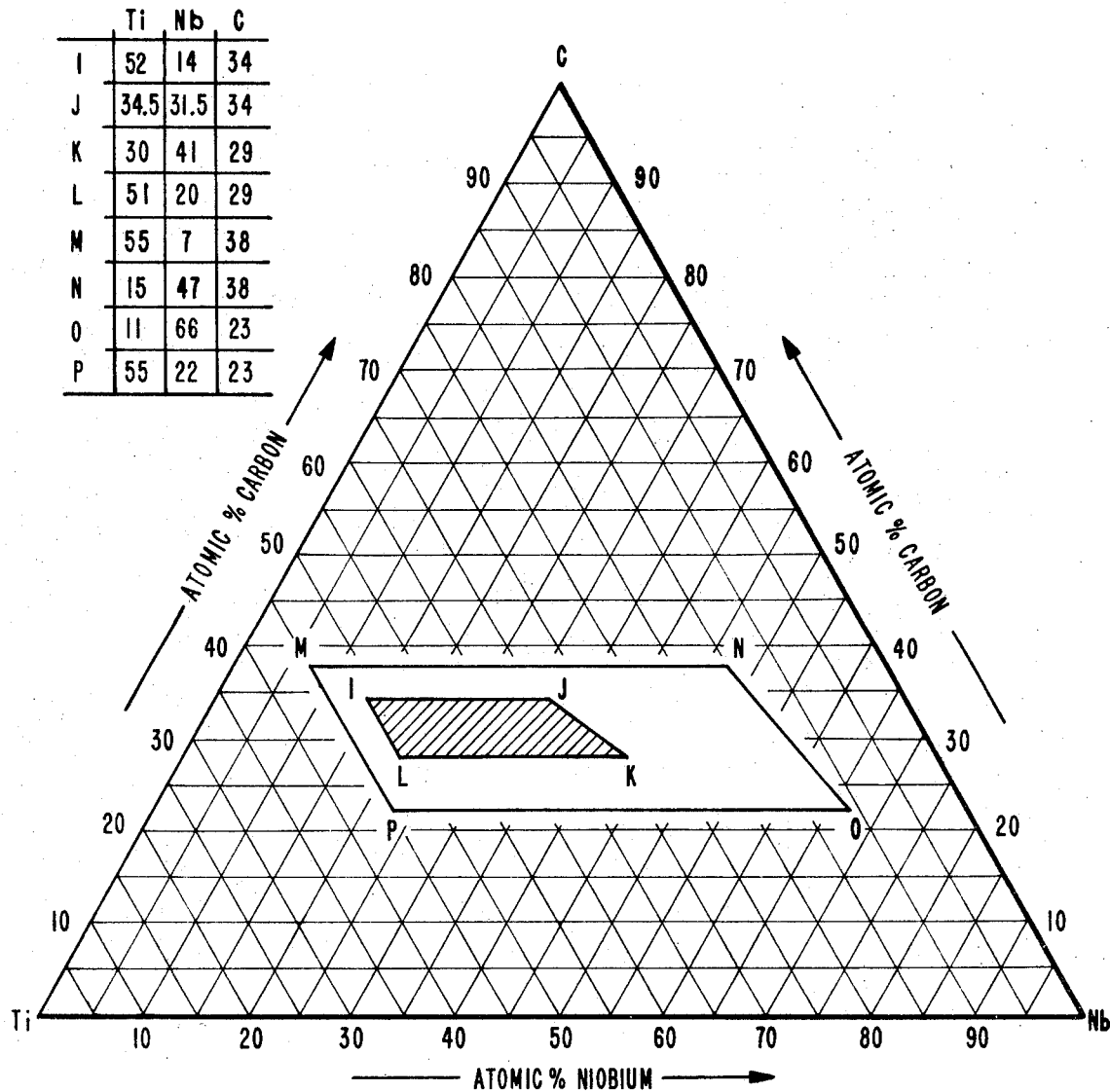

With reference to FIG. 2, the points within the triangular diagram indicate the following compositions in atomic percentages:

|  | Titanium | Niobium | Carbon |
|---|---|---|---|
| I | 52 | 14 | 34 |
| J | 34.5 | 31.5 | 34 |
| K | 30 | 41 | 29 |
| L | 51 | 20 | 29 |
| M | 55 | 7 | 38 |
| N | 15 | 47 | 38 |
| O | 11 | 66 | 23 |
| P | 55 | 22 | 23 |

Figure 3:
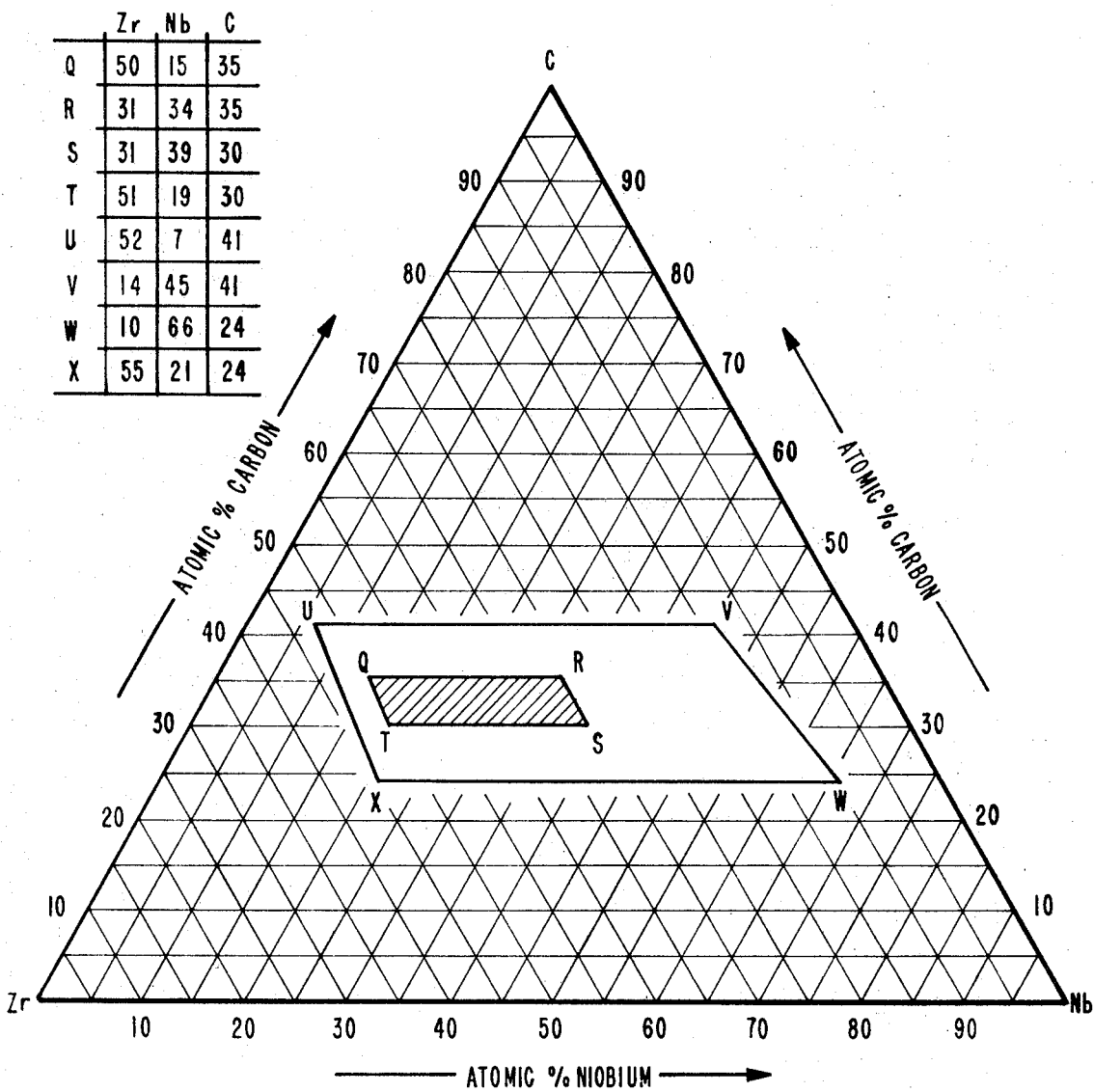

With reference to FIG. 3, the points within the triangular diagram indicate the following compositions in atomic percentages:

|  | Zirconium | Niobium | Carbon |
|---|---|---|---|
| Q | 50 | 15 | 35 |
| R | 31 | 34 | 35 |
| S | 31 | 39 | 30 |
| T | 51 | 19 | 30 |
| U | 52 | 7 | 41 |
| V | 14 | 45 | 41 |
| W | 10 | 66 | 24 |
| X | 55 | 21 | 24 |

Figure 4:
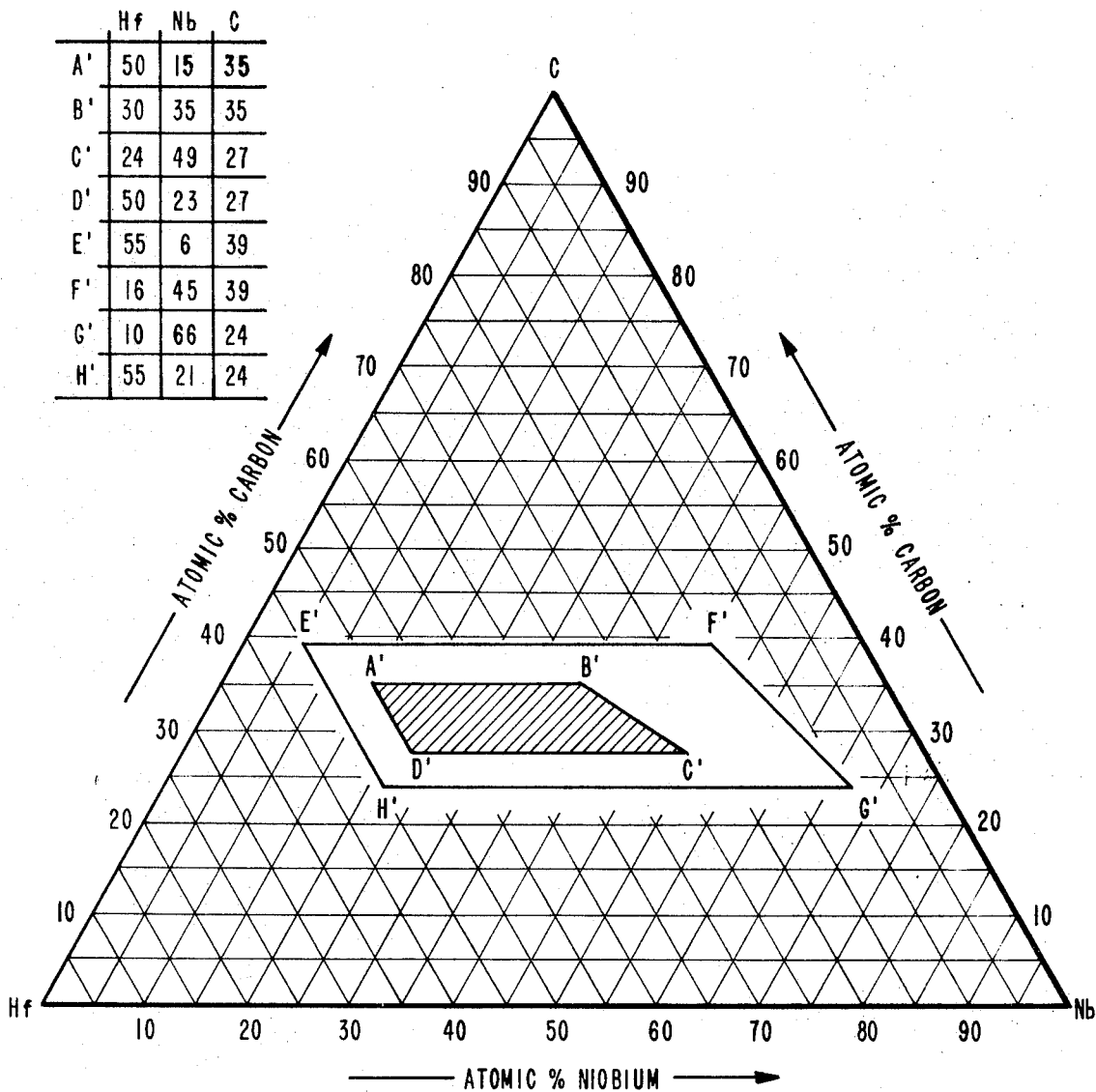

With reference to FIG. 4, the points within the triangular diagram indicate the following compositions in atomic percentages:

|  | Hafnium | Niobium | Carbon |
|---|---|---|---|
| A' | 50 | 15 | 35 |
| B' | 30 | 35 | 35 |
| C' | 24 | 49 | 27 |
| D' | 50 | 23 | 27 |
| E' | 55 | 6 | 39 |
| F' | 16 | 45 | 39 |
| G' | 10 | 66 | 24 |
| H' | 55 | 21 | 24 |

Figure 5:
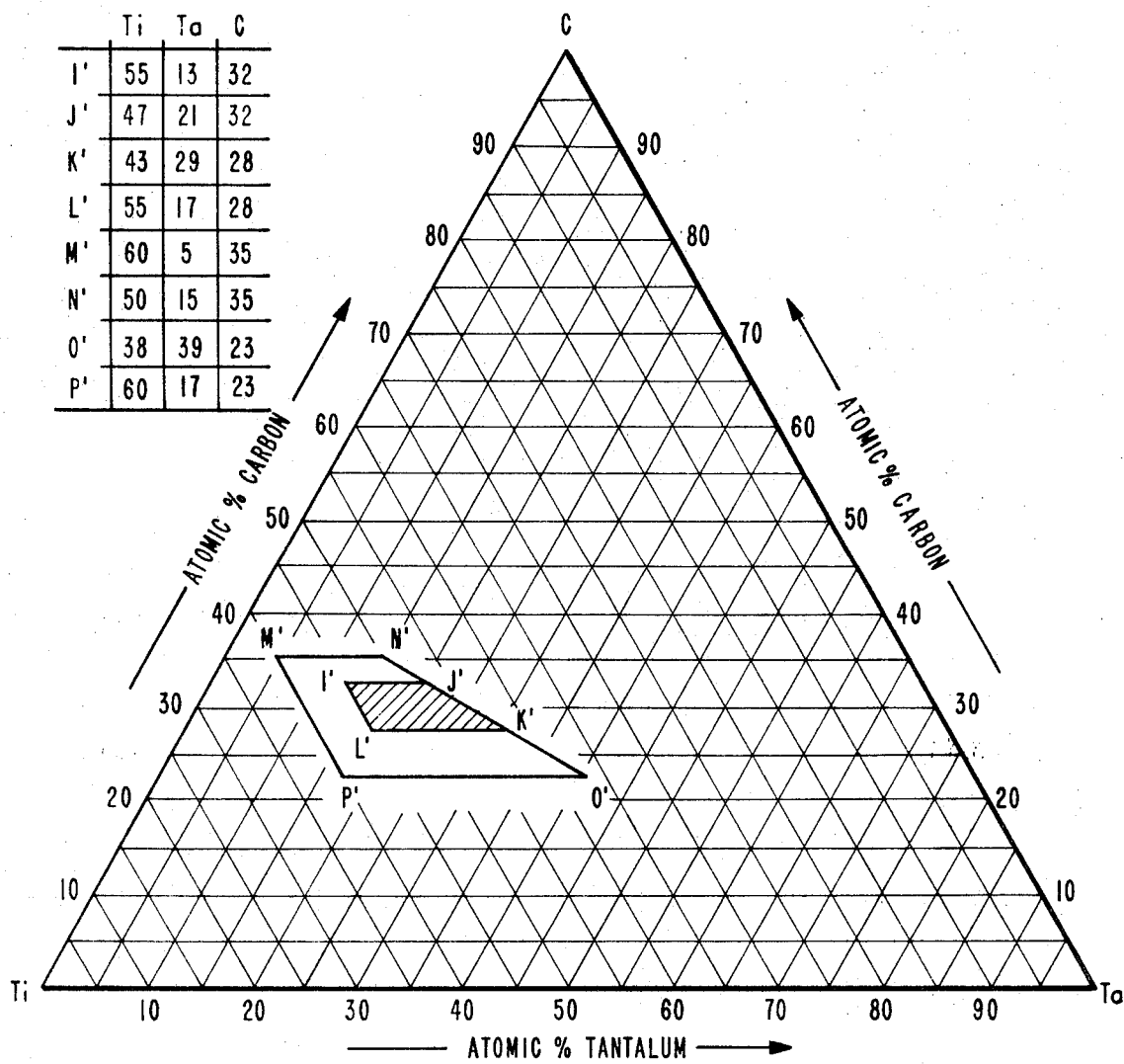

With reference to FIG. 5, the points within the triangular diagram indicate the following compositions in atomic percentages:

|    | Titanium | Tantalum | Carbon |
|----|----------|----------|--------|
| I' | 55 | 13 | 32 |
| J' | 47 | 21 | 32 |
| K' | 43 | 29 | 28 |
| L' | 55 | 17 | 28 |
| M' | 60 | 5 | 35 |
| N' | 50 | 15 | 35 |
| O' | 38 | 39 | 23 |
| P' | 60 | 17 | 23 |

Figure 6:
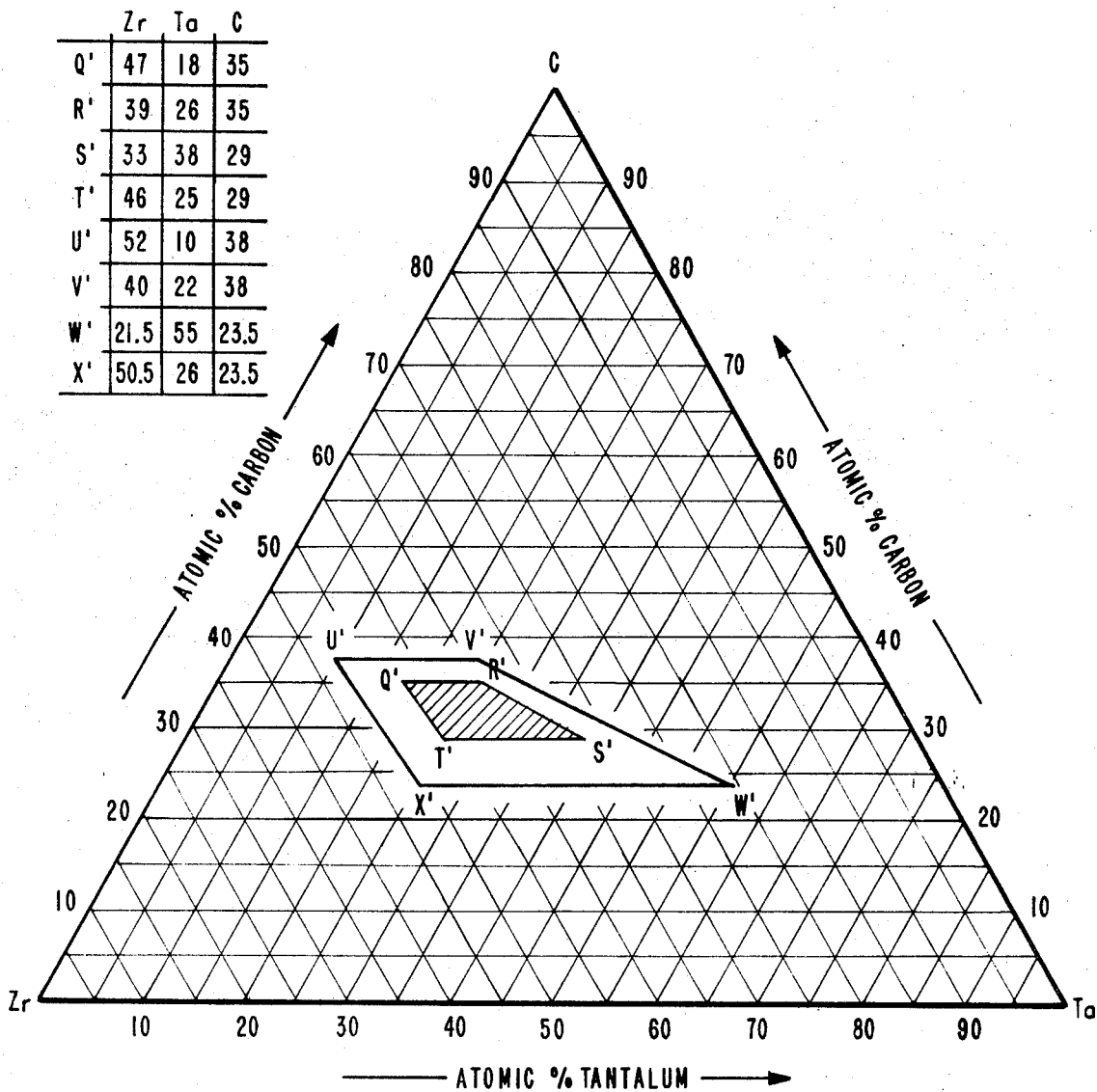

With reference to FIG. 6, the points within the triangular diagram indicate the following compositions in atomic percentages:

|    | Zirconium | Tantalum | Carbon |
|----|-----------|----------|--------|
| Q' | 47 | 18 | 35 |
| R' | 39 | 26 | 35 |
| S' | 33 | 38 | 29 |
| T' | 46 | 25 | 29 |
| U' | 52 | 10 | 38 |
| V' | 40 | 22 | 38 |
| W' | 21.5 | 55 | 23.5 |
| X' | 50.5 | 26 | 23.5 |

Figure 7:
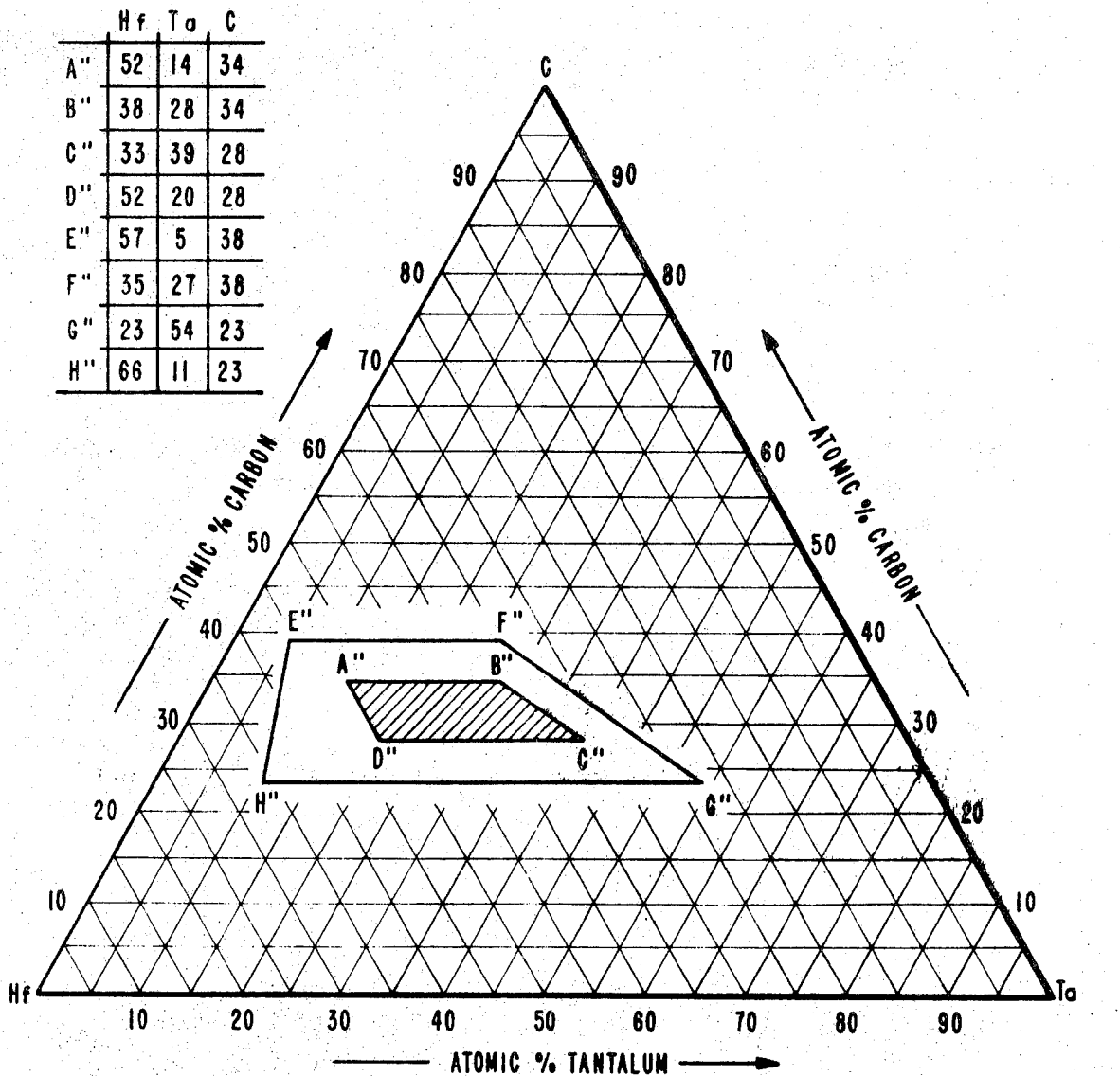

With reference to FIG. 7, the points within the triangular diagram indicate the following compositions in atomic percentages:

|    | Hafnium | Tantalum | Carbon |
|----|---------|----------|--------|
| A'' | 52 | 14 | 34 |
| B'' | 38 | 28 | 34 |
| C'' | 33 | 39 | 28 |
| D'' | 52 | 20 | 28 |
| E'' | 57 | 5 | 38 |
| F'' | 35 | 27 | 38 |
| G'' | 23 | 54 | 23 |
| H'' | 66 | 11 | 23 |

Figure 8:
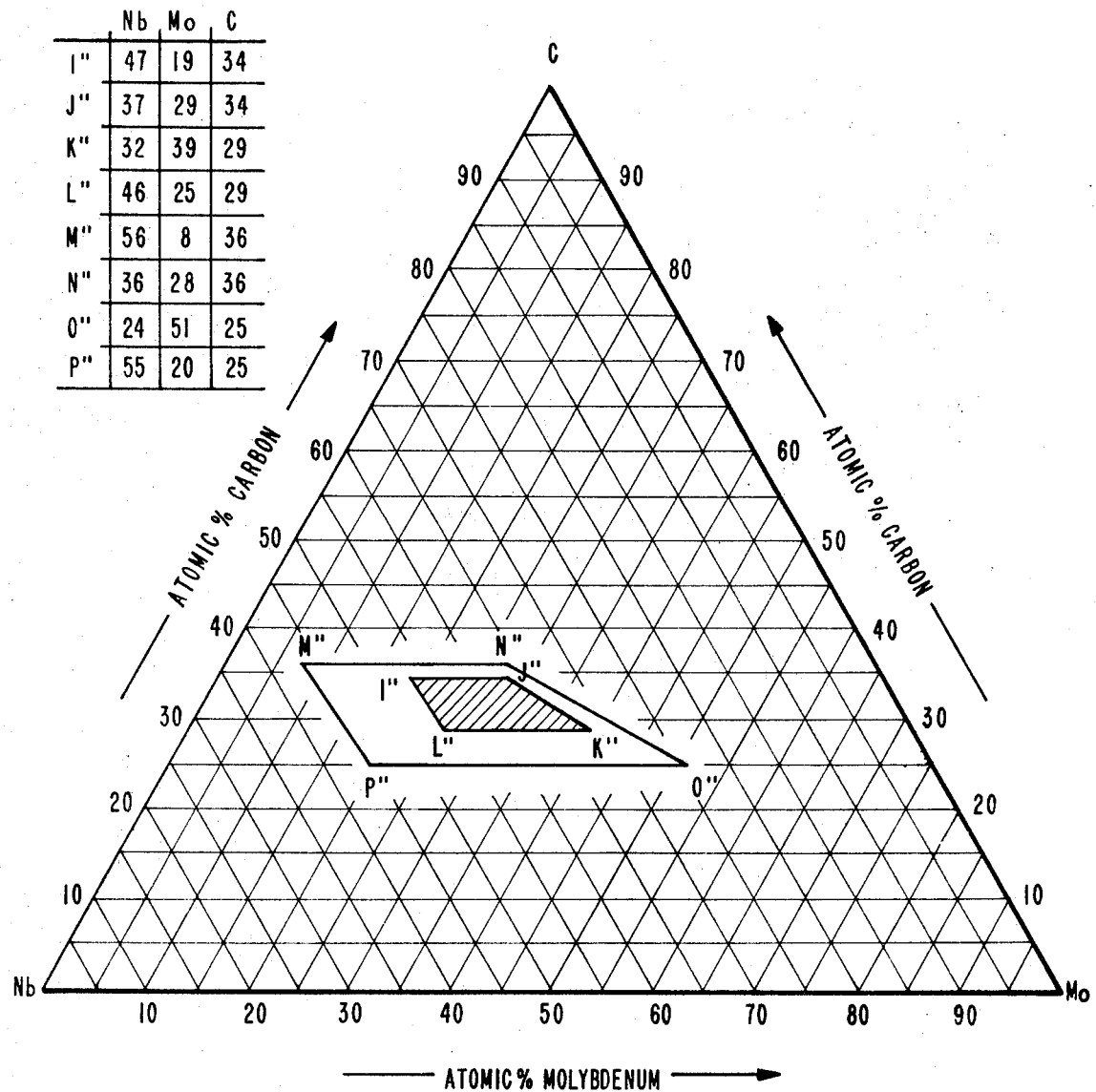

With reference to FIG. 8, the points within the triangular diagram indicate the following compositions in atomic percentages:

|    | Niobium | Molybdenum | Carbon |
|----|---------|------------|--------|
| I'' | 47 | 19 | 34 |
| J'' | 37 | 29 | 34 |
| K'' | 32 | 39 | 29 |
| L'' | 46 | 25 | 29 |
| M'' | 56 | 8 | 36 |
| N'' | 36 | 28 | 36 |
| O'' | 24 | 51 | 25 |
| P'' | 55 | 20 | 25 |

Figure 9:
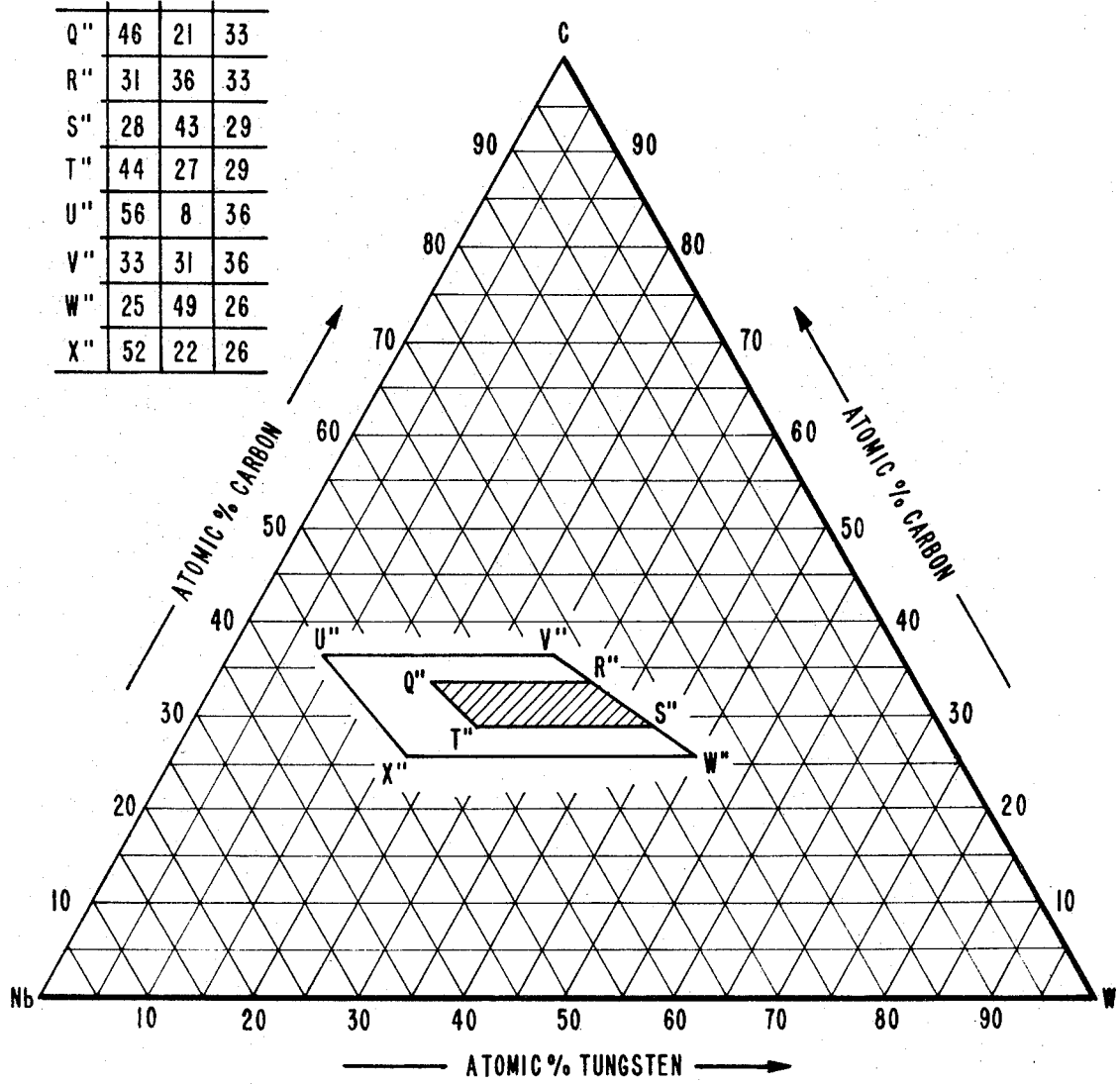

With reference to FIG. 9, the points within the triangular diagram indicate the following compositions in atomic percentages:

|    | Niobium | Tungsten | Carbon |
|----|---------|----------|--------|
| Q'' | 46 | 21 | 33 |
| R'' | 31 | 36 | 33 |
| S'' | 28 | 43 | 29 |
| T'' | 44 | 27 | 29 |
| U'' | 56 | 8 | 36 |
| V'' | 33 | 31 | 36 |
| W'' | 25 | 49 | 26 |
| X'' | 52 | 22 | 26 |

Figure 10:
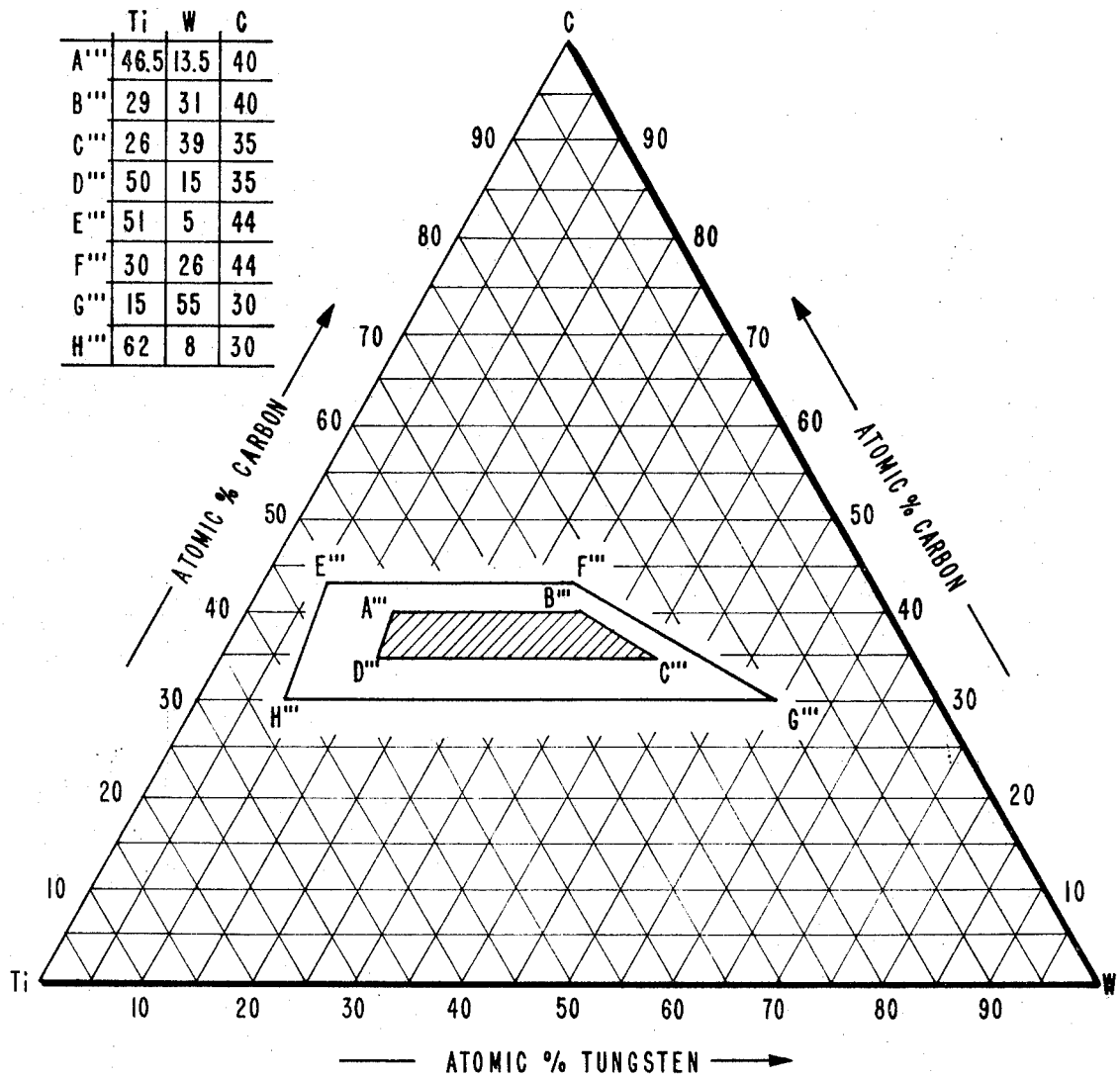

With reference to FIG. 10, the points within the triangular diagram indicate the following compositions in atomic percentages:

|    | Titanium | Tungsten | Carbon |
|----|----------|----------|--------|
| A''' | 46.5 | 13.5 | 40 |
| B''' | 29 | 31 | 40 |
| C''' | 26 | 39 | 35 |
| D''' | 50 | 15 | 35 |
| E''' | 51 | 5 | 44 |
| F''' | 30 | 26 | 44 |
| G''' | 15 | 55 | 30 |
| H''' | 62 | 8 | 30 |

Figure 11:
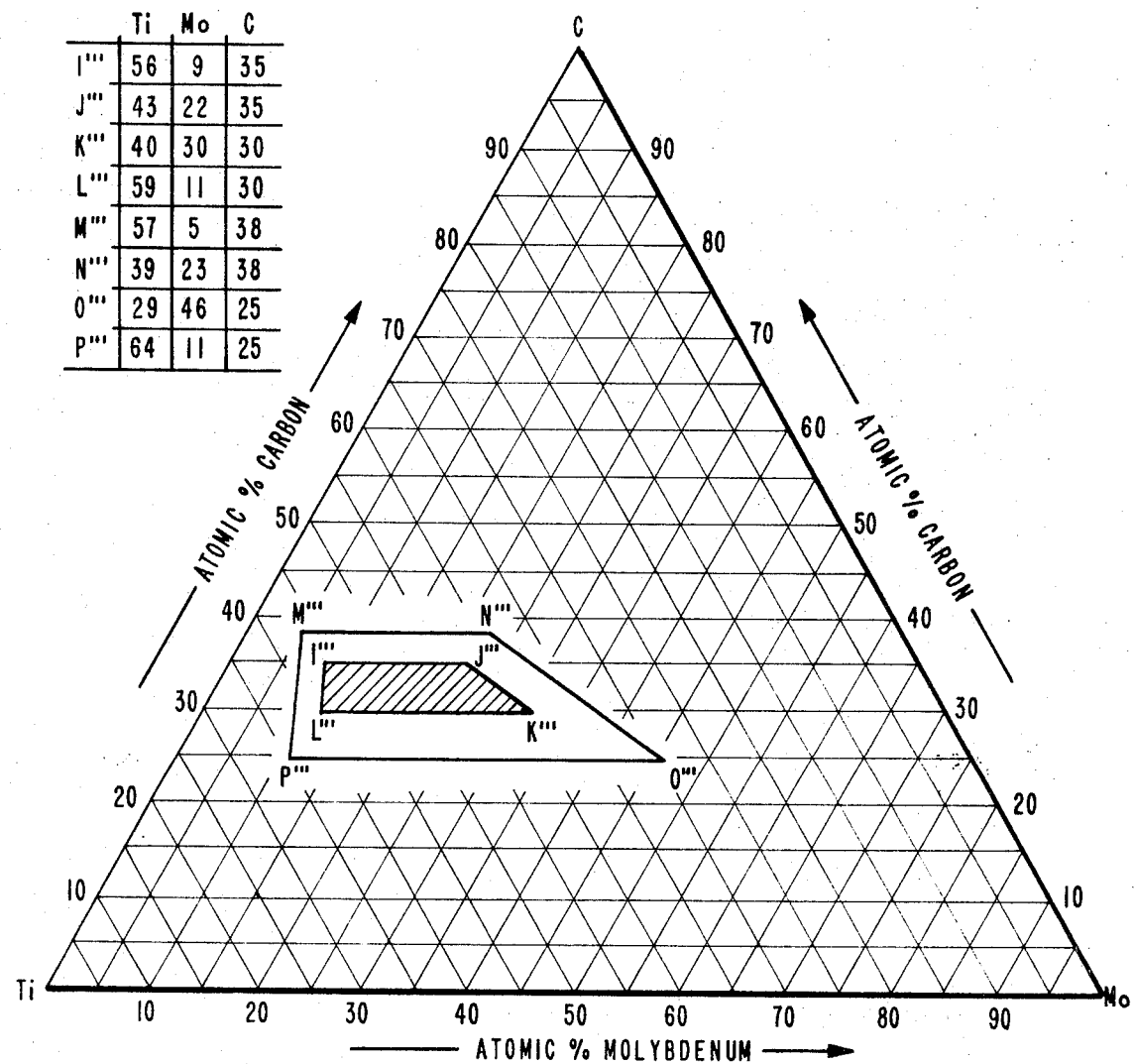

With reference to FIG. 11, the points within the triangular diagram indicate the following compositions in atomic percentages:

|    | Titanium | Molybdenum | Carbon |
|----|----------|------------|--------|
| I''' | 56 | 9 | 35 |
| J''' | 43 | 22 | 35 |
| K''' | 40 | 30 | 30 |
| L''' | 59 | 11 | 30 |
| M''' | 57 | 5 | 38 |
| N''' | 39 | 23 | 38 |
| O''' | 29 | 46 | 25 |
| P''' | 64 | 11 | 25 |

The majority of tests has been carried out in studying the performance of the alloys as cutting tools in straight turning of cylindrical test bars on a LeBlonde machineability lathe. For these tests, the carbide alloys were either machined into inserts suitable for clamping in standard tool holders, or more or less irregular shaped bits were brazed onto steel tool holders and then ground on a K.O. Lee diamond grinder to the desired geometry. The test material consisted of annealed 347 stainless steel in the form of 3 inch diameter x 18 inch long cylindrical bars. The surface was removed to a depth of .050 inch prior to testing the experimental alloys. In the standard test, the steel was cut at 400 surface feet per minute (s.f.m.), using a depth of cut of 50 mils and a feed of 10 mils per revolution. The tool geometry for the standard test was as follows: back rake, 0°; side rake, 5°; side relief, 5°; end relief, 5°; side clearance end angle, 25°.

Table 2 lists other specific compositions which have been fabricated and tested in similar manner to the tool of the above example. Included for reference in the table is the comparative cutting life of a conventional cutting tool representative of those currently in use.

TABLE 2.—CUTTING TOOL COMPOSITIONS AND CUTTING TEST RESULTS

| Composition (atomic percent) | | | | | | | | | Tool life | |
|---|---|---|---|---|---|---|---|---|---|---|
| Ti | Zr | Hf | V | Nb | Ta | Mo | W | C | Other | Min. | Wear, in.[1] |
| 45 |   |   | 20 |   |   |   |   | 35 |   | 2.5 | .008 |
| 39 |   |   | 16 |   |   |   | 10 | 35 |   | N.T. |   |
| 45 |   |   | 12 | 6 |   |   | 6 | 31 |   | 40 | .008 |
| 42 |   |   | 17 |   |   |   | 6 | 35 |   | N.T. |   |
|    | 32 |   | 26 |   |   |   | 6 | 36 |   | N.T. |   |
| 11 |   |   | 12 | 36 |   |   | 6 | 35 |   | N.T. |   |
| 46 |   |   |   | 5 | 12 |   | 6 | 31 |   | 65 |   |
| 47.5 |   | 2.5 | 2 |   |   | 12 |   | 6 | 30 |   | N.T. |   |
| 47.5 | 2.5 |   | 2 |   |   | 12 |   | 6 | 30 |   | N.T. |   |
| 45 |   |   |   |   | 15 |   | 6 | 30 |   | 28 | .011 |
| 15 |   |   | 15 |   | 25 |   | 10 | 35 |   | 6 | .014 |
| 10 |   | 33 |   |   | 16 |   | 6 | 33 |   | 43 | .014 |
|    |   | 45 |   |   | 20 |   |   | 35 |   | 2 6 | .003 |
|    |   | 45 |   |   | 20 |   | 5 | 30 |   | 16 |   |
|    |   | 45 |   |   | 16 |   | 6 | 33 |   | 8 | .007 |
| 50 |   |   |   |   | 20 |   |   | 30 |   | N.T. |   |
| 45 |   |   |   |   |   |   | 20 | 35 | 1.5 Ni[3] | 6 | .014 |
| 45 |   |   |   |   | 5 |   | 15 | 35 |   | 13.5 | .012 |
| 25 |   |   |   |   | 17 |   | 28 | 30 |   | 4.5 |   |
| Commercial C50 carbide | | | | | | | | | | 40 |   |
| Commercial C2 carbide | | | | | | | | | | 4 |   |

[1] Standard tests on 347 stainless steel at 400 surface feet/min., .050" depth of cut .010"/revolution feed and .016" wear land (standard tool life) except as noted.
[2] Run at 750 s.f.m.
[3] Added to base composition.

N.T.=Not Tested.

Having fully described the invention, it is intended that it be limited only by the lawful scope of the appended claims.

I claim:
1. A carbide-metal composition of the elemental formula Ti—V$_m$—(Q)$_n$—C wherein
titanium is present from about 24.5 At. percent to about 60 At. percent and
vanadium is present from about 6 At. percent to about 51.5 At. percent carbon is present from about 24 At. percent to about 37 At. percent and $n$ is 1 or 0, $m$ is 1 or 0, $m+n$ is either 1 or 2, and either V or Q or both V and Q are present and Q is one element selected from the group consisting of Nb, Ta, Mo, and W, said Q element, when present, being substituted at least in part for vanadium in said composition;

whereby said composition falls, when unsubstituted, and $n=0$ and $m=1$ within the boxed-in area bounded by the compositional limits of $Ti_{57}V_6C_{37}$, $Ti_{36}V_{24}C_{37}$, $Ti_{24.5}V_{51.5}C_{24}$ and $Ti_{60}V_{16}C_{24}$ in a planar, ternary compositional diagram where the subscripts of the said compositional limits and said diagram are set forth in atomic percentages; and when $n$ is 1 and $m$ is 1 or 0, and Q is present as a substituent selected from among Nb, Ta, Mo and W, it replaces vanadium as follows:

wherein from 0 up to 10 At. percent of vanadium, but never more than the vanadium content of said composition is replaced by a Q substituent member selected from the group consisting of tungsten and molybdenum;

from 0 up to the maximum amount of vanadium present in said composition is replaced by a Q substituent member selected from the group consisting of niobium and tantalum;

to form substituted carbide-metal compositions from unsubstituted compositions, which unsubstituted compositions' titanium content varies from about 11 to about 64 At. percent, whose carbon content varies from about 23 to about 44 At. percent, and whose vanadium content varies from about 5 At. percent to about 66 At. percent, the replacement of vanadium by any of the said substituent members tungsten, molybdenum, niobium, and tantalum, never exceeding the total amount of vanadium present in said carbide metal composition;

and wherein when said composition has at least part of its vanadium content replaced, the substituted composition lies within the compositional volume generated by the three dimensional joining of all the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when the said substituent, Q, is Nb, the compositional limits $Ti_{55}Nb_7C_{38}$, $Ti_{15}Nb_{47}C_{38}$, $Ti_{11}Nb_{66}C_{23}$ and $Ti_{55}Nb_{22}C_{23}$ for the ternary figure of the Ti—Nb—C system, and $Ti_{57}V_6C_{37}$, $Ti_{36}V_{24}C_{37}$, $Ti_{24.5}V_{51.5}C_{24}$ and $Ti_{60}V_{16}C_{24}$ for the ternary figure of the Ti—V—C system describe the three dimensional volume;

when Q is Ta, the compositional limits $Ti_{60}Ta_5C_{35}$, $Ti_{50}Ta_{15}C_{35}$, $Ti_{38}Ta_{39}C_{23}$ and $Ti_{60}Ta_{17}C_{23}$ for the ternary figure for the Ti—Ta—C system and $Ti_{57}V_6C_{37}$, $Ti_{36}V_{24}C_{37}$, $Ti_{24.5}V_{51.5}C_{24}$ and $Ti_{60}V_{16}C_{24}$ for the ternary figure of the Ti—V—C system describe the three dimensional volume;

when Q is Mo, the compositional limits $Ti_{57}Mo_5C_{38}$, $Ti_{39}Mo_{23}C_{38}$, $Ti_{29}Mo_{46}C_{25}$ and $Ti_{64}Mo_{11}C_{25}$ for the ternary figure of the Ti—Mo—C system and $Ti_{57}V_6C_{37}$, $Ti_{36}V_{24}C_{37}$, $Ti_{24.5}V_{51.5}C_{24}$ and $Ti_{60}V_{16}C_{24}$ for the terminal figure of the Ti—V—C system describe the three dimensional volume;

when Q is W, the compositional limits $Ti_{62}W_8C_{30}$, $Ti_{51}W_5C_{44}$, $Ti_{30}W_{26}C_{44}$ and $Ti_{15}W_{55}C_{30}$ for the ternary figure of the Ti—W—C system and $Ti_{57}V_6C_{37}$, $Ti_{36}V_{24}C_{37}$, $Ti_{24.5}V_{51.5}C_{24}$ and $Ti_{60}V_{16}C_{24}$ for the ternary figure of the Ti—V—C system describe the three dimensional volume;

the total of the atomic percentages of titanium, vanadium and carbon and the replacements therefore adding up to 100 At. percent.

2. A carbide-metal composition of the elemental formula:

$$Ti_a—(L)_m—V_b—(X)_n—C$$

(a) wherein $a$, $m$, $n$, and $b$ are each 1 or 0 and $a+m$ is either 1 or 2, $b+n$ is either 1 or 2;

(b) L is at least one member selected from the group consisting of Hf, Zr, Cr and mixtures thereof;

(c) wherein when L is Cr alone or in combination with any and all of Hf and Zr, the maximum At. percent attributable to Cr is 5 At. percent;

(d) the L content of the composition being within the range of 0 to 64 At. percent;

(e) X is at least one member selected from the group consisting of Nb, Ta, Mo, W, Cr, and mixtures thereof;

(f) wherein when X is Cr alone or in combination with any and all of Nb, Ta, Mo, W, the maximum At. percent attributable to Cr is 5 At. percent;

(g) the X content of the composition being within the range of 0 to 66 At. percent;

(h) when X is either Mo or W alone in combination with each other, or in further combination with any and all of Nb, Ta, and Cr, the maximum At. percent attributable to Mo or W alone in combination with each other is 10 At. percent;

(i) the sum of the contents of the Ti and L constituent(s) being within the range of from 11 to 64 At. percent;

(j) the sum of the contents of the V and X constituent members being 5 to 66 At. percent;

(k) the Ti content of said composition being within the range of 0 to 64 At. percent;

(l) the V content of said composition being within the range of 0 to 66 At. percent;

(m) the total Cr content within said composition never being more than 5 At. percent;

(n) the carbon content of said composition being from about 23 At. percent to about 44 At. percent;

(o) the total At. percent of the composition $$Ti_a—(L)_m—V_b—(X)_n—C$$

being 100 At. percent.

3. A carbide-metal composition of the elemental formula Ti—$V_m$—$(Q)_n$—C wherein titanium is present from about 30 At. percent to about 55 At. percent and vanadium is present from about 11 At. percent to about 40 At. percent carbon is present from about 30 At. percent to about 35 At. percent and $n$ is 1 or 0, $m$ is 1 or 0, $m+n$ is either 1 or 2, and either V or Q or both V and Q are present and Q is one element selected from the group consisting of Nb, Ta, Mo, and W, said Q element, when present, being substituted at least in part for vanadium in said composition;

whereby said composition falls, when unsubstituted, and $n=0$ and $m=1$ within the boxed-in area bounded by the compositional limits of $Ti_{54}V_{11}C_{35}$, $Ti_{34.5}V_{30.5}C_{35}$, $Ti_{30}V_{40}C_{30}$ and $Ti_{55}V_{15}C_{30}$ in a planar, ternary compositional diagram where the subscripts of the said compositional limits and said diagram are set forth in atomic percentages; and when $n$ is 1 and $m$ is 1 or 0, and Q is present as a substituent selected from among Nb, Ta, Mo and W, it replaces vanadium as follows:

wherein from 0 up to 10 At. percent of vanadium, but never more than the vanadium content of said composition is replaced by a Q substituent member selected from the group consisting of tungsten and molybdenum;

from 0 up to the maximum amount of vanadium present in said composition is replaced by a Q substituent member selected from the group consisting of niobium and tantalum;

to form substituted carbide-metal compositions from unsubstituted compositions, which unsubstituted compositions' titanium content varies from about 26 to about 59 At. percent, whose carbon content varies from about 28 to about 40 At. percent, and whose vanadium content varies from about 9 At. percent to about 41 At. percent;

the replacement of vanadium by any of the said substituent members tungsten, molybdenum, niobium, and tantalum, never exceeding the total amount of vanadium present in said carbide metal composition;

and wherein when said composition has at least part of its vanadium content replaced, the substituted composition lies within the compositional volume generated by the three dimensional joining of all the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when the said substituent, Q, is Nb, the compositional limits $Ti_{52}Nb_{14}C_{34}$, $Ti_{34.5}Nb_{31.5}C_{34}$, $Ti_{30}Nb_{41}C_{29}$ and $Ti_{51}Nb_{20}C_{29}$ for the ternary figure of the Ti—Nb—C system, and $Ti_{54}V_{11}C_{35}$, $Ti_{30}V_{40}C_{30}$, $Ti_{34.5}V_{30.5}C_{35}$ and $Ti_{55}V_{15}C_{30}$ for the ternary figure of the Ti—V—C system describe the three dimensional volume;

when Q is Ta, the compositional limits $Ti_{55}Ta_{13}C_{32}$, $Ti_{47}Ta_{21}C_{32}$, $Ti_{43}Ta_{29}C_{28}$ and $Ti_{55}Ta_{17}C_{28}$ for the ternary figure of the Ti—Ta—C system and $Ti_{54}V_{11}C_{35}$, $Ti_{30}V_{40}C_{30}$, $Ti_{34.5}V_{30.5}C_{35}$ and $Ti_{55}V_{15}C_{30}$ for the ternary figure of the Ti—V—C system describe the three dimensional volume;

when Q is Mo, the compositional limits $Ti_{56}Mo_9C_{35}$, $Ti_{43}Mo_{22}C_{35}$, $Ti_{40}Mo_{30}C_{30}$ and $Ti_{59}Mo_{11}C_{30}$ for the ternary figure of the Ti—Mo—C system and $Ti_{54}V_{11}C_{35}$, $Ti_{30}V_{40}C_{30}$, $Ti_{34.5}V_{30.5}C_{35}$ and $Ti_{55}V_{15}C_{30}$ for the ternary figure of the Ti—V—C system describe the three dimensional volume;

when Q is W, the compositional limits $Ti_{46.5}W_{13.5}C_{40}$, $Ti_{29}W_{31}C_{40}$, $Ti_{26}W_{39}C_{35}$ and $Ti_{50}W_{15}C_{35}$ for the ternary figure of the Ti—W—C system and $Ti_{54}V_{11}C_{35}$, $Ti_{30}V_{40}C_{30}$, $Ti_{34.5}V_{30.5}C_{35}$ and $Ti_{55}V_{15}C_{30}$ for the ternary figure of the Ti—V—C system describe the three dimensional volume;

the total of the atomic percentages of titanium, vanadium and carbon and the replacements therefore adding up to 100 At. percent.

4. A carbide-metal composition of the elemental formula:

$$Ti_a—(L)_m—V_b—(X)_n—C$$

(a) wherein $a$, $m$, $n$, and $b$ are each 1 or 0 and $a+m$ is either 1 or 2, $b+n$ is either 1 or 2
(b) L is at least one member selected from the group consisting of Hf, Zr, Cr and mixtures thereof.
(c) wherein when L is Cr alone or in combination with any and all of Hf and Zr, the maximum At. percent attributable to Cr is 5 At. percent;
(d) the L content of the composition being within the range of 0 to 59 At. percent;
(e) X is at least one member selected from the group consisting of Nb, Ta, Mo, W, Cr, and mixtures thereof;
(f) wherein when X is Cr alone or in combination with any and all of Nb, Ta, Mo, W, the maximum At. percent attributable to Cr is 5 At. percent;
(g) the X content of the composition being within the range of 0 to 41 At. percent;
(h) when X is either Mo or W alone or in combination with each other, or in further combination with any and all of Nb, Ta, and Cr, the maximum At. percent attributable to Mo or W alone or in combination with each other is 10 At. percent;
(i) the sum of the contents of the Ti and L constituent(s) being within the range of from 26 to 59 At. percent;
(j) the sum of the contents of the V and X constituent members being 9 to 41 At. percent;
(k) the Ti content of said composition being within the range of 0 to 59 At. percent;
(l) the V content of said composition being within the range of 0 to 41 At. percent;
(m) the total Cr content within said composition never being more than 5 At. percent;
(n) the carbon content of said composition being from about 28 At. percent to about 40 At. percent;
(o) the total At. percent of the composition $$Ti_a—(L)_m—V_b—(X)_n—C$$

being 100 At. percent.

5. A carbide-metal composition of the elemental formula $Ti_r—(Z)_k—Nb_m—(Q)_n—C$ wherein titanium is present from about 11 At. percent to about 55 At. percent and
niobium is present from about 7 At. percent to about 66 At. percent
carbon is present from about 23 At. percent to about 38 At. percent
and $n$, $m$, $r$ and $k$ are 1 or 0, $r+k$ is either 1 or 2, $m+n$ is either 1 or 2, $k+n$ is either 1 or 0; Q is one element selected from the group consisting of V, Ta, Mo, and W; Z is one element selected from the group consisting of Hf and Zr; said Q element, when present, being substituted at least in part for niobium in said composition, and said Z element, when present, being substituted at least in part for Titanium in said composition;
whereby said composition falls, when unsubstituted, and $n$ and $k$ are 0, and $m$ and $r$ are 1, within the boxed-in area bounded by the compositional limits of $Ti_{55}Nb_7C_{38}$, $Ti_{15}Nb_{47}C_{38}$, $Ti_{11}Nb_{66}C_{23}$ and $$Ti_{55}Nb_{22}C_{23}$$

in a planar, ternary compositional diagram where the subscripts of the said compositional limits and said diagram are set forth in atomic percentages; and when $n$ is 1, and $r$ is 1, and $k$ is 0, and $m$ is 1 or 0, and Q is present as a substituent selected from among V, Ta, Mo and W, it replaces niobium as follows:
wherein from 0 up to 10 At. percent of niobium but never more than the niobium content of said composition, is replaced by a Q substituent member selected from the group consisting of tungsten and molybdenum;
from 0 up to the maximum amount of niobium present in said composition is replaced by a Q substituent member selected from the group consisting of vanadium and tantalum;
when $n$ is 0, and $m$ is 1, and $k$ is 1, and $r$ is 1 or 0 and Z is present as a substituent selected from hafnium and zirconium, it replaces titanium as follows:
from 0 up to the maximum amount of titanium present in said composition is replaced by a Z substituent member selected from the group consisting of hafnium and zirconium;

to form substituted carbide-metal compositions from unsubstituted compositions, which unsubstituted compositions, titanium content varies from about 10 to about 64 At. percent, whose carbon content varies from about 23 to about 44 At. percent, and whose niobium content varies from about 5 At. percent to about 66 At. percent;

the replacement of niobium by any of the said substituent members, tungsten, molybdenum, vanadium and tantalum, never exceeding the total amount of niobium present in said carbide metal composition;

the replacement of titanium by any of the said substituent members hafnium and zirconium never exceeding the total amount of titanium present in said carbide metal composition; and wherein when said composition has at least part of its niobium content replaced, or at least part of its titanium content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when the said substituent, Q, is vanadium, the compositional limits $Ti_{55}Nb_7C_{38}$, $Ti_{15}Nb_{47}C_{38}$, $Ti_{11}Nb_{66}C_{23}$ and $Ti_{55}Nb_{22}C_{23}$ for the ternary figure of the Ti—Nb—C system, and $Ti_{57}V_6C_{37}$, $Ti_{36}V_{24}C_{37}$, $Ti_{24.5}V_{51.5}C_{24}$ and $Ti_{60}V_{16}C_{24}$ the ternary figure of the Ti—V—C system describe the three dimensional volume;

when Q is Ta, the compositional limits $Ti_{60}Ta_5C_{35}$, $$Ti_{50}Ta_{15}C_{35}$$

$Ti_{38}Ta_{39}C_{23}$ and $Ti_{60}Ta_{17}C_{23}$ for the ternary figure of the Ti—Ta—C system and $Ti_{55}Nb_7C_{38}$, $Ti_{15}Nb_{47}C_{38}$, $Ti_{11}Nb_{66}C_{23}$ and $Ti_{55}Nb_{22}C_{23}$ for the ternary figure of the Ti—Nb—C system describe the three dimensional volume;

when Q is Mo, the compositional limits $Ti_{57}Mo_5C_{38}$, $Ti_{39}Mo_{23}C_{38}$, $Ti_{29}Mo_{46}C_{25}$ and $Ti_{64}Mo_{11}C_{25}$ for the ternary figure of the Ti—Mo—C system and $$Ti_{55}Nb_7C_{38}$$

$Ti_{15}Nb_{47}C_{38}$, $Ti_{11}Nb_{66}C_{23}$ and $Ti_{55}Nb_{22}C_{23}$ for the ternary figure of the Ti—Nb—C system describe the three dimensional volume:

when Q is W, the compositional limits $Ti_{62}W_8C_{30}$, $$Ti_{51}W_5C_{44}$$

$Ti_{30}W_{26}C_{44}$ and $Ti_{15}W_{55}C_{30}$ for the ternary figure of the Ti—W—C system and $Ti_{55}Nb_7C_{37}$, $Ti_{15}Nb_{47}C_{38}$, $Ti_{11}Nb_{66}C_{23}$ and $Ti_{55}Nb_{22}C_{23}$ for the ternary figure of the Ti—Nb—C system describe the three dimensional volume;

when the said substituent, Z is zirconium, the compositional limits, $Ti_{55}Nb_7C_{38}$, $Ti_{15}Nb_{47}C_{38}$, $$Ti_{11}Nb_{66}C_{23},$$

and $Ti_{55}Nb_{22}C_{23}$ for the ternary figure of the

Ti—Nb—C system, and $Zr_{52}Nb_7C_{41}$, $Zr_{14}Nb_{45}C_{41}$, $Zr_{10}Nb_{66}C_{24}$, and $Zr_{55}Nb_{21}C_{24}$ for the ternary figure of the Zr—Nb—C system describe the three dimensional volume;
when Z is Hafnium, the compositional limits $$Ti_{55}Nb_7C_{38}$$

$Ti_{15}Nb_{47}C_{38}$, $Ti_{11}Nb_{66}C_{23}$, and $Ti_{55}Nb_{22}C_{23}$ for the ternary figure of the Ti—Nb—C system of $$Hf_{55}Nb_6C_{39}$$

$Hf_{16}Nb_{45}C_{39}$, $Hf_{10}Nb_{66}C_{24}$, and $Hf_{55}Nb_{21}C_{24}$ for the ternary figure of the Hf—Nb—C system describe the three dimensional volume;

the total of the atomic percentages of titanium, niobium and carbon and the replacements therefore adding up to 100 At. percent.

6. A carbide-metal composition of the elemental formula:

$$Ti_a\text{—}(L)_m\text{—}Nb_b\text{—}(X)_n\text{—}C$$

(a) wherein $a$, $m$, $n$, and $b$ are each 1 or 0 and $a+m$ is either 1 or 2, $b+n$ is either 1 or 2 and (b) L is at least one member selected from the group consisting of Hf, Zr, Cr and mixtures thereof;

(c) wherein when L is Cr alone or in combination with any and all of Hf and Zr, the maximum At. percent attributable to Cr is 5 At. percent;

(d) the L content of the composition being within the range of 0 to 64 At. percent;

(e) X is at least one member selected from the group consisting of V, Ta, Mo, W, Cr, and mixtures thereof;

(f) wherein when X is Cr alone or in combination with any and all of V, Ta, Mo, W, the maximum At. percent attributable to Cr is 5 At. percent;

(g) the X content of the composition being within the range of 0 to 66 At. percent;

(h) when X is either Mo or W alone or in combination with each other, or in further combination with any and all of V, Ta, and Cr, the maximum At. percent attributable to Mo or W alone or in combination with each other is 10 At. percent;

(i) the sum of the contents of the Ti and L constituent(s) being within the range of from 10 to 64 At. percent;

(j) the sum of the contents of the Nb and X constituent members being 5 to 66 At. percent;

(k) the Ti content of the composition being within the range of 0 to 64 At. percent;

(l) the Nb content of the composition being within the range of 0 to 66 At. percent;

(m) the total Cr content within said composition never being more than 5 At. percent;

(n) the carbon content of said composition being from about 23 At. percent to about 44 At. percent;

(o) the total At. percent of the composition $$Ti_a\text{—}(L)_m\text{—}Nb_b\text{—}(X)_n\text{—}C$$

being 100 At. percent.

7. A carbide-metal composition of the elemental formula $Ti_r\text{—}(Z)_k\text{—}Nb_m\text{—}(Q)_n\text{—}C$ wherein titanium is present from about 30 At. percent to about 52 At. percent and niobium is present from about 14 At. percent to about 41 At. percent carbon is present from about 29 At. percent to about 34 At. percent and $n$, $m$, $r$ and $k$ are 1 or 0, $r+k$ is either 1 or 2, $m+n$ is either 1 or 2, $k+n$ is either 1 or 0; Q is one element selected from the group consisting of V, Ta, Mo, and W; Z is one element selected from the group consisting of Hf and Zr; said Q element, when present, being substituted at least in part for niobium in said composition, and said Z element, when present, being substituted at least in part for titanium in said composition;

whereby said composition falls, when unsubstituted, and $n$ and $k$ are 0, and $m$ and $r$ are 1, within the boxed-in area bounded by the compositional limits of $Ti_{52}Nb_{14}C_{34}$, $Ti_{34.5}Nb_{31.5}C_{34}$, $Ti_{30}Nb_{41}C_{29}$ and $Ti_{51}Nb_{20}C_{29}$ in a planar, ternary compositional diagram where the subscripts of the said compositional limits and said diagram are set forth in atomic percentages; and when $n$ is 1 and $r$ is 1, and $k$ is 0, and $m$ is 1 or 0, and Q is present as a substituent selected from among V, Ta, Mo and W, it replaces niobium as follows:

wherein from 0 up to 10 At. percent of niobium but never more than the niobium content of said composition, is replaced by a Q substituent member selected from the group consisting of tungsten and molybdenum;

from 0 up to the maximum amount of niobium present in said composition is replaced by a Q substituent member selected from the group consisting of vanadium and tantalum;

when $n$ is 0, and $m$ is 1, and $k$ is 1, and $r$ is 1 or 0 and Z is present as a substituent selected from hafnium and zirconium, it replaces titanium as follows:

from 0 up to the maximum amount of titanium present in said composition is replaced by a Z substituent member selected from the group consisting of hafnium and zirconium;

to form substituted carbide-metal compositions from unsubstituted compositions, which unsubstituted compositions' titanium content varies from about 24 to about 59 At. percent, whose carbon content varies from about 27 to about 40 At. percent, and whose niobium content varies from about 9 At. percent to about 49 At. percent;

the replacement of niobium by any of the said substituent members, tungsten, molybdenum, vanadium and tantalum, never exceeding the total amount of niobium present in said carbide metal composition;

the replacement of titanium by any of the said substituent members hafnium and zirconium never exceeding the total amount of titanium present in said carbide metal composition; and wherein when said composition has at least part of its niobium content replaced, or at least part of its titanium content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when the said substituent, Q, is vanadium, the compositional limits $Ti_{52}Nb_{14}C_{34}$, $Ti_{34.5}Nb_{31.5}C_{34}$, $$Ti_{30}Nb_{41}C_{29}$$

and $Ti_{51}Nb_{20}C_{29}$ for the ternary figure of the

Ti—Nb—C system, and $Ti_{54}V_{11}C_{35}$, $Ti_{34.5}V_{30.5}C_{35}$, $Ti_{30}V_{40}C_{30}$ and $Ti_{55}V_{15}C_{30}$ for the ternary figure of the Ti—V—C system described the three dimensional volume;
when Q is Ta, the compositional limits $Ti_{55}Ta_{13}C_{32}$, $Ti_{47}Ta_{21}C_{32}$, $Ti_{43}Ta_{29}C_{28}$ and $Ti_{55}Ta_{17}C_{28}$ for the ternary figure of the Ti—Ta—C system and $$Ti_{52}Nb_{14}C_{34}$$

$Ti_{34.5}Nb_{31.5}C_{34}$, $Ti_{30}Nb_{41}C_{29}$ and $Ti_{51}Nb_{20}C_{29}$ for the ternary figure of the Ti—Nb—C system describe the three dimensional volume;

when Q is Mo, the compositional limits $Ti_{56}Mo_9C_{35}$, $Ti_{43}Mo_{22}C_{35}$, $Ti_{40}Mo_{30}C_{30}$ and $Ti_{59}Mo_{11}C_{30}$ for the ternary figure of the Ti—Mo—C system and $$Ti_{52}Nb_{14}C_{34}$$

$Ti_{34.5}Nb_{31.5}C_{34}$, $Ti_{30}Nb_{41}C_{29}$ and $Ti_{51}Nb_{20}C_{29}$ for the ternary figure of the Ti—Nb—C system describe the three dimensional volume;

when Q is W, the compositional limits $Ti_{46.5}W_{13.5}C_{40}$, $Ti_{29}W_{31}C_{40}$, $Ti_{26}W_{39}C_{35}$ and $Ti_{50}W_{15}C_{35}$ for the ternary figure of the Ti—W—C system and $$Ti_{52}Nb_{14}C_{34}$$

$Ti_{34.5}Nb_{31.5}C_{34}$, $Ti_{30}Nb_{41}C_{29}$ and $Ti_{51}Nb_{20}C_{29}$ for the ternary figure of the Ti—Nb—C system describe the three dimensional volume;

when the said substituent, Z, is zirconium, the composional limits, $Ti_{52}Nb_{14}C_{34}$, $Ti_{34.5}Nb_{31.5}C_{34}$, $$Ti_{30}Nb_{41}C_{29}$$

and $Ti_{51}Nb_{20}C_{29}$ for the ternary figure of the

Ti—Nb—C system, and $Zr_{50}Nb_{15}C_{35}$, $Zr_{31}Nb_{34}C_{35}$, $Zr_{31}Nb_{39}C_{30}$ and $Zr_{51}Nb_{19}C_{30}$ for the ternary figure of the Zr—Nb—C system describe the three dimensional volume;
when Z is hafnium, the compositional limits $$Ti_{52}Nb_{14}C_{34}$$

$Ti_{34.5}Nb_{1.5}C_{34}$, $Ti_{30}Nb_{41}C_{29}$, and $Ti_{51}Nb_{20}C_{29}$ for the ternary figure of the Ti—Nb—C system and $Hf_{50}Nb_{15}C_{35}$, $Hf_{30}Nb_{35}C_{35}$, $Hf_{24}Nb_{49}C_{27}$ and $$Hf_{50}Nb_{23}C_{27}$$

for the ternary figure of the Hf—Nb—C system describe the three dimensional volume;

the total of the atomic percentages of titanium, niobium and carbon and the replacements therefore adding up to 100 At. percent.

8. A carbide-metal composition of the elemental formula:

$$Ti_a—(L)_m—Nb_b—(X)_n—C$$

(a) wherein $a$, $m$, $n$, and $b$ are each 1 or 0 and $a+m$ is either 1 or 2, $b+n$ is either 1 or 2 and (b) L is at least one member selected from the group consisting of Hf, Zr, Cr and mixtures thereof;

(c) wherein when L is Cr alone or in combination with any and all of Hf and Zr, the maximum At. percent attributable to Cr is 5 At. percent;

(d) the L content of the composition being within the range of 0 to 59 At. percent;

(e) X is at least one member selected from the group consisting of V, Ta, Mo, W, Cr, and mixtures thereof;

(f) wherein when X is Cr alone or in combination with any and all of V, Ta, Mo, W, the maximum At. percent attributable to Cr is 5 At. percent;

(g) the X content of the composition being within the range of 0 to 40 At. percent;

(h) when X is either Mo or W alone or in combination with each other, or in further combination with any and all of V, Ta, and Cr, the maximum At. percent attributable to Mo or W alone or in combination with each other is 10 At. percent;

(i) the sum of the contents of the Ti and L constituent(s) being within the range of from 24 to 59 At. percent;

(j) the sum of the contents of the Nb and X constituent members being 9 to 49 At. percent;

(k) the Ti content of the composition being within the range of 0 to 59 At. percent;

(l) the Nb content of the composition being within the range of 0 to 49 At. percent;

(m) the total Cr content within said composition never being more than 5 At. percent;

(n) the carbon content of said composition being from about 27 At. percent to about 40 At. percent;

(o) the total At. percent of the compositional $$Ti_a—(L)_m—Nb_b—(X)_n—C$$

being 100 At. percent.

9. A carbide-metal composition of the elemental formula $$Zr_r—(Z)_k—Nb_m(Q)_n—C$$

wherein zirconium is present from about 10 At. percent to about 55 At. percent and niobium is present from about 7 At. percent to about 66 At. percent carbon is present from about 24 At. percent to about 41 At. percent and $n$, $m$, $r$ and $k$ are 1 or 0, $r+k$ is either 1 or 2 $m+n$ is either 1 or 2, $k+n$ is either 1 or 0; Q is one element selected from the group consisting of V, Ta, Mo, and W, Z is one element selected from the group consisting of Hf and Ti; said Q element, when present, being substituted at least in part for niobium in said composition, and said Z element, when present, being substituted at least in part of Zr in said composition;

whereby said composition falls, when unsubstituted, and $n$ and $k$ are 0, and $m$ and $r$ are 1, within the boxed-in area bounded by the compositional limits of $$Zr_{52}Nb_7C_{41}, Zr_{14}Nb_{45}C_{41}, Zr_{10}Nb_{66}C_{24}$$

and $$Zr_{55}Nb_{21}C_{24}$$

in a planar, ternary compositional diagram where the subscripts of the said compositional limits and said diagram are set forth in atomic percentages; and when $n$ is 1, and $r$ is 1, and $k$ is 0, and $m$ is 1 or 0, and Q is present as a substituent selected from among Va, Ta, Mo and W, it replaces niobium as follows:

wherein from 0 up to 10 At. percent of niobium, but never more than the niobium content of said composition, is replaced by a Q substituent member selected from the group consisting of tungsten and molybdenum;

from 0 up to the maximum amount of niobium present in said composition is replaced by a Q substituent member selected from the group consisting of vanadium and tantalum;

when $n$ is 0, and $m$ is 1, and $k$ is 1, and $r$ is 1 or 0 and Z is present as a substituent selected from hafnium and titanium, it replaces zirconium as follows:

from 0 up to the maximum amount of Zr present in said composition is replaces by a Z substituent member selected from the group consisting of hafnium and Ti;

to form substituted carbide-metal compositions from unsubstituted compositions, which unsubstituted compositions' Zr content varies from about 10 to about 55 At. percent, whose carbon content varies from about 23 to about 41 At. percent, and whose niobium content varies from about 6 At. percent to about 66 At. percent;

the replacement of niobium by any of the said substituent members, tungsten, molybdenum, vanadium and tantalum, never exceeding the total amount of niobium present in said carbide metal composition;

the replacement of Zr by any of the said substituent members hafnium and Ti never exceeding the total amount of Zr present in said carbide metal composition; and wherein when said composition has at least part of its niobium content replaced, or at least part of its Zr content replaced, the substituted compositional volume generated by the three dimensional joining of all of the individual boxed-in areas of the respective ternary figures, which figures depict the ternary systems which result from the complete replacement of each component of said composition so replaced by the said substituent if each of the replacements made were the sole replacement to said composition, said boxed-in areas, joined to generate the three dimensional volume, are bounded by the compositional limits for the respective ternary figures as follows:

when Q is Ta, the compositional limits $Zr_{52}Ta_{10}C_{38}$, $Zr_{40}Ta_{22}C_{38}$, $Zr_{21.5}Ta_{55}C_{23.5}$ and $Zr_{50.5}Ta_{26}C_{23.5}$ for the ternary figure of the Zr—Ta—C system and $$Zr_{52}Nb_7C_{41}, Zr_{14}Nb_{45}C_{41}, Zr_{10}Nb_{66}C_{24}$$

and $$Zr_{55}Nb_{21}C_{24}$$

for the ternary figure of the Zr—Nb—C system describe the three dimensional volume;

when the said substituent, Z is Ti, the compositional limits $Ti_{55}Nb_7C_{38}$, $Ti_{15}Nb_{47}C_{38}$, $Ti_{11}Nb_{66}C_{23}$, and $Ti_{55}Nb_{22}C_{23}$ for the ternary figure of the Ti—Nb—C system, and $Zr_{52}Nb_7C_{41}$, $Zr_{14}Nb_{45}C_{41}$, $Zr_{10}Nb_{66}C_{24}$, and $Zr_{55}Nb_{21}C_{24}$ for the ternary figure of the Zr—Nb—C system describe the three dimensional volume;

when Z is hafnium, the compositional limits $$Zr_{52}Nb_{74}C_1, Zr_{14}Nb_{45}C_{41}, Zr_{10}Nb_{66}C_{24}$$

and $$Zr_{55}Nb_{21}C_{24}$$

for the ternary figure of the Zr—Nb—C system and $$Hf_{55}Nb_6C_{39}, Hf_{16}Nb_{45}C_{39}, Hf_{10}Nb_{66}C_{24}$$

and $$Hf_{55}Nb_{21}C_{24}$$

for the ternary figures of the Hf—Nb—C system describe the three dimensional volume;

the total of the atomic percentages of zirconium, niobium and carbon and the replacements therefore adding up to 100 At. percent.

10. A carbide-metal composition of the elemental formula:

$$Zr—(L)_m—Nb_b—(X)_n—C$$

(a) wherein $a$, $m$, $n$, and $b$ are each 1 or 0 and $a+m$ is either 1 or 2, $b+n$ is either 1 or 2 and (b) L is at least one member selected from the group consisting of Hf, Ti, Cr and mixtures thereof;

(c) wherein when L is Cr alone or in combination with any and all of Hf and Ti, the maximum At. percent attributable to Cr is 5 At. percent;

(d) the L content of the composition being within the range of 0 to 55 At. percent;

(e) X is at least one member selected from the group consisting of V, Ta, Mo, W, Cr and mixtures thereof;

(f) wherein when X is Cr alone or in combination with any and all of V, Ta, Mo, W, the maximum At. percent attributable to Cr is 5 At. percent;

(g) the X content of the composition being within the range 0 to 66 At. percent;

(h) when X is either Mo or W alone or in combination with each other, or in further combination with any and all of V, Ta and Cr, the maximum At. percent attributable to Mo or W alone or in combination with each other is 10 At. percent;

(i) the sum of the contents of the Zr and L constituent(s) being within the range of from 10 to 55 At. percent;

(j) the sum of the contents of the Nb and X constituent members being 6 to 66 At. percent;

(k) the Zr content of the composition being within the range of 0 to 55 At. percent;

(l) the Nb content of the composition being within the range of 0 to 66 At. percent;

(m) the total Cr content within said composition never being more than 5 At. percent;

(n) the carbon content of said composition being from about 23 At. percent to about 41 At. percent;

(o) the total At. percent of the compositional $$Zr_a—(L)_m—Nb_b—(X)_n—C$$

being 100 At. percent.

11. A carbide-metal composition of the elemental formula $$Zr_r-(Z)_k-Nb_m-(Q)_n-C$$

wherein
zirconium is present from about 31 At. percent to about 51 At. percent and
niobium is present from about 15 At. percent to about 39 At. percent
carbon is present from about 30 At. percent to about 35 At. percent
and $n$, $m$, $r$ and $k$ are 1 or 0, $r+k$ is either 1 or 2, $m+n$ is either 1 or 2, $k+n$ is either 1 or 0; Q is one element selected from the group consisting of Va, Ta, Mo, and W; Z is one element selected from the group consisting of Hf and Ti; said Q element, when present, being substituted at least in part for Niobium in said composition, and said Z element, when present, being substituted at least in part for Zr in said composition;
whereby said composition falls, when unsubstituted, and $n$ and $k$ are 0, and $m$ and $r$ are 1, within the boxed-in area bounded by the compositional limits of $$Zr_{50}Nb_{15}C_{35}$$

$Zr_{31}Nb_{34}C_{35}$, $Zr_{31}Nb_{39}C_{30}$ and $Zr_{51}Nb_{19}C_{30}$ in a planar, ternary compositional diagram where the subscripts of the said compositional limits and said diagram are set forth in atomic percentages; and
when $n$ is 1, and $r$ is 1, and $k$ is 0, and $m$ is 1 or 0, and Q is present as a substituent selected from among V, Ta, Mo and W, it replaces niobium as follows:
wherein from 0 up to 10 At. percent of niobium but never more than the niobium content of said composition, is replaced by a Q substituent member selected from the group consisting of tungsten and molybdenum;
from 0 up to the maximum amount of niobium present in said composition is replaced by a Q substituent member selected from the group consisting of vanadium and tantalum;
when $n$ is 0, and $m$ is 1, and $k$ is 1, and $r$ is 1 or 0 and Z is present as a substituent selected from hafnium and Ti, it replaces Zr as follows:
from 0 up to the maximum amount of Zr present in said composition is replaced by a Z substituent member selected from the group consisting of hafnium and Ti;
to form substituted carbide-metal composition from unsubstituted compositions, which unsubstituted compositions' Zr content varies from about 24 to about 52 At. percent, whose carbon content varies from about 27 to about 35 At. percent, and whose niobium content varies from about 14 At. percent to about 49 At. percent;
the replacement of niobium by any of the said substituent members, tungsten, molybdenum, vanadium and tantalum, never exceeding the total amount of nobium present in said carbide metal composition;
the replacement of Zr by any of the said substituent members hafnium and T never exceeding the total amount of Zr present in said carbide metal composition; and
wherein when said composition has at least part of its niobium content replaced, or at least part of its Zr content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements were made were the sole replacement to said composition, said boxed-in areas, joined to generate the three dimensional volume, are bounded by the compositional limits for the respective ternary figures as follows:
when Q is Ta, the compositional limits $Zr_{47}Ta_{18}C_{35}$, $Zr_{39}Ta_{26}C_{35}$, $Zr_{33}Ta_{38}C_{29}$ and $Zr_{46}Ta_{25}C_{29}$ for the ternary figure of the Zr—Ta—C system and $$Zr_{50}Nb_{15}C_{35}$$

$Zr_{31}Nb_{34}C_{35}$, $Zr_{31}Nb_{39}C_{30}$ and $Zr_{51}Nb_{19}C_{30}$ for the ternary figures of the Zr—Nb—C system describe the three dimensional volume;
when the said substituent, Z, is Ti, the compositional limits, $Ti_{52}Nb_{14}C_{34}$, $Ti_{34.5}Nb_{31.5}C_{34}$, $Ti_{30}Nb_{41}C_{29}$, and $Ti_{51}Nb_{20}C_{29}$ for the ternary figure of the Ti—Nb—C system, and $Zr_{50}Nb_{15}C_{35}$, $Zr_{31}Nb_{34}C_{35}$, $Zr_{31}Nb_{39}C_{30}$, and $Zr_{51}Nb_{19}C_{30}$ for the ternary figure of the $$Zr-Nb-C$$

system describe the three dimensional volume;
when Z is hafnium, the compositional limits $$Zr_{50}Nb_{15}C_{35},$$

$Zr_{31}Nb_{34}C_{35}$, $Zr_{31}Nb_{39}C_{30}$, and $Zr_{51}Nb_{19}C_{30}$ for the ternary figure of the Zr—Nb—C system and $$Hf_{50}Nb_{15}C_{35},$$

$Hf_{30}Nb_{35}C_{35}$, $Hf_{24}Nb_{49}C_{27}$ and $Hf_{50}Nb_{23}C_{27}$ for the ternary figure of the Hf—Nb—C system describe the three dimensional volume;
the total of atomic percentages of zirconium, niobium and carbon and the replacements therefore adding up to 100 At. percent.

12. A carbide-metal composition of the elemental formula:

$$Zr_a-(L)_m-Nb_b-(X)_n-C$$

(a) wherein $a$, $m$, $n$, and $b$ are each 1 or 0 and $a+m$ is either 1 or 2, $b+n$ is either 1 or 2 and
(b) L is at least one member selected from the group consisting of Hf, Ti, Cr and mixtures thereof:
(c) wherein when L is Cr alone or in combination with any and all of Hf and Ti, the maximum At. percent attributable to Cr is 5 At. percent;
(d) the L content of the composition being within the range of 0 to 52 At. percent;
(e) X is at least one member selected from the group consisting of V, Ta, Mo, W, Cr and mixtures thereof;
(f) wherein when X is Cr alone or in combination with any and all of V, Ta, Mo, W, the maximum At. percent attributable to Cr is 5 At. percent;
(g) the X content of the composition being within the range of 0 to 49 At. percent;
(h) when X is either Mo or W alone or in combination with each other, or in further combination with any and all of V, Ta, and Cr, the maximum At. percent attributable to Mo or W alone or in combination with each other is 10 At. percent;
(i) the sum of the contents of the Ti and L constituent(s) being within the range of from 24 to 52 At. percent;
(j) the sum of the contents of the Nb and X constituent members being 14 to 49 At. percent;
(k) the Zr content of the composition being within the range of 0 to 52 At. percent;
(l) the Nb content of the composition being within the range of 0 to 49 At. percent;
(m) the total Cr content within said composition never being more than 5 At. percent;
(n) the carbon content of said composition being from about 27 At. percent to about 35 At. percent;
(o) the total At. percent of the compositional $$Zr_a-(L)_m-Nb_b-(X)_n-C$$

being 100 At. percent.

13. A carbide-metal composition of the elemental formula $$Hf_r—(Z)_k—Nb_m—(Q)_n—C$$

wherein
hafnium is present from about 10 At. percent to about 55 At. percent and
niobium is present from about 6 At. percent to about 66 At. percent
carbon is present from about 24 At. percent to about 39 At. percent
and $n$, $m$, $r$ and $k$ are 1 or 0, $r+k$ is either 1 or 2, $m+n$ is either 1 or 2, $k+n$ is either 1 or 0; Q is one element selected from the group consisting of V, Ta, Mo, and W; Z is one element selected from the group consisting of Ti and Zr; said Q element, when present, being substituted at least in part for niobium in said composition, and said Z element, when present, being substituted at least in part for Hf in said composition;
whereby said composition falls, when unsubstituted, and $n$ and $k$ are 0, and $m$ and $r$ are 1, within the boxed-in area bounded by the compositional limits of $Hf_{55}Nb_6C_{39}$, $Hf_{16}Nb_{45}C_{39}$, $Hf_{10}Nb_{66}C_{24}$ and $Hf_{55}Nb_{21}C_{24}$ in a planar, ternary compositional diagram where the subscripts of the said compositional limits and said diagrams are set forth in atomic percentages; and
when $n$ is 1, and $r$ is 1, and $k$ is 0, and $m$ is 1 or 0, and Q is present as a substituent selected from among V, Ta, Mo and W, it replaces niobium as follows:
wherein from 0 up to 10 At. percent of niobium but never more than the niobium content of said composition, is replaced by a Q substituent member selected from the group consisting of tungsten and molybdenum;
from 0 up to the maximum amount of niobium present in said composition is replaced by a Q substituent member selected from the group consisting of vanadium and tantalum;
when $n$ is 0, and $m$ is 1, and $k$ is 1, and $r$ is 1 or 0 and Z is present as a substituent selected from Ti and zirconium, it replaces Hf as follows:
from 0 up to the maximum amount of Hf present in said composition is replaced by a Z substituent member selected from the group consisting of Ti and zirconium;
to form substituted carbide-metal compositions from unsubstituted compositions, which unsubstituted compositions' Hf content varies from about 10 to about 66 At. percent, whose carbon content varies from about 23 to about 41 At. percent, and whose niobium content varies from about 5 At. percent to about 66 At. percent;
the replacement of niobium by any of the said substituent members, tungsten, molybdenum, vanadium and tantalum, never exceeding the total amount of niobium present in said carbide metal composition;
the replacement of Hf by any of the said substituent members Ti and zirconium never exceeding the total amount of Hf present in said carbide metal composition; and
wherein when said composition has at least part of its niobium content replaced, or, at least part of its Hf content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements made were the sole replacement to said composition, said boxed-in areas, joining to generate the three dimensional volume, are bounded by the compositional limits for the respective ternary figures as follows:
when Q is Ta, the compositional limits $Hf_{57}Ta_5C_{38}$, $Hf_{35}Ta_{27}C_{38}$, $Hf_{23}Ta_{54}C_{23}$ and $Hf_{66}Ta_{11}C_{23}$ for the terntary figure of the Hf—Ta—C system and $Hf_{55}Nb_6C_{39}$, $Hf_{16}Nb_{45}C_{39}$, $Hf_{10}Nb_{66}C_{24}$ and $$Hf_{55}Nb_{21}C_{24}$$

for the ternary figure of the Hf—Nb—C system describe the three dimensional volume;
when the said substituent, Z, is zirconium, the compositional limits, $Hf_{55}Nb_6C_{39}$, $Hf_{18}Nb_{45}C_{39}$, $Hf_{10}Nb_{66}C_{24}$, and $Hf_{55}Nb_{21}C_{24}$ for the ternary figure of the Hf—Nb—C system, and $Zr_{52}Nb_7C_{41}$, $Zr_{14}Nb_{45}C_{41}$, $Zr_{10}Nb_{66}C_{24}$, and $Zr_{55}Nb_{21}C_{24}$ for the ternary figure of the Zr—Nb—C system describe the three dimensional volume;
when Z is Ti, the compositional limits $Ti_{55}Nb_7C_{38}$, $Ti_{15}Nb_{47}C_{38}$, $Ti_{11}Nb_{66}C_{23}$, and $Ti_{55}Nb_{22}C_{23}$ for the ternary figure of the Ti—Nb—C system and $Hf_{55}Nb_6C_{39}$, $Hf_{16}Nb_{45}C_{39}$, $Hf_{10}Nb_{66}C_{24}$, and $$Hf_{55}Nb_{21}C_{24}$$

for the ternary figure of the Hf—Nb—C system describe the three dimensional volume;
the total of the atomic percentages of hafnium, niobium and carbon and the replacements therefore adding up to 100 At. percent.

14. A carbide-metal composition of the elemental formula:

$$Hf_a—(L)_m—Nb_b—(X)_n—C$$

(a) wherein $a$, $m$, $n$, and $b$ are each 1 or 0 and $a+m$ is either 1 or 2, $b+n$ is either 1 or 2 and
(b) L is at least one member selected from the group consisting of Ti, Zr, Cr and mixtures thereof;
(c) when L is Cr alone or in combination with any and all of Ti and Zr, the maximum At. percent attributable to Cr is 5 At. percent;
(d) the L content of the composition being within the range of 0 to 66 At. percent;
(e) X is at least one member selected from the group consisting of V, Ta, Mo, W, Cr and mixtures thereof;
(f) wherein when X is Cr alone or in combination with any and all of V, Ta, Mo, W, the maximum At. percent attributable to Cr is 5 At. percent;
(g) the X content of the composition being within the range of 0 to 66 At. percent;
(h) when X is either Mo or W alone or in combination with each other, or in further combination with any and all of V, Ta, and Cr, the maximum At. percent attributable to Mo or W alone or in combination with each other is 10 At. percent;
(i) the sum of the contents of the Hf and L constituent(s) being within the range of from 10 to 66 At. percent;
(j) the sum of the contents of the Nb and X constituent members being 5 to 66 At. percent;
(k) the Hf content of the composition being within the range of 0 to 66 At. percent;
(l) the Nb content of the composition being within the range of 0 to 66 At. percent;
(m) the total Cr content within said composition never being more than 5 At. percent;
(n) the carbon content of said composition being from about 23 At. percent to about 41 At. percent;
(o) the total At. percent of the compositional $Hf_a—(L)_m—Nb_b—(X)_n—C$ being 100 At. percent.

15. A carbide-metal composition of the elemental formula $$Hf_r—(Z)_k—Nb_m—(Q)_n—C$$

wherein
hafnium is present from about 24 At. percent to about 50 At. percent and
Niobium is present from about 15 At. percent to about 49 At. percent Carbon is present from about 27 At. percent to about 35 At. percent and $n$, $m$, $r$ and $k$ are 1 or 0, $r+k$ is either 1 or 2, $m+n$ is either 1 or 2, $k+n$ is either 1 or 0; Q is one element selected from the group consisting of V, Ta, Mo, and W; Z is one element selected from the group consisting of Ti and Zr; said Q element, when present, being substituted at least in part for niobium in said composition, and said Z element, when present, being substituted at least in part for hafnium in said composition;

whereby said composition falls, when unsubstituted, and $n$ and $k$ are 0, and $m$ and $r$ are 1, within the boxed-in area bounded by the compositional limits of $Hf_{50}Nb_{15}C_{35}Hf_{30}$, $Nb_{35}C_{35}$, $Hf_{24}Nb_{49}C_{27}$ and $Hf_{50}Nb_{23}C_{27}$ in a planar, ternary compositional diagram where the subscripts of the said compositional limits and said diagram are set forth in atomic percentages; and when $n$ is 1, and $r$ is 1, and $k$ is 0, and $m$ is 1 or 0, and Q is present as a substituent selected from among V, Ta, Mo and W, it replaces niobium as follows:

wherein from 0 up to 10 At. percent of niobium, but never more than the niobium content of said composition, is replaced by a Q substituent member selected from the group consisting of tungsten and molybdenum;

from 0 up to the maximum amount of niobium present in said composition is replaced by a Q substituent member selected from the group consisting of vanadium and tantalum;

when $n$ is 0, and $m$ is 1, and $k$ is 1, and $r$ is 1 or 0, and Z is present as a substituent selected from titanium and zirconium, it replaces hafnium as follows:

from 0 up to the maximum amount of hafnium present in said composition is replaced by a Z substituent member selected from the group consisting of titanium and zirconium;

to form substituted carbide-metal compositions from unsubstituted compositions, which unsubstituted compositions' hafnium content varies from about 24 to about 52 At. percent, whose carbon content varies varies from about 27 to about 35 At. percent, and whose niobium content varies from about 14 At. percent to about 49 At. percent;

the replacement of niobium by any of the said substituent members, tungsten, molybdenum, vanadium and tantalum, never exceeding the total amount of niobium present in said carbide metal composition;

the replacement of hafnium by any of the said substituent members titanium and zirconium never exceeding the total amount of hafnium present in said carbide metal composition; and wherein when said composition has at least part of its niobium content replaced, or at least part of its hafnium content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when Q is Ta, the compositional limits $Hf_{52}Ta_{14}C_{34}$, $Hf_{52}Ta_{20}C_{28}$, $Hf_{38}Ta_{28}C_{34}$ and $Hf_{33}Ta_{39}C_{28}$ for the ternary figure of the Hf—Ta—C system and $Hf_{30}Nb_{35}C_{35}$, $Hf_{24}Nb_{49}C_{27}$, $Hf_{20}Nb_{15}C_5$ and $Hf_{50}Nb_{23}C_{27}$ for the ternary figure of the H—Nb—C system describe the three dimensional volume;

when the said substituent, Z, is zirconium, the compositional limits, $Hf_{30}Nb_{35}C_{35}$, $Hf_{24}Nb_{49}C_{27}$, $Hf_{50}Nb_{15}C_{35}$ and $Hf_{50}Nb_{23}C_{27}$ for the ternary figure of the Hf—Nb—C system, and $Zr_{52}Nb_7C_{41}$, $Zr_{14}Nb_{45}C_{41}$, $Zr_{10}Nb_{66}C_{24}$, and $Zr_{55}Nb_{21}C_{24}$ for the ternary figure of the Zr—Nb—C system describe the three dimensional volume;

when Z is titanium, the compositional limits $Ti_{55}Nb_7C_{38}$, $Ti_{15}Nb_{47}C_{38}$, $Ti_{11}Nb_{66}C_{23}$, and $Ti_{55}Nb_{22}C_{23}$ for the ternary figure of the Ti—Nb—C system and $Hf_{55}Nb_6C_{39}$, $Hf_{16}Nb_{45}C_{39}$, $Hf_{10}Nb_{66}C_{24}$ and $Hf_{55}Nb_{21}C_{24}$ for the ternary figure of the Hf—Nb—C system describe the three dimensional volume;

the total of the atomic percentages of hafnium, niobium and carbon and the replacements therefor adding up to 100 At. percent.

16. A carbide-metal composition of the elemental formula:

$$Hf_a—(L)_m—Nb_b—(X)_n—C$$

(a) wherein $a$, $m$, $n$, and $b$ are each 1 or 0 and $a+m$ is either 1 or 2, $b+n$ is either 1 or 2 and (b) L is at least one member selected from the group consisting of Ti, Zr, Cr and mixtures thereof;

(c) wherein when L is Cr alone or in combination with any and all of Ti and Zr, the maximum At. percent attributable to Cr is 5 At. percent;

(d) the L content of the composition being within the range of 0 to 52 At. percent;

(e) X is at least one member selected from the group consisting of V, Ta, Mo, W, Cr, and mixtures thereof;

(f) wherein when X is Cr alone or in combination with any and all of V, Ta, Mo, W, the maximum At. percent attributable to Cr is 5 At. percent;

(g) the X content of the composition being within the range of 0 to 49 At. percent;

(h) when X is either Mo or W alone or in combination with each other, or in further combination with any and all of V, Ta, and Cr, the maximum At. percent attributable to Mo or W alone or in combination with each other is 10 At. percent;

(i) the sum of the contents of the Hf and L constituent(s) being within the range of from 24 to 52 At. percent;

(j) the sum of the contents of the Nb and X constituent members being 14 to 49 At. percent;

(k) the Hf content of the composition being within the range of 0 to 52 At. percent;

(l) the Nb content of the composition being within the range of 0 to 49 At. percent;

(m) the total Cr content within said composition never being more than 5 At. percent;

(n) the carbon content of said composition being from about 27 At. percent to about 35 At. percent;

(o) the total At. percent of the compositional $$Hf_a—(L)_m—Nb_b—(X)_n—C$$

being 100 At. percent.

17. A carbide-metal composition of the elemental formula $$Ti_r—(Z)_k—Ta_m—(Q)_n—C$$

wherein titanium is preesnt from about 38 At. percent to about 60 At. percent and tantalum is present from about 5 At. percent to about 39 At. percent carbon is present from about 23 At. percent to about 35 At. percent and $n$, $m$, $r$ and $k$ are 1 or 0, $r+k$ is either 1 or 2, $m+n$ is either 1 or 2, $k+n$ is either 1 or 0; Q is one element selected from the group consisting of V, Nb, Mo, and W; Z is one element selected from the group consisting of Hf and Zr; said Q element, when present, being substituted at least in part for Ta in said composition, and said Z element, when present, being substituted at least in part for titanium in said composition;

whereby said composition falls, when unsubstituted and $n$ and $k$ are 0, and $m$ and $r$ are 1, within the boxed-in area bounded by the compositional limits of $Ti_{60}Ta_5C_{35}$, $Ti_{50}Ta_{15}C_{35}$, $Ti_{38}Ta_{39}C_{23}$ and $Ti_{60}Ta_{17}C_{23}$ in a planar, ternary compositional diagram where the subscripts of the said compositional limits and said diagram are set forth in atomic percentages; and when $n$ is 1, and $r$ is 1, and $k$ is 0 and $m$ is 1 or 0, and Q is present as a substituent selected from among V, Nb, Mo and W, it replaces tantalum as follows:

wherein from 0 up to 10 At. percent of tantalum, but never more than the tantalum content of said composition, is replaced by a Q substituent member selected from the group consisting of tungsten and molybdenum;

from 0 up to the maximum amount of tantalum present in said composition is replaced by a Q substituent member selected from the group consisting of vanadium and niobium;

when $n$ is 0, and $m$ is 1, and $k$ is 1, and $r$ is 1 or 0, and Z is present as a substituent selected from hafnium and zirconium, it replaces titanium as follows:

from 0 up to the maximum amount of titanium present in said composition is replaced by a Z substituent member selected from the group consisting of hafnium and zirconium;

to form substituted carbide-metal compositions from unsubstituted compositions, which unsubstituted compositions' titanium content varies from about 11 to about 66 At. percent, whose carbon content varies from about 23 to about 44 At. percent, and whose tantalum content varies from about 5 At. percent to about 66 At. percent;

the replacement of tantalum by any of the said substituent members, tungsten, molybdenum, vanadium and niobium, never exceeding the total amount of tantalum present in said carbide metal composition;

the replacement of titanium by any of the said substituent members hafnium and zirconium never exceeding the total amount of titanium present in said carbide metal composition; and wherein when said composition has at least part of its tantalum content replaced, or at least part of its titanium content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when the said substituent, Q, is vanadium, the compositional limits $Ti_{60}Ta_5C_{35}$, $Ti_{50}Ta_{15}C_{35}$, $Ti_{38}Ta_{39}C_{23}$ and $Ti_{60}Ta_{17}C_{23}$ for the ternary figure of the Ti—Ta—C system, and $Ti_{57}V_6C_{37}$, $Ti_{38}V_{24}C_{37}$, $Ti_{24.5}V_{51.5}C_{24}$, and $Ti_{60}V_{16}C_{24}$ for the ternary figure of the Ti—V—C system describe the three dimensional volume;

when Q is Nb, the compositional limits $Ti_{60}Ta_5C_{35}$, $Ti_{50}Ta_{15}C_{35}$, $Ti_{38}Ta_{39}C_{23}$ and $Ti_{60}Ta_{17}C_{23}$ for the ternary figure of the Ti—Ta—C system and $Ti_{55}Nb_7C_{38}$, $Ti_{15}Nb_{47}C_{38}$, $Ti_{11}Nb_{66}C_{23}$ and $Ti_{55}Nb_{22}C_{23}$ for the ternary figure of the Ti—Nb—C system describe the three dimensional volume;

when Q is Mo, the compositional limits $Ti_{57}Mo_5C_{38}$, $Ti_{39}Mo_{23}C_{38}$, $Ti_{29}Mo_{46}C_{25}$ and $Ti_{64}Mo_{11}C_{25}$ for the ternary figure of the Ti—Mo—C, system and $Ti_{60}Ta_5C_{35}$, $Ti_{50}Ta_{15}C_{35}$, $Ti_{38}Ta_{39}C_{23}$ and $Ti_{60}Ta_{17}C_{23}$ for the ternary figure of the Ti—Ta—C system describe the three dimensional volume;

when Q is W, the compositional limits $Ti_{62}W_8C_{30}$, $Ti_{51}W_5C_{44}$, $Ti_{30}W_{26}C_{44}$ and $Ti_{15}W_{55}C_{30}$ for the ternary figure of the Ti—W—C system and $Ti_{60}Ta_5C_{35}$, $Ti_{50}Ta_{15}C_{35}$, $Ti_{38}Ta_{39}C_{23}$ and $Ti_{60}Ta_{17}C_{23}$ for the ternary figure of the Ti—Ta—C system describe the three dimensional volumes;

when the said substituent, Z, is zirconium, the compositional limits, $Ti_{60}Ta_5C_{35}$, $Ti_{50}Ta_{15}C_{35}$, $Ti_{38}Ta_{39}C_{23}$ and $Ti_{60}Ta_{17}C_{23}$ for the ternary figure of the Ti—Ta—C system, and $Zr_{52}Ta_{10}C_{38}$, $Zr_{40}Ta_{22}C_{38}$, $Zr_{21.5}Ta_{55}C_{23.5}$, and $Zr_{50.5}Ta_{26}C_{23.5}$ for the ternary figure of the Zr—Ta—C system describe the three dimensional volume;

when Z is hafnium, the compositional limits $Ti_{60}Ta_5C_{35}$, $Ti_{50}Ta_{15}C_{35}$, $Ti_{38}Ta_{39}C_{23}$, and $Ti_{60}Ta_{17}C_{23}$ for the ternary figure o fthe Ti—Ta—C system and $Hf_{57}Ta_5C_{38}$, $Hf_{35}Ta_{27}C_{38}$, $Hf_{23}Ta_{54}C_{23}$, and $Hf_{66}Ta_{11}C_{23}$ for the ternary figure of the Hf—Ta—C system describe the three dimensional volume;

the total of the atomic percentages of titanium, tantalum and carbon and the replacements therefor adding up to 100 At. percent.

18. A carbide-metal composition of the elemental formula:

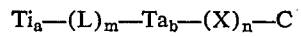

$$Ti_a—(L)_m—Ta_b—(X)_n—C$$

(a) wherein $a$, $m$, $n$, and $b$ are each 1 or 0 and $a+m$ is either 1 or 2, $b+n$ is either 1 or 2 and (b) L is at least one member selected from the group consisting of Hf, Zr, Cr and mixtures thereof;

(c) wherein when L is Cr alone or in combination with any and all of Hf and Zr, the maximum At. percent attributable to Cr is 5 At. percent;

(d) the L content of the composition being within the range of 0 to 66 At. percent;

(e) X is at least one member selected from the group consisting of V, Nb, Mo, W, Cr, and mixtures thereof;

(f) wherein when X is Cr alone or in combination with any and all of V, Nb, Mo, W, the maximum At. percent attributable to Cr is 5 At. percent;

(g) the X content of the composition being within the range of 0 to 66 At. percent;

(h) when X is either Mo or W alone or in combination with each other, or in further combination with any and all of V, Nb, and Cr, the maximum At. percent attributable to Mo or W alone or in combination with each other is 10 At. percent;

(i) the sum of the contents of the Ti and L constituent(s) being within the range of from 11 to 66 At. percent;

(j) the sum of the contents of the Ta and X constituent members being 5 to 66 At. percent;

(k) the Ti content of the composition being within the range of 0 to 66 At. percent;

(l) the Ta content of the composition being within the range of 0 to 66 At. percent;

(m) the total Cr content within said composition never being more than 5 At. percent;

(n) the carbon content of said composition being from about 23 At. percent to about 44 At. percent;

(o) the total At. percent of the compositional $Ti_a—(L)_m—Ta_b—(X)_n—C$ being 100 At. percent.

19. A carbide-metal composition of the elemental formula

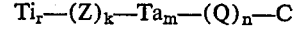

$$Ti_r—(Z)_k—Ta_m—(Q)_n—C$$

wherein titanium is present from about 43 At. percent to about 55 At. percent and tantalum is present from about 13 At. percent to about 29 At. percent carbon is present from about 28 At. percent to about 32 At. percent and $n$, $m$, $r$, and $k$ are 1 or 0, $r+k$ is either 1 or 2, $m+n$ is either 1 or 2, $k+n$ is either 1 or 0; Q is one element selected from the group consisting of V, Nb, Mo, and W; Z is one element selected from the group consisting of Hf and Zr; said Q element, when present, being substituted at least in part for tantalum in said composition, and said Z element, when present, being substituted at least in part for titanium in said composition;

whereby said composition falls, when unsubstituted, and $n$ and $k$ are 0, and $m$ and $r$ are 1, within the boxed-in area bounded by the compositional limits of $Ti_{55}Ta_{13}C_{32}$, $Ti_{47}Ta_{21}C_{32}$, $Ti_{43}Ta_{29}C_{28}$ and $Ti_{55}Ta_{17}C_{28}$ in a planar, ternary compositional diagram where the subscripts of the said compositional limits and said diagram are set forth in atomic percentages; and when $n$ is 1, and $r$ is 1, and $k$ is 0 and $m$ is 1 or 0, and Q is present as a substituent selected from among V, Nb, Mo and W, it replaces tantalum as follows:

wherein from 0 up to 10 At. percent of tantalum, but never more than the tantalum content of said composition, is replaced by a Q substituent member selected from the group consisting of tungsten and molybdenum;

from 0 up to the maximum amount of tantalum present in said composition is replaced by a Q substituent member selected from the group consisting of vanadium and niobium;

when $n$ is 0, and $m$ is 1, and $k$ is 1, and $r$ is 1 or 0, and Z is present as a substituent selected from hafnium and zirconium, it replaces titanium as follows:

from 0 up to the maximum amount of titanium present in said composition is replaced by a Z substituent member selected from the group consisting of hafnium and zirconium;

to form substituted carbide-metal compositions from unsubstituted compositions, which unsubstituted compositions' titanium content varies from about 26 to about 59 At. percent, whose carbon content varies from about 28 to about 40 At. percent, and whose tantalum content varies from about 9 At. percent to about 41 At. percent;

the replacement of tantalum by any of the said substituent members, tungsten, molybdenum, vanadium and niobium, never exceeding the total amount of tantalum present in said carbide metal composition;

the replacement of titanium by any of the said substituent members hafnium and zirconium never exceeding the total amount of titanium present in said carbide metal composition; and wherein when said composition has at least part of its tantalum content replaced, or at least part of its titanium content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when the said substituent, Q is vanadium, the compositional limits $Ti_{55}Ta_{13}C_{32}$, $Ti_{47}Ta_{21}C_{32}$, $Ti_{43}Ta_{29}C_{28}$ and $Ti_{55}Ta_{17}C_{28}$ for the ternary figure of the Ti—Ta—C system, and $Ti_{54}V_{11}C_{35}$, $Ti_{34.5}V_{30.5}C_{35}$, $Ti_{30}V_{40}C_{30}$ and $Ti_{55}V_{15}C_{30}$ for the ternary figure of the Ti—V—C system describe the three dimensional volume;

when Q is Nb, the compositional limits $Ti_{55}Ta_{13}C_{32}$, $Ti_{47}Ta_{21}C_{32}$, $Ti_{43}Ta_{29}C_{28}$ and $Ti_{55}Ta_{17}C_{28}$ for the ternary figure of the Ti—Ta—C system and $Ti_{52}Nb_{14}C_{34}$, $Ti_{34.5}Nb_{31.5}C_{34}$, $Ti_{30}Nb_{41}C_{29}$ and $Ti_{51}Nb_{20}C_{29}$ for the ternary figure of the Ti—Nb—C system describe the three dimensional volume;

when Q is Mo, the compositional limits $Ti_{56}Mo_{9}C_{35}$, $Ti_{43}Mo_{22}C_{35}$, $Ti_{40}Mo_{30}C_{30}$ and $Ti_{59}Mo_{11}C_{30}$ for the ternary figure of the Ti—Mo—C system and $Ti_{55}Ta_{13}C_{32}$, $Ti_{47}Ta_{21}C_{32}$, $Ti_{43}Ta_{29}C_{28}$ and $Ti_{55}Ta_{17}C_{28}$ for the ternary figure of the Ti—Ta—C system describe the three dimensional volume;

when Q is W, the compositional limits $Ti_{46.5}W_{13.5}C_{40}$, $Ti_{29}W_{31}C_{40}$, $Ti_{26}W_{39}C_{35}$ and $Ti_{50}W_{15}C_{35}$ for the ternary figure of the Ti—W—C system and $Ti_{55}Ta_{13}C_{32}$, $Ti_{47}Ta_{21}C_{32}$, $Ti_{43}Ta_{29}C_{28}$ and $Ti_{55}Ta_{17}C_{28}$ for the ternary figure of the Ti—Ta—C system describe the three dimensional volume;

when the said substituent, Z, is zirconium, the compositional limits, $Ti_{55}Ta_{13}C_{32}$, $Ti_{47}Ta_{21}C_{32}$, $Ti_{43}Ta_{29}C_{28}$, and $Ti_{55}Ta_{17}C_{28}$ for the ternary figure of the Ti—Ta—C system, and $Zr_{47}Ta_{18}C_{35}$, $Zr_{39}Ta_{26}C_{35}$, $Zr_{33}Ta_{38}C_{29}$, and $Zr_{46}Ta_{25}C_{29}$ for the ternary figure of the Zr—Ta—C system describe the three dimensional volume;

when Z is hafnium, the compositional limits $Ti_{55}Ta_{13}C_{32}$, $Ti_{47}Ta_{21}C_{32}$, $Ti_{43}Ta_{29}C_{28}$, and $Ti_{55}Ta_{17}C_{28}$ for the ternary figure of the Ti—Ta—C system and $Hf_{52}Ta_{14}C_{34}$, $Hf_{38}Ta_{28}C_{34}$, $Hf_{33}Ta_{39}C_{28}$, and $Hf_{52}Ta_{20}C_{28}$ for the ternary figure of the Hf—Ta—C system describe the three dimensional volume;

the total of the atomic percentages of titanium, tantalum and carbon and the replacements therefore adding up to 100 At. percent.

20. A carbide-metal composition of the elemental formula:

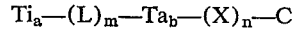

$$Ti_a—(L)_m—Ta_b—(X)_n—C$$

(a) wherein $a$, $m$, $n$, and $b$ are each 1 or 0 and $a+m$ is either 1 or 2, $b+n$ is either 1 or 2 and (b) L is at least one member selected from the group consisting of Hf, Zr, Cr and mixtures thereof;

(c) wherein when L is Cr alone or in combination with any and all of Hf, and Zr, the maximum At. percent attributable to Cr is 5 At. percent;

(d) the L content of the composition being within the range of 0 to 59 At. percent;

(e) X is at least one member selected from the group consisting of V, Nb, Mo, W, Cr, and mixtures thereof;

(f) wherein when X is Cr alone or in combination with any and all of V, Nb, Mo, W, the maximum At. percent attributable to Cr is 5 At. percent;

(g) the X content of the composition being within the range of 0 to 41 At. percent;

(h) when X is either Mo or W alone or in combination with each other, or in further combination with any and all of V, Nb, and Cr, the maximum At. percent attributable to Mo or W alone or in combination with each other is 10 At. percent;

(i) the sum of the contents of the Ti and L constituent(s) being within the range of from 26 to 59 At. percent;

(j) the sum of the contents of the Nb and X constituent members being 9 to 41 At. percent;

(k) the Ti content of the composition being within the range of 0 to 59 At. percent;

(l) the Ta content of the composition being within the range of 0 to 41 At. percent;

(m) the total Cr content within said composition never being more than 5 At. percent;

(n) the carbon content of said composition being from about 28 At. percent to about 40 At. percent;

(o) the total At. percent of the compositional $Ti_a—(L)_m—Ta_b—(X)_n—C$ being 100 At. percent.

21. A carbide-metal composition of the elemental formula $$Zr_r—(Z)_k—Ta_m—(Q)_n—C$$

wherein
   zirconium is present from about 21.5 At. percent to about 52 At. percent and
   tantalum is present from about 10 At. percent to about 55 At. percent
   carbon is present from about 23.5 At. percent to about 38 At. percent
   and $n$, $m$, $r$ and $k$ are 1 or 0, $r+k$ is either 1 or 2 $m+n$ is either 1 or 2, $k+n$ is either 1 or 0; Q is one element selected from the group consisting of V, Nb, Mo, and W; Z is one element selected from the group consisting of Hf and Ti; said Q element, when present, being substituted at least in part for Ta in said composition, and said Z element, when present, being substituted at least in part for zirconium is said composition;
   whereby said composition falls, when unsubstituted, and $n$ and $k$ are 0, and $m$ and $r$ are 1, within the boxed-in area bounded by the compositional limits of $Zr_{52}Ta_{10}C_{38}$, $Zr_{40}Ta_{22}C_{38}$, $Zr_{21.5}Ta_{55}C_{23.5}$ and $Zr_{50.5}Ta_{26}C_{23.5}$ in a planar, ternary compositional diagram where the subscripts of the said compositional limits and said diagram are set forth in atomic percentages; and
   when $n$ is 1, and $r$ is 1, and $k$ is 0, and $m$ is 1 or 0, and Q is present as a substituent selected from among V, Nb, Mo and W, it replaces tantalum as follows:
   wherein from 0 up to 10 At. percent of Ta but never more than the Ta content of said composition, is replaced by a Q substituent member selected from the group consisting of tungsten and molybdenum;
   from 0 up to the maximum amount of Ta present in said composition is replaced by a Q substituent member selected from the group consisting of vanadium and niobium;
   when $n$ is 0, and $m$ is 1, and $k$ is 1, and $r$ is 1 or 0 and Z is present as a substituent selected from hafnium and titanium, it replaces zirconium as follows:
   from 0 up to the maximum amount of zirconium present in said composition is replaced by a Z substituent member selected from the group consisting of hafnium and titanium;
   to form substituted carbide-metal compositions from unsubstituted compositions, which unsubstituted compositions zirconium content varies from about 10 to about 66 At. percent, whose carbon content varies from about 23 to about 41 At. percent, and whose tantalum content varies from about 5 At. percent to about 66 At. percent;
   the replacement of tantalum by any of the said substituent members, tungsten, molybdenum, vanadium and niobium, never exceeding the total amount of tantalum present in said carbide metal composition;
   the replacement of zirconium by any of the said substituent members hafnium and titanium never exceeding the total amount of zirconium present in said carbide metal composition; and
   wherein when said composition has at least part of its tantalum content replaced, or at least part of its zirconium content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:
   when Q is Nb, the compositional limits $Zr_{52}Ta_{10}C_{38}$, $Zr_{40}Ta_{22}C_{38}$, $Zr_{21.5}Ta_{55}C_{23.5}$ and $Zr_{50.5}Ta_{26}C_{23.5}$ for the ternary figure of the Zr—Ta—C system and $Zr_{52}Nb_7C_{41}$, $Zr_{14}Nb_{45}C_{41}$, $Zr_{10}Nb_{66}C_{24}$ and $$Zr_{55}Nb_{21}C_{24}$$

for the ternary figure of the Zr—Nb—C system describe the three dimensional volume;
   when the said substituent Z, is titanium, the compositional limits, $Ti_{60}Ta_5C_{35}$, $Ti_{50}Ta_{15}C_{35}$, $Ti_{38}Ta_{39}C_{23}$, and $Ti_{60}Ta_{17}C_{23}$ for the ternary figure of the Ti—Ta—C system, and $Zr_{40}Ta_{22}C_{38}$, $Zr_{21.5}Ta_{55}C_{23.5}$, $Zr_{50.5}Ta_{26}C_{23.5}$, and $Zr_{52}Ta_{10}C_{38}$ for the ternary figure of the Zr—Ta—C system describe the three dimensional volume;
   when Z is hafnium, the compositional limits $$Zr_{52}Ta_{10}C_{38}$$

$Zr_{40}Ta_{22}C_{38}$, $Zr_{21.5}Ta_{55}C_{23.5}$, and $Zr_{50.5}Ta_{26}C_{23.5}$ for the ternary figure of the Zr—Ta—C system and $Hf_{57}Ta_5C_{38}$, $Hf_{35}Ta_{27}C_{38}$, $Hf_{23}Ta_{54}C_{23}$, and $$Hf_{66}Ta_{11}C_{23}$$

for the ternary figure of the Hf—Ta—C system describe the three dimensional volume;
   the total of the atomic percentages of zirconium, tantalum and carbon and the replacements therefor adding up to 100 At. percent.

22. A carbide-metal composition of the elemental formula:

$$Zr_a—(L)_m—Ta_b—(X)_n—C$$

(a) wherein $a$, $m$, $n$, and $b$ are each 1 or 0 and $a+m$ is either 1 or 2, $b+n$ is either 1 or 2 and
   (b) L is at least one member selected from the group consisting of Hf, Ti, Cr and mixtures thereof;
   (c) wherein when L is Cr alone or in combination with any and all of Hf, and Ti, the maximum At. percent attributable to Cr is 5 At. percent;
   (d) the L content of the composition being within the range of 0 to 66 At. percent;
   (e) X is at least one member selected from the group consisting of V, Nb, Mo, W, Cr, and mixtures thereof;
   (f) wherein when X is Cr alone or in combination with any and all of V, Nb, Mo, W, the maximum At. percent attributable to Cr is 5 At. percent;
   (g) the X content of the composition being within the range of 0 to 66 At. percent;
   (h) when X is either Mo or W alone or in combination with each other, or in further combination with any and all of V, Nb, and Cr, the maximum At. percent attributable to Mo or W alone or in combination with each other is 10 At. percent;
   (i) the sum of the contents of the Zr and L constituent(s) being within the range of from 10 to 66 At. percent;
   (j) the sum of the contents of the Ta and X constituent members being 5 to 66 At. percent;
   (k) the Zr content of the composition being within the range of 0 to 66 At. percent;
   (l) the Ta content of the composition being within the range of 0 to 66 At. percent;
   (m) the total Cr content within said composition never being more than 5 At. percent;
   (n) the carbon content of said composition being from about 23 At. percent to about 41 At. percent;
   (o) the total At. percent of the compositional $Zr_a—(L)_m—Ta_b—(X)_n—C$ being 100 At. percent.

23. A carbide-metal composition of the elemental formula $$Zr_r—(Z)_k—Ta_m—(Q)_n—C$$

wherein
   zirconium is present from about 33 At. percent to about 47 At. percent and
   tantalum is present from about 18 At. percent to about 38 At. percent carbon is present from about 29 At. percent to about 35 At. percent and $n$, $m$, $r$ and $k$ are 1 or 0, $r+k$ is either 1 or 2, $m+n$ is either 1 or 2, $k+n$ is either 1 or 0; Q is one element selected from the group consisting of V, Nb, Mo, and W; Z is one element selected from the group consisting of Hf and Ti; said Q element, when present, being substituted at least in part for Ta in said composition, and said Z element, when present, being substituted at least in part for Zr in said composition;

whereby said composition falls, when unsubstituted, and $n$ and $k$ are 0, and $m$ and $r$ are 1, within the boxed-in area bounded by the compositional limits of $$Zr_{47}Ta_{18}C_{35}, Zr_{39}Ta_{26}C_{35}, Zr_{33}Ta_{38}C_{29}$$
$$\text{and } Zr_{46}Ta_{25}C_{29}$$

in a planar, ternary compositional diagram where the subscripts of the said compositional limits and said diagram are set forth in atomic percentages; and where $n$ is 1, and $r$ is 1, and $k$ is 0, and $m$ is 1 or 0, and Q is present as a substituent selected from among V, Nb, Mo and W, it replaces Ta as follows: wherein from 0 up to 10 At. percent of Ta, but never more than the Ta content of said composition, is replaced by a Q substituent member selected from the group consisting of tungsten and molybdenum;

from 0 up to the maximum amount of Ta present in said composition is replaced by a Q substituent member selected from the group consisting of vanadium and Nb;

when $n$ is 0, and $m$ is 1, and $k$ is 1, and $r$ is 1 or 0 and Z is present as a substituent selected from hafnium and titanium, it replaces zirconium as follows:

from 0 up to the maximum amount of Zr present in said composition is replaced by a Z substituent member selected from the group consisting of hafnium and Ti;

to form substituted carbide-metal compositions from unsubstituted compositions, which unsubstituted compositions' Zr content varies from about 31 to about 55 At. percent, whose carbon content varies from about 28 to about 35 At. percent, and whose Ta content varies from about 13 At. percent to about 39 At. percent;

the replacement of Ta by any of the said substituent members, tungsten, molybdenum, vanadium and Nb, never exceeding the total amount of Ta present in said carbide metal composition;

the replacement of Zr by any of the said substituent members hafnium and Ti never exceeding the total amount of Zr present in said carbide metal composition; and wherein when said composition has at least part of its Ta content replaced, or at least part of its Zr content replaced, the substituted compositional volume generated by the three dimensional joining of all of the individual boxed-in areas of the respective ternary figures, which figures depict the ternary syestems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when Q is Nb, the compositional limits $$Zr_{47}Ta_{18}C_{35}, Zr_{39}Ta_{26}C_{35}, Zr_{33}Ta_{38}C_{29}$$
$$\text{and } Zr_{46}Ta_{25}C_{29}$$

for the ternary figure of the Zr—Ta—C system and $$Zr_{50}Nb_{15}C_{35}, Zr_{31}Nb_{34}C_{35}, Zr_{31}Nb_{39}C_{30}$$
$$\text{and } Zr_{51}Nb_{19}C_{30}$$

for the ternary figure of the Zr—Nb—C system describe the three dimensional volume;

when the said substituent, Z, is Ti, the compositional limits, $$Ti_{55}Ta_{13}C_{32}, Ti_{47}Ta_{21}C_{32}, Ti_{43}Ta_{29}C_{28}$$
$$\text{and } Ti_{55}Ta_{17}C_{28}$$

for the ternary figure of the Ti—Ta—C system, and $$Zr_{47}Ta_{18}C_{35}, Zr_{39}Ta_{26}C_{35}, Zr_{33}Ta_{38}C_{29}$$
$$\text{and } Zr_{46}Ta_{25}C_{29}$$

for the ternary figure of the Zr—Ta—C system describe the three dimensional volume;

when Z is hafnium, the compositional limits $$Zr_{47}Ta_{18}C_{35}, Zr_{39}Ta_{26}C_{35}, Zr_{33}Ta_{38}C_{29}$$
$$\text{and } Zr_{46}Ta_{25}C_{29}$$

for the ternary figure of the Zr—Ta—C system and $$Hf_{52}Ta_{14}C_{34}, Hf_{38}Ta_{28}C_{34}, Hf_{33}Ta_{39}C_{28}$$
$$\text{and } Hf_{52}Ta_{20}C_{28}$$

for the ternary figure of the Hf—Ta—C system describe the three dimensional volume;

the total of the atomic percentages of zirconium, tantalum and carbon and the replacements therefor adding up to 100 At. percent.

24. A carbide-metal composition of the elemental formula:

$$Zr_a—(L)_m—Ta_b—(X)_n—C$$

(a) wherein $a$, $m$, $n$, and $b$ are each 1 or 0 and $a+m$ is either 1 or 2, $b+n$ is either 1 or 2 and
(b) L is at least one member selected from the group consisting of Hf, Ti, Cr and mixtures thereof;
(c) wherein when L is Cr alone or in combination with any and all of Hf and Ti, the maximum At. percent attributable to Cr is 5 At. percent;
(d) the L content of the composition being within the range of 0 to 55 At. percent;
(e) X is at least one member selected from the group consisting of V, Nb, Mo, W, Cr, and mixtures thereof;
(f) wherein when X is Cr alone or in combination with any and all of V, Nb, Mo, W, the maximum At. percent attributable to Cr is 5 At. percent;
(g) the X content of the composition being within the range of 0 to 39 At. percent;
(h) when X is either Mo or W alone or in combination with each other, or in further combination with any and all of V, Nb, and Cr, the maximum At. percent attributable to Mo or W alone or in combination with each other is 10 At. percent;
(i) the sum of the contents of the Zr and L consituent(s) being within the range of from 31 to 55 At. percent;
(j) the sum of the contents of the Ta and X consituent members being 13 to 39 At. percent;
(k) the Zr content of the composition being within the range of 0 to 55 At. percent;
(l) the Ta content of the composition being within the range of 0 to 39 At. percent;
(m) the total Cr content within said composition never being more than 5 At. percent;
(n) the carbon content of said composition being from about 28 At. percent to about 35 At. percent;
(o) the total At. percent of the compositional
$$Zr_a—(L)_m—Ta_b—(X)_n—C$$
being 100 At. percent.

25. A carbide-metal composition of the elemental formula $$Hf_r—(Z)_k—Ta_m—(Q)_n—C$$

wherein hafnium is present from about 23 At. percent to about 66 At. percent and tantalum is present from about 5 At. percent to about 54 At. percent carbon is present from about 23 At. percent to about 38 At. percent and $n$, $m$, $r$ and $k$ are 1 or 0, $r+k$ is either 1 or 2, $m+n$ is either 1 or 2, $k+n$ is either 1 or 0; Q is one element selected from the group consisting of V, Nb, Mo, and W; Z is one element selected from the group consisting of Ti and Zr; said Q element, when present, being substituted at least in part for Ta in said composition, and said Z element, when present, being substituted at least in part for Hf in said composition;

whereby said composition falls, when unsubstituted, and $n$ and $k$ are 0, and $m$ and $r$ are 1, within the boxed-in area bounded by the compositional limits of $Hf_{57}Ta_5C_{38}$, $Hf_{35}Ta_{27}C_{38}$, $Hf_{23}Ta_{54}C_{23}$ and $Hf_{66}Ta_{11}C_{23}$ in a planar, ternary compositional diagram where the subscripts of the said compositional limits and said diagram are set forth in atomic percentages; and when n is 1, and r is 1, and k is 0, and m is 1 or 0, and Q is present as a substituent selected from among V, Nb, Mo and W, it replaces Ta as follows:

wherein from 0 up to 10 At. percent of Ta, but never more than the Ta content of said composition, is replaced by a Q substituent member selected from the group consisting of tungsten and molybdenum;

from 0 up to the maximum amount of Ta present in said composition is replaced by a Q substituent member selected from the group consisting of vanadium and Nb;

when $n$ is 0, and $m$ is 1, and $k$ is 1, and $r$ is 1 or 0 and Z is present as a substituent selected from Ti and zirconium, it replaces Hf as follows:

from 0 up to the maximum amount of Hf present in said composition is replaced by a Z substituent member selected from the group consisting of Ti and zirconium;

to form substituted carbide-metal compositions from unsubstituted compositions, which unsubstituted compositions' Hf content varies from about 10 to about 66 At. percent, whose carbon content varies from about 23 to about 39 At. percent, and whose Ta content varies from about 5 At. percent to about 66 At. percent;

the replacement of Ta by any of the said substituent members, tungsten, molybdenum, vanadium and Nb, never exceeding the total amount of Ta present in said carbide metal composition;

the replacement of Hf by any of the said substituent members Ti and zirconium never exceeding the total amount of Hf present in said carbide metal composition; and wherein when said composition has at least part of its Ta content replaced, or at least part of its Hf content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when Q is Nb, the compositional limits $Hf_{57}Ta_5C_{38}$, $Hf_{35}Ta_{27}C_{38}$, $Hf_{23}Ta_{54}C_{23}$ and $Hf_{66}Ta_{11}C_{23}$ for the ternary figure of the Hf—Ta—C system and $Hf_{55}Nb_6C_{39}$, $Hf_{16}Nb_{45}C_{39}$, $Hf_{10}Nb_{66}C_{24}$ and $Hf_{55}Nb_{21}C_{24}$ for the ternary figure of the Hf—Nb—C system described the three dimensional volume;

when the said substituent, Z, is zirconium, the compositional limits, $Hf_{57}Ta_5C_{38}$, $Hf_{35}Ta_{27}C_{38}$, $Hf_{23}Ta_{54}C_{23}$, and $Hf_{66}Ta_{11}C_{23}$ for the ternary figure of the Hf—Ta—C system, and $Zr_{52}Ta_{10}C_{38}$, $Zr_{40}Ta_{22}C_{38}$, $Zr_{21.5}Ta_{55}C_{23.5}$ and $Zr_{50.5}Ta_{26}C_{23.5}$ for the ternary figure of the Zr—Ta—C system described the three dimensional volume;

when Z is Ti, the compositional limits $Ti_{60}Ta_5C_{35}$, $Ti_{50}Ta_{15}C_{35}$, $Ti_{38}Ta_{39}C_{23}$, and $Ti_{60}Ta_{17}C_{23}$ for the ternary figure of the Ti—Ta—C system and $$Hf_{57}Ta_5C_{38}, Hf_{35}Ta_{27}C_{38}, Hf_{23}Ta_{54}C_{23}$$

and $Hf_{66}Ta_{11}C_{23}$ for the ternary figure of the Hf—Ta—C system describe the three dimensional volume;

the total of the atomic percentages of hafnium, tantalum and carbon and the replacements therefor adding up to 100 At. percent.

26. A carbide-metal composition of the elemental formula:

$$Hf_a—(L)_m—Ta_b—(X)_n—C$$

(a) wherein $a$, $m$, $n$, and $b$ are each 1 or 0 and $a+m$ is either 1 or 2, $b+n$ is either 1 or 2 and (b) L is at least one member selected from the group consisting of Ti, Zr, Cr and mixtures thereof;

(c) wherein when L is Cr alone or in combination with any and all of Ti, and Zr, the maximum At. percent attributable to Cr is 5 At. percent;

(d) the L content of the composition being within the range of 0 to 66 At. percent;

(e) X is at least one member selected from the group consisting of V, Nb, Mo, W, Cr, and mixtures thereof;

(f) wherein when X is Cr alone or in combination with any and all of V, Nb, Mo, W, the maximum At. percent attributable to Cr is 5 At. percent;

(g) the X content of the composition being within the range of 0 to 66 At. percent;

(h) when X is either Mo or W alone or in combination with each other, or in further combination with any and all of V, Nb, and Cr, the maximum At. percent attributable to Mo or W alone or in combination with each other is 10 At. percent;

(i) the sum of the contents of the Hf and L constituents(s) being within the range of from 10 to 66 At. percent;

(j) the sum of the contents of the Ta and X constituent members being 5 to 66 At. percent;

(k) the Hf content of the composition being within the range of 0 to 66 At. percent;

(l) the Ta content of the composition being within the range of 0 to 66 At. percent;

(m) the total Cr content within said composition never being more than 5 At. percent;

(n) the carbon content of said composition being from about 23 At. percent to about 39 At. percent;

(o) the total At. percent of the compositional $$Hf_a—(L)_m—Ta_b—(X)_n—C$$

being 100 At. percent.

27. A carbide-metal composition of the elemental formula $$Hf_r—(Z)_k—Ta_m—(Q)_n—C$$

wherein hafnium is present from about 33 At. percent to about 52 At. percent and tantalum is present from about 14 At. percent to about 39 At. percent carbon is present from about 28 At. percent to about 34 At. percent and $n$, $m$, $r$ and $k$ are 1 or 0, $r+k$ is either 1 or 2, $m+n$ is either 1 or 2, $k+n$ is either 1 or 0; Q is one element selected from the group consisting of V, Nb, Mo, and W; Z is one element selected from the group consisting of Ti and Zr; said Q element, when present, being substituted at least in part for Ta in said composition, and said Z element, when present, being substituted at least in part for Hafnium in said composition;

whereby said composition falls, when unsubstituted, and $n$ and $k$ are 0, and $m$ and $r$ are 1, within the boxed in area bounded by the compositional limits of $Hf_{52}Ta_{14}C_{34}$, $Hf_{38}Ta_{28}C_{34}$, $Hf_{33}Ta_{39}C_{28}$ and $Hf_{52}Ta_{20}C_{28}$ in a planar, ternary compositional diagram where the subscripts of the said compositional limits and said diagram are set forth in atomic percentages; and when $n$ is 1, and $r$ is 1, and $k$ is 0, and $m$ is 1 or 0, and Q is present as a substituent selected from among V, Nb, Mo and W, it replaces Ta as follows:

wherein from 0 up to 10 At. percent of Ta, but never more than the Ta content of said composition, is replaced by a Q substitutent member selected from the group consisting of tungsten and molybdenum;

from 0 up to the maximum amount of Ta present in said composition is replaced by a Q substituent member selected from the group consisting of vanadium and niobium;

when $n$ is 0, and $m$ is 1, and $k$ is 1, and $r$ is 1 or 0 and Z is present as a substituent selected from titanium and zirconium, it replaces hafnium as follows:

from 0 up to the maximum amount of hafnium present in said composition is replaced by a Z substituent member selected from the group consisting of titanium and zirconium;

to form substituted carbide-metal compositions from unsubstituted compositions, which unsubstituted compositions' hafnium content varies from about 24 to about 55 At. percent, whose Carbon content varies from about 27 to about 35 At. percent, and whose tantalum content varies from about 13 At. percent to about 49 At. percent;

the replacement of tantalum by any of the said substituent members, tungsten, molybdenum, vanadium and Niobium, never exceeding the total amount of tantalum present in said carbide metal composition;

the replacement of hafnium by any of the said substituent members titanium and zirconium never exceeding the total amount of hafnium present in said carbide metal composition; and wherein when said composition has at least part of its tantalum content replaced, or at least part of its hafnium content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when Q is Nb, the compositional limits $Hf_{52}Ta_{14}C_{34}$, $Hf_{38}Ta_{28}C_{34}$, $Hf_{33}Ta_{39}C_{28}$ and $Hf_{52}Ta_{20}C_{28}$ for the ternary figure of the Hf—Ta—C system and $Hf_{50}Nb_{15}C_{35}$, $Hf_{30}Nb_{35}C_{35}$, $Hf_{24}Nb_{49}C_{27}$ and $Hf_{50}Nb_{23}C_{27}$ for the ternary figure of the Hf—Nb—C system describe the three dimensional volume;

when the said substituent, Z, is Zirconium, the compositional limits, $Hf_{52}Ta_{14}C_{34}$, $Hf_{38}Ta_{28}C_{34}$, $Hf_{33}Ta_{39}C_{28}$, and $Hf_{52}Ta_{20}C_{28}$ for the ternary figure of the Hf—Ta—C system, and $Zr_{47}Ta_{18}C_{35}$, $Zr_{39}Ta_{26}C_{35}$, $Zr_{33}Ta_{38}C_{29}$, and $Zr_{46}Ta_{25}C_{29}$ for the ternary figure of the Zr—Ta—C system describe the three dimensional volume;

when Z is titanium, the compositional limits $Ti_{55}Ta_{13}C_{32}$, $Ti_{47}Ta_{21}C_{32}$, $Ti_{43}Ta_{29}C_{28}$, and $Ti_{55}Ta_{17}C_{28}$ for the ternary figure of the Ti—Ta—C system and $Hf_{52}Ta_{14}C_{34}$, $Hf_{38}Ta_{28}C_{34}$, $Hf_{33}Ta_{39}C_{28}$ and $Hf_{52}Ta_{20}C_{28}$ for the ternary figure of the Hf—Ta—C system describe the three dimensional volume;

the total of the atomic percentages of hafnium, tantalum and carbon and the replacements therefor adding up to 100 At. percent.

28. A carbide-metal composition of the elemental formula:

$$Hf_a—(L)_m—Ta_b—(X)_n—C$$

(a) wherein $a$, $m$, $n$, and $b$ are each 1 or 0 and $a+m$ is either 1 or 2, $b+n$ is either 1 or 2 and
(b) L is at least one member selected from the group consisting of Ti, Zr, Cr and mixtures thereof;
(c) wherein when L is Cr alone or in combination with any and all of Ti, and Zr, the maximum At. percent attributable to Cr is 5 At. percent;
(d) the L content of the composition being within the range of 0 to 55 At. percent;
(e) X is at least one member selected from the group consisting of V, Nb, Mo, W, Cr, and mixtures thereof;
(f) wherein when X is Cr alone or in combination with any and all of V, Nb, Mo, W, the maximum At. percent attributable to Cr is 5 At. percent;
(g) the X content of the composition being within the range of 0 to 49 At. percent;
(h) when X is either Mo or W alone or in combination with each other, or in further combination with any and all of V, Nb, and Cr, the maximum At. percent attributable to Mo or W alone or in combination with each other is 10 At. percent;
(i) the sum of the contents of the Hf and L constituent(s) being within the range of from 24 to 55 At. percent;
(j) the sum of the contents of the Ta and X constituent members being 13 to 49 At. percent;
(k) the Hf content of the composition being within the range of 0 to 55 At. percent;
(l) the Ta content of the composition being within the range of 0 to 49 At. percent;
(m) the total Cr content within said composition never being more than 5 At. percent;
(n) the carbon content of said composition being from about 27 At. percent to about 35 At. percent;
(o) the total At. percent of the compositional $Hf_a—(L)_m—Ta_b—(X)_n—C$ being 100 At. percent.

29. A carbide metal composition of the elemental formula $$Nb_r—(Z)_k—Mo_m—(Q)_n—C$$

wherein niobium is present from about 24 At. percent to about 56 At. percent and
molybdenum is present from about 8 At. percent to about 51 At. percent
carbon is present from about 25 At. percent to about 36 At. percent
and $n$, $m$, $r$ and $k$ are 1 or 0, $r+k$ is either 1 or 2, $m+n$ is either 1 or 2, $k+n$ is either 1 or 0; Q is tungsten; Z is one element selected from the group consisting of Ti, Zr, Hf, V, and Ta; said Q element, when present, being substituted at least in part for molybdenum in said composition, and said Z element, when present, being substituted at least in part for niobium in said composition;
whereby said composition falls, when unsubstituted, and $n$ and $k$ are 0 and $m$ and $r$ are 1, within the boxed-in area bounded by the compositional limits of $Nb_{56}Mo_8C_{36}$, $Nb_{36}Mo_{28}C_{36}$, $Nb_{24}Mo_{51}C_{25}$ and $Nb_{55}Mo_{20}C_{25}$ in a planar, ternary compositional diagram where the subscripts of the said compositional limits and said diagram are set forth in atomic percentages; and
when $n$ is 1, and $r$ is 1, and $k$ is 0, and $m$ is 1 or 0, and Q is present, and tungsten is the substituent, it replaces molybdenum as follows:
wherein from 0 up to the maximum amount of molybdenum, but never more than the molybdenum content of said composition is replaced by the substituent tungsten;

when $n$ is 0, and $m$ is 1, and $k$ is 1, and $r$ is 1 or 0, and Z is present, as a substituent, it replaces niobium as follows:

from 0 up to 20 At. percent of the niobium present in said composition, but never more than the niobium content of said composition, is replaced by a Z substituent member selected from the group consisting of Ti, Zr, and Hf;

from 0 up to the maximum amount of the niobium present in said composition, but never more than the niobium content of said composition, is replaced by a Z substituent member selected from the group consisting of vanadium and tantalum to form substituted carbide-metal compositions from unsubstituted compositions, which unsubstituted compositions' niobium content varies from about 24 to about 64 At. percent, whose carbon content varies from about 25 to about 38 At. percent, and whose molybdenum content varies from about 5 At. percent to about 51 At. percent;

wherein when said composition has at least part of its niobium content replaced, or at least part of its molybdenum content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when the said substituent Z, is titanium, the compositional limits $Ti_{57}Mo_5C_{38}$, $Ti_{39}Mo_{23}C_{38}$, $Ti_{29}Mo_{46}C_{25}$ and $Ti_{64}Mo_{11}C_{25}$ for the ternary figure of the Ti—Mo—C system, and $Nb_{56}Mo_8C_{36}$, $Nb_{36}Mo_{28}C_{36}$, $Nb_{24}Mo_{51}C_{25}$ and $Nb_{55}Mo_{20}C_{25}$ for the ternary figure of the Nb—Mo—C system describe the three dimensional volume;

when the said substituent Q is tungsten, the compositional limits $Nb_{56}W_8C_{36}$, $Nb_{33}W_{31}C_{36}$, $Nb_{25}W_{49}C_{26}$ and $Nb_{52}W_{22}C_{26}$ for the ternary figure of the Nb—W—C system and $Nb_{56}Mo_8C_{36}$, $Nb_{36}Mo_{28}C_{36}$ $Nb_{24}Mo_{51}C_{25}$ and $Nb_{55}Mo_{20}C_{25}$ for the ternary figure of the Nb—Mo—C system describe the three dimensional volume;

the total of the atomic percentages of niobium, molybdenum and carbon and the replacements therefore adding up to 100 At. percent.

30. A carbide-metal composition of the elemental formula:

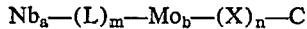

(a) wherein $a$, $m$, $n$, and $b$ are each 1 or 0, and $a+n$ is either 1 or 2, $b+n$ is either 1 or 2 and (b) L is at least one member selected from the group consisting of Ti, Hf, Zr, Cr, V, Ta and mixtures thereof;

(c) wherein when L is Cr alone or in combination with any and all of Ti, Hf, Zr, V and Ta the maximum At. percent attributable to Cr is 5 At. percent;

(d) wherein when L is either Ti, Zr, and Hf and mixtures thereof, in combination with each other, or in further combination with any and all of V, Ta and Cr, the maximum At. percent attributable to Ti, Zr, Hf either alone or in combination with each other is 20 At. percent;

(e) the L content of the composition being within the range of 0 to about 64 At. percent;

(f) X is at least one member from the group consisting of W, and Cr, and mixtures thereof;

(g) wherein when X is Cr alone or in combination with W, the maximum At. percent attributable to Cr is 5 At. percent;

(h) the X content of the composition being within the range of 0 to about 51 At. percent;

(i) the sum of the contents of the Nb and L constituent(s) being within the range from about 24 to about 64 At. percent;

(j) the sum of the contents of the Mo and X constituent members being within the range of from about 5 At. percent to about 51 At. percent;

(k) the Nb content of the composition being within the range of 0 to about 64 At. percent;

(l) the Mo content of the composition being within the range of 0 to about 51 At. percent;

(m) the total Cr content within said composition never being more than 5 At. percent;

(n) the carbon content of said composition being from about 25 At. percent to about 38 At. percent;

(o) the total At. percent of the composition

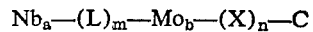

being 100 At. percent.

31. A carbide metal composition of the elemental formula

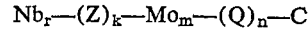

wherein niobium is present from about 32 At. percent to about 47 At. percent and molybdenum is present from about 19 At. percent to about 39 At. percent carbon is present from about 29 At. percent to about 34 At. percent and $n$, $m$, $r$ and $k$ are 1 or 0, $r+k$ is either 1 or 2, $m+n$ is either 1 or 2, $k+n$ is either 1 or 0; Q is tungsten; Z is one element selected from the group consisting of Ti, Zr, Hf, V, and Ta; said Q element, when present, being substituted at least in part for molybdenum in said composition, and said Z element, when present being substituted at least in part for niobium in said composition;

whereby said composition falls, when unsubstituted, and $n$ and $k$ are 0 and $m$ and $r$ are 1, within the boxed-in area bounded by the compositional limits of $Nb_{47}Mo_{19}C_{34}$, $Nb_{37}Mo_{29}C_{34}$, $Nb_{32}Mo_{39}C_{29}$ and $Nb_{46}Mo_{25}C_{29}$ in a planar, ternary compositional diagram where the subscripts of the said compositional limits and said diagram are set forth in atomic percentages; and when $n$ is 1, and $r$ is 1, and $k$ is 0, and $m$ is 1 or 0, and Q is present, and tungsten is the substituent, it replaces molybdenum as follows:

wherein from 0 up to the maximum amount of molybdenum, but never more than the molybdenum content of said composition is replaced by the substituent tungsten;

when $n$ is 0, and $m$ is 1, and $k$ is 1, and $r$ is 1 or 0, and Z is present, as a substituent, it replaces niobium as follows:

from 0 up to 20 At. percent of the niobium present in said composition, but never more than the niobium content of said composition, is replaced by a Z substituent member selected from the group consisting of Ti, Zr, and Hf;

from 0 up to the maximum amount of the niobium present in said composition, but never more than the niobium content of said composition, is replaced by a Z substituent member selected from the group consisting of vanadium and tantalum to form substituted carbide-metal compositions from unsubstituted compositions, which unsubstituted compositions' niobium content varies from about 28 to about 59 At. percent, whose carbon content varies from about 29 to about 35 At. percent, and whose molybdenum content varies from about 9 At. percent to about 43 At. percent;

wherein when said composition has at least part of its niobium content replaced, or at least part of its molybdenum content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when the said substituent Z, is titanium, the compositional limits $Ti_{56}Mo_9C_{35}$, $Ti_{43}Mo_{22}C_{35}$, $Ti_{40}Mo_{30}C_{30}$ and $Ti_{59}Mo_{11}C_{30}$ for the ternary figure of the Ti—Mo—C system, and $Nb_{47}Mo_{19}C_{34}$, $Nb_{37}Mo_{29}C_{34}$, $Nb_{32}Mo_{39}C_{29}$ and $Nb_{46}Mo_{25}C_{29}$ for the ternary figure of the Nb—Mo—C system describe the three dimensional volume;

when the said substituent Q is tungsten, the compositional limits $Nb_{46}W_{21}C_{33}$, $Nb_{31}W_{36}C_{33}$, $Nb_{28}W_{43}C_{29}$ and $Nb_{44}W_{27}C_{29}$ for the ternary figure of the Nb—W—C system and $Nb_{47}Mo_{19}C_{34}$, $Nb_{37}Mo_{29}C_{34}$, $Nb_{32}Mo_{39}C_{29}$ and $Nb_{46}Mo_{25}C_{29}$ for the ternary figure of the Nb—Mo—C system describe the three dimensional volume;

the total of the atomic percentages of niobium, molybdenum and carbon and the replacements therefore adding up to 100 At. percent.

32. A carbide-metal composition of the elemental formula:

$$Nb_a—(L)_m—Mo_b—(X)_n—C$$

(a) wherein $a$, $m$, $n$, and $b$ are each 1 or 0, and $a+m$ is either 1 or 2, $b+n$ is either 1 or 2 and (b) L is at least one member selected from the group consisting of Ti, Hf, Zr, Cr, V, Ta and mixtures thereof;

(c) wherein when L is Cr alone or in combination with any and all of the Ti, Hf, Zr, V and Ta the maximum At. percent attributable to Cr is 5 At. percent;

(d) wherein when L is either Ti, Zr, and Hf and mixtures thereof, in combination with each other, or in further combination with any and all of V, Ta and Cr, the maximum At. percent attributable to Ti, Zr, Hf either alone or in combination with each other is 20 At. percent;

(e) the L content of the composition being within the range of 0 to about 59 At. percent;

(f) X is at least one member selected from the group consisting of W, and Cr, and mixtures thereof;

(g) wherein when X is Cr alone or in combination with W, the maximum At. percent attributable to Cr is 5 At. percent;

(h) the X content of the composition being within the range of 0 to about 43 At. percent;

(i) the sum of the contents of the Nb and L constituent(s) being within the range from about 28 to 59 At. percent;

(j) the sum of the contents of the Mo and X constituent members being within the range of from about 9 At. percent to about 43 At. percent;

(k) the Nb content of the composition being within the range of 0 to about 59 At. percent;

(l) the Mo content of the composition being within the range of 0 to about 43 At. percent;

(m) the total Cr content within said composition never being more than 5 At. percent;

(n) the carbon content of said composition being from about 29 At. percent to about 35 At. percent;

(o) the total At. percent of the composition $$Nb_a—(L)_m—Mo_b—(X)_n—C$$

being 100 At. percent.

33. A carbide metal composition of the elemental formula $$Nb_r—(Z)_k—W_m—(Q)_n—C$$

wherein niobium is present from about 25 At. percent to about 56 At. percent and tungsten is present from about 8 At. percent to about 49 At. percent carbon is present from about 26 At. percent to about 36 At. percent and $n$, $m$, $r$ and $k$ are 1 or 0, $r+k$ is either 1 or 2, $m+n$ is either 1 or 2, $k+n$ is either 1 or 0; Q is molybdenum; Z is one element, selected from the group consisting of Ti, Zr, Hf, V, and Ta; said Q element, when present, being substituted at least in part for tungsten in said composition, and said Z element, when present being substituted at least in part for niobium in said composition;

whereby said composition falls, when unsubstituted, and $n$ and $k$ are 0 and $m$ and $r$ are 1, within the boxed-in area bounded by the compositional limits of $$Nb_{56}W_8C_{36}$$

$Nb_{33}W_{31}C_{36}$, $Nb_{25}W_{49}C_{26}$ and $Nb_{52}W_{22}C_{26}$ in a planar, ternary compositional diagram where the subscripts of the said compositional limits and said diagram are set forth in atomic percentages; and when $n$ is 1, and $r$ is 1, and $k$ is 0, and $m$ is 1 or 0, and Q is present, and molybdenum is the substituent, it replaces tungsten as follows:

wherein from 0 up to the maximum amount of tungsten, but never more than the tungsten content of said composition is replaced by the substituent molybdenum;

when $n$ is 0, and $m$ is 1, and $k$ is 1, and $r$ is 1 or 0, and Z is present, as a substituent, it replaces niobium as follows:

from 0 up to 20 At. % of the niobium present in said composition, but never more than the niobium content of said composition, is replaced by a Z substituent member selected from the group consisting of Ti, Zr, and Hf;

from 0 up to the maximum amount of the niobium present in said composition, but never more than the niobium content of said composition, is replaced by a Z substituent member selected from the group consisting of vanadium and tantalum to form substituted carbide-metal compositions from unsubstituted compositions, which unsubstituted composition' niobium content varies from about 15 to about 62 At. percent, whose carbon content various from about 25 to about 44 At. percent, and whose molybdenum content varies from about 5 At. percent to about 55 At. percent;

wherein when said composition has at least part of its niobium content replaced, or at least part of its tungsten content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when the said substituent Z, is titanium, the compositional limits $Ti_{62}W_8C_{30}$, $Ti_{51}W_5C_{44}$ $Ti_{30}W_{26}C_{44}$ and $Ti_{15}W_{55}C_{30}$ for the ternary figure of the Ti—W—C system, and $Nb_{56}W_8C_{36}$, $Nb_{33}W_{31}C_{36}$, $Nb_{25}W_{49}C_{26}$ and $Nb_{52}W_{22}C_{26}$ for the ternary figure of the Nb—W—C system describe the three dimensional volume;

when the said substituent Q is molybdenum, the compositional limits $Nb_{56}W_8C_{36}$, $Nb_{33}W_{31}C_{36}$, $Nb_{25}W_{49}C_{26}$ and $Nb_{62}W_{22}C_{26}$ for the ternary figure of the $$Nb-W-C$$

system and $Nb_{56}Mo_8C_{36}$, $Nb_{36}Mo_{28}C_{36}$, $Nb_{24}Mo_{51}C_{25}$ and $Nb_{55}Mo_{20}C_{25}$ for the ternary fiugre of the $$Nb-Mo-C$$

system describe the three dimensional volume;
the total of the atomic percentages of niobium, tungsten and carbon and the replacements therefore adding up to 100 At. percent.

34. A carbide-metal composition of the elemental formula:

$$Nb_a-(L)_m-W_b-(X)_n-C$$

(a) wherein $a$, $m$, $n$, and $b$ are each 1 or 0, and $a+m$ is either 1 or 2, $b+n$ is either 1 or 2 and
(b) L is at least one member selected from the group consisting of Ti, Hf, Zr, Cr, V, Ta and mixtures thereof;
(c) wherein when L is Cr alone or in combination with any and all of Ti, Hf, Zr, V and Ta the maximum At. percent attributable to Cr is 5 At. percent;
(d) wherein when L is either Ti, Zr, and Hf and mixtures thereof, in combination with each other, or in further combination with any and all of V, Ta and Cr, the maximum At. percent attributable to Ti, Zr, Hf either alone or in combination with each other is 20 At. percent;
(e) the L content of the composition being within the range of 0 to about 62 At. percent;
(f) X is at least one member selected from the group consisting of Mo, and Cr, and mixtures thereof;
(g) wherein when X is Cr alone or in combination with W, the maximum At. percent attributable to Cr is 5 At. percent;
(h) the X content of the composition being within the range of 0 to about 55 At. percent;
(i) the sum of the contents of the Nb and L constituent(s) being within the range from about 15 to 62 about At. percent;
(j) the sum of the contents of the W and X constituent members being within the range of from about 5 At. percent to about 55 At. percent;
(k) the Nb content of the composition being within the range of 0 to about 62 At. percent;
(l) the W content of the composition being within the range of 0 to about 55 At. percent;
(m) the total Cr content within composition never being more than 5 At. percent;
(n) the carbon content of said composition being from about 25 At. percent to about 44 At. percent;
(o) the total At. percent of the composition $$Nb_a-(L)_m-W_b-(X)_n-C$$

being 100 At. percent.

35. A carbide metal composition of the elemental formula $$Nb_r-(Z)_k-W_m-(Q)_n-C$$

wherein
niobium is present from about 28 At. percent to about 46 At. percent and
tungsten is present from about 21 At. percent to about 43 At. percent
carbon is present from about 29 At. percent to about 33 At. percent
and $n$, $m$, $r$ and $k$ are 1 or 0, $r+k$ is either 1 or 2, $m+n$ is either 1 or 2, $k+n$ is either 1 or 0; Q is molybdenum; Z is one element selected from the group consisting of Ti, Zr, Hf, V, and Ta; said Q element, when present, being substituted at least in part for tungsten in said composition, and said Z element, when present being substituted at least in part for niobium in said composition;
whereby said composition falls, when unsubstituted, and $n$ and $k$ are 0 and $m$ and $r$ are 1, within the boxed-in area bounded by the compositional limits of $Nb_{46}W_{21}C_{33}$, $Nb_{31}W_{36}C_{33}$, $Nb_{28}W_{43}C_{29}$ and $Nb_{44}W_{27}C_{29}$ in a planar, ternary compositional diagram where the subscripts of the said compositional limits and said diagram are set forth in atomic percentages; and when $n$ is 1, and $r$ is 1, and $k$ is 0, and $m$ is 1 or 0, and Q is present, and molybdenum is the substituent, it replaces tungsten as follows:
wherein from 0 up to the maximum amount of tungsten, but never more than the tungsten content of said composition is replaced by the substituent molybdenum;
when $n$ is 0, and $m$ is 1, and $k$ is 1, and $r$ is 1 or 0, and Z is present, as a substituent, it replaces niobium as follows:
from 0 up to 20 At. percent of the niobium present in said composition, but never more than the niobium content of said composition, is replaced by a Z substituent member selected from the group consisting of Ti, Zr, and Hf;
from 0 up to the maximum amount of the niobium present in said composition, but never more than the niobium content of said composition, is replaced by a Z substituent member selected from the group consisting of vanadium and tantalum to form substituted carbide-metal compositions from unsubstituted compositions, which unsubstituted compositions' niobium content varies from about 26 to about 50 At. percent, whose carbon content varies from about 29 to about 40 At. percent, whose tungsten content varies from about 13.5 At. percent to about 43 At. percent;
wherein when said composition has at least part of its niobium content replaced, or at least part of its tungsten content replaced, the substituted compositional volume generated by the three dimensional joining of all of the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:
when the said substituent Z, is titanium, the compositional limits $Ti_{46.5}W_{13.5}C_{40}$, $Ti_{29}W_{31}C_{40}$, $Ti_{26}W_{39}C_{35}$ and $Ti_{50}W_{15}C_{35}$ for the ternary figure of the Ti—W—C system, and $Nb_{46}W_{21}C_{33}$, $Nb_{31}W_{36}C_{33}$, $Nb_{28}W_{43}C_{29}$ and $Nb_{44}W_{27}C_{29}$ for the ternary figure of the Nb—Mo—C system describe the three dimensional volume;
when the said substituent Q is Mo, the compositional limits $Nb_{46}W_{21}C_{33}$, $Nb_{31}W_{36}C_{33}$, $Nb_{28}W_{43}C_{29}$ and $Nb_{44}W_{27}C_{29}$ for the ternary figure of the Nb—W—C system and $Nb_{47}Mo_{19}C_{34}$, $Nb_{37}Mo_{29}C_{34}$, $Nb_{32}Mo_{39}C_{29}$, and $Nb_{46}Mo_{25}C_{29}$ for the ternary figure of the Nb—Mo—C system describe the three dimensional volume;
the total of the atomic percentages of niobium, tungsten and carbon and the replacements therefore adding up to 100 At. percent.

36. A carbide-metal composition of the elemental formula:

$$Nb_a-(L)_m-W_b-(X)_n-C$$

(a) wherein $a$, $m$, $n$, and $b$ are each 1 or 0, and $a+m$ is either 1 or 2, $b+n$ is either 1 or 2 and
(b) L is at least one member selected from the group consisting of Ti, Hf, Zr, Cr, V, Ta and mixtures thereof;
(c) wherein when L is Cr alone or in combination with any and all of Ti, Hf, Zr, V and Ta the maximum At. percent attributable to Cr is 5 At. percent;

(d) wherein when L is either Ti, Zr, and Hf and mixtures thereof, in combination with each other, or in further combination with any and all of V, Ta and Cr, the maximum At. percent attributable to Ti, Zr, Hf either alone or in combination with each other is 20 At. percent;
(e) the L content of the composition being within the range of 0 to about 50 At. percent;
(f) X is at least one member selected from the group consisting of Mo, and Cr, and mixtures thereof;
(g) wherein when X is Cr alone or in combination with Mo, the maximum At. percent attributable to Cr is 5 At. percent;
(h) the X content of the composition being within the range of 0 to about 43 At. percent;
(i) the sum of the contents of the Nb and L constituent(s) being within the range from about 26 to about 50 At. percent;
(j) the sum of the contents of the W and X constituent members being within the range of from about 13.5 At. percent to about 43 At. percent;
(k) the Nb content of the composition being within the range of 0 to about 50 At. percent;
(l) the W content of the composition being within the range of 0 to about 43 At. percent;
(m) the total Cr content within said composition never being more than 5 At. percent;
(n) the carbon content of said composition being from about 29 At. percent to about 40 At. percent;
(o) the total At. percent of the composition $$Nb_a—(L)_m—W_b—(X)_n—C$$

being 100 At. percent.

37. A carbide-metal composition of the elemental formula $$Ti_r—(Z)_k—W_m—(Q)_n—C$$

wherein
titanium is present from about 15 At. percent to about 62 At. percent
tungsten is present from about 5 At. percent to about 55 At. percent
carbon is present from about 30 At. percent to about 44 At. percent and $n$, $m$, $r$ and $k$ are 1 or 0, $r+k$ is either 1 or 2, $m+n$ is either 1 or 2, $k+n$ is either 1 or 0, and Q is one element selected from the group consisting of V, Nb, Ta, and Mo; said Q element, when present, being substituted at least in part for tungsten in said composition; Z is one element selected from the group consisting of Zr, Hf, V, Nb, Ta, said Z element, when present, being substituted at least in part for titanium in said composition;
whereby said composition falls, when unsubstituted, and $n$ and $k$ are 0, and $m$ and $r$ are 1 within the boxed-in area bounded by the compositional limits of $Ti_{62}W_8C_{30}$, $Ti_{51}W_5C_{44}$, $Ti_{30}W_{26}C_{44}$ and $Ti_{15}W_{55}C_{30}$ in a planar, ternary compositional diagram where the subscripts of the said compositional limits and said diagram are set forth in atomic percentages; and
when $n$ is 1, and $r$ is 1, and $k$ is 0. and $m$ is 1 or 0, and Q is present as a substituent selected from among V, Nb, Ta, and Mo it replaces tungsten as follows:
from 0 up to the maximum amount of tungsten present in said composition is replaced by a substituent member selected from the group consisting of niobium, tantalum, vanadium and molybdenum;
when $n$ is 0, and $m$ is 1, and $k$ is 1, and $r$ is 1 or 0, and Z is present as a substituent member selected from among Zr, Hf, V, Nb, and Ta, it replaces titanium as follows:
wherein from 0 up to 20 At. percent of titanium, but never more than the titanium content of said composition is replaced by a substituent member selected from the group consisting of niobium, tantalum and vanadium;
from 0 up to the maximum amount of titanium present in said composition, but never more than the titanium content of said composition, is replaced by a substituent member selected from the group consisting of zirconium and hafnium,
to form substituted carbide-metal compositions from unsubstituted compositions, which unsubstituted compositions' titanium content varies from about 11 to about 64 At. percent, whose carbon content varies from about 23 to about 44 At. percent, and whose tungsten content varies from about 5 At. percent to about 66 At. percent;
and wherein when said composition has at least part of its titanium content or at least part of its tungsten content replaced, the substituted composition lies within the compositional volume generated by the three dimensional joining of all the individual boxed-in areas of the respective ternary figures, which figures depicts the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:
when the said substituent, Q, is Nb, and is substituted for tungsten, the compositional limits $Ti_{55}Nb_7C_{38}$, $Ti_{15}Nb_{47}C_{38}$, $Ti_{11}Nb_{66}C_{23}$
and $$Ti_{55}Nb_{22}C_{23}$$

for the ternary figure of the Ti—Nb—C system, and $Ti_{62}W_8C_{30}$, $Ti_{51}W_5C_{44}$, $Ti_{30}W_{26}C_{44}$ and $Ti_{15}W_{55}C_{30}$ for the ternary figure of the Ti—W—C system describe the three dimensional volume;
when the said substituent, Q, is Ta and is substituted for tungsten, the compositional limits $Ti_{60}Ta_5C_{35}$, $$Ti_{50}Ta_{15}C_{35}$$

$Ti_{38}Ta_{39}C_{23}$ and $Ti_{60}Ta_{17}C_{23}$ for the ternary figure of the Ti—Ta—C system and $Ti_{62}W_8C_{30}$, $Ti_{51}W_5C_{44}$, $Ti_{30}W_{26}C_{44}$ and $Ti_{15}W_{55}C_{30}$ for the ternary figure of the Ti—W—C system describe the three dimensional volume;
when the said substituent, Q, is molybdenum, and is substituted for tungsten, the compositional limits $Ti_{57}Mo_5C_{38}$, $Ti_{39}Mo_{23}C_{38}$, $Ti_{29}Mo_{46}C_{25}$,
and $$Ti_{64}Mo_{11}C_{25}$$

from the ternary figure of the Ti—Mo—C system and $Ti_{62}W_8C_{30}$, $Ti_{51}W_5C_{44}$, $Ti_{30}W_{26}C_{44}$
and
$Ti_{15}W_{55}C_{30}$ for the ternary figure of the Ti—W—C system describe the three dimensional volume;
when the said substituent, Q, is V, and is substituted for tungsten, the compositional limits $Ti_{62}W_8C_{30}$, $Ti_{51}W_5C_{44}$, $Ti_{30}W_{26}C_{44}$ and $Ti_{15}W_{55}C_{30}$ for the ternary figure of the Ti—W—C system and $Ti_{57}V_6C_{37}$, $$Ti_{36}V_{24}C_{37}$$

$Ti_{24.5}V_{51.5}C_{24}$ and $Ti_{60}V_{16}C_{24}$ for the ternary figure of the Ti—V—C system describe the three dimensional volume;
when the said substituent, Z, is Nb and is substituted for Ti, the compositional limits $Ti_{62}W_8C_{30}$, $Ti_{51}W_5C_{44}$, $Ti_{30}W_{26}C_{44}$ and $T_{15}W_{55}C_{30}$ for the ternary figure of the Ti—W—C system and $Nb_{56}W_8C_{36}$, $Nb_{33}W_{31}C_{36}$, $Nb_{25}W_{49}C_{26}$, and $Nb_{52}W_{22}C_{26}$ for the ternary figure of the Nb—W—C system describe the three dimensional volume;
the total of the atomic percentages of titanium, tungsten and carbon and the replacements therefor adding up to 100 At. percent.

38. A carbide-metal composition of the elemental formula:

$$Ti_a—(L)_m—W_b—(X)_n—C$$

(a) wherein $a$, $m$, $n$, and $b$ are each 1 or 0, and $a+m$ is either 1 or 2, $b+n$ is either 1 or 2 and
(b) L is at least one member selected from the group consisting of Hf, Zr, Cr, V, Ta, Nb and mixtures thereof;
(c) wherein when L is Cr alone or in combination with any and all of Hf, Zr, V, Nb, and Ta, the maximum At. percent attributable to Cr is 5 At. percent;
(d) wherein when L is either V, Nb, and Ta and mixtures thereof, in combination with each other, or in further combination with any and all of Zr, Hf, and Cr, the maximum At. percent attributable to V, Nb and Ta, either alone or in combination with each other, is 20 At. percent.
(e) the L content of the composition being within the range of 0 to 64 At. percent;
(f) X is at least one member selected from the group consisting of V, Nb, Ta, Mo and Cr, and mixtures thereof;
(g) wherein when X is Cr alone or in combination with V, Nb, Ta, and Mo, the maximum At. percent attributable to Cr is 5 At. percent;
(h) the X content of the composition being within the range of 0 to 66 At. percent:
(i) the sum of the contents of the Ti and L constituent(s) being within the range from 11 to 64 At. percent;
(j) the sum of the contents of the tungsten and X constituent members being 5 to 66 At. percent;
(k) the titanium content of the composition being within the range of 0 to 64 At. percent;
(l) the tungsten content of the composition being within the range of 0 to 66 At. percent;
(m) the total Cr content within said composition never being more than 5 At. percent;
(n) the carbon content of said composition being from about 23 At. percent to about 44 At. percent;
(o) the total At. percent of the composition $$Ti_a—(L)_m—W_b—(X)_n—C$$

being 100 At. percent.

39. A carbide-metal composition of the elemental formula $$Ti_r—(Z)_k—W_m—(Q)_n—C$$

wherein
titanium is present from about 26 At. percent to about 50 At. percent
tungsten is present from about 13.5 At. percent to about 39 At. percent
carbon is present from about 35 At. percent to about 40 At. percent and $n$, $m$, $r$ and $k$ are 1 or 0, $r+k$ is either 1 or 2, $m+n$ is either 1 or 2, $k+n$ is either 1 or 0, and Q is one element selected from the group consisting of V, Nb, Ta, and Mo; said Q element, when present, being substituted at least in part for tungsten in said composition; Z is one element selected from the group consisting of Zr, Hf, V, Nb, Ta, said Z element, when present, being substituted at least in part for titanium in said composition;
whereby said composition falls, when unsubstituted, and $n$ and $k$ are 0, and $m$ and $r$ are 1, within the boxed-in area bounded by the compositional limits of $Ti_{46.5}W_{13.5}C_{40}$, $Ti_{29}W_{31}C_{40}$, $Ti_{26}W_{39}C_{35}$ and $Ti_{50}W_{15}C_{35}$ in a planar, ternary compositional diagram where the subscripts of the said compositional limits and said diagram are set forth in atomic percentages; and
when $n$ is 1, and $r$ is 1, and $k$ is 0, and $m$ is 1 or 0, and Q is present as a substituent selected from among V, Nb, Ta, and Mo, it replaces tungsten as follows:
from 0 up to the maximum amount of tungsten present in said composition is replaced by a substituent member selected from the group consisting of niobium, tantalum, vanadium and molybdenum;
when $n$ is 0, and $m$ is 1, and $k$ is 1, and $r$ is 1 or 0, and Z is present as a substituent member selected from among Zr, Hf, V, Nb, and Ta, it replaces titanium as follows:
wherein from 0 up to 20 At. percent of titanium, but never more than the titanium content of said composition is replaced by a substituent member selected from the group consisting of niobium, tantalum and vanadium;
from 0 up to the maximum amount of titanium present in said composition, but never more than the titanium content of said composition, is replaced by a substituent member selected from the group consisting of zirconium and hafnium,
to form substituted carbide-metal compositions from unsubstituted compositions, which unsubstituted compositions' titanium content varies from about 26 to about 59 At. percent, whose carbon content varies from about 28 to about 40 At. percent, and whose tungsten content varies from about 9 At. percent to about 43 At. percent;
and wherein when said composition has at least part of its titanium content or at least part of its tungsten content replaced, the substituted composition lies within the compositional volume generated by the three dimensional joining of all the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:
when the said substituent, Q, is Nb, and is substituted for tungsten, the compositional limits $Ti_{52}Nb_{14}C_{34}$, $Ti_{34.5}Nb_{31.5}C_{34}$, $Ti_{30}Nb_{41}C_{29}$ and $Ti_{51}Nb_{20}C_{29}$ for the ternary figure of the Ti—Nb—C system, and $Ti_{46.5}W_{13.5}C_{40}$, $Ti_{29}W_{31}C_{40}$, $Ti_{26}W_{39}C_{35}$ and $Ti_{50}W_{15}C_{35}$ for the ternary figure of the Ti—W—C system describe the three dimensional volume;
when the said substituent, Q, is Ta and is substituted for tungsten, the compositional limits $Ti_{55}Ta_{13}C_{32}$, $Ti_{47}Ta_{21}C_{32}$, $Ti_{43}Ta_{29}C_{28}$ and $Ti_{55}Ta_{17}C_{28}$ for the ternary figure of the Ti—Ta—C system and $Ti_{46.5}W_{13.5}C_{40}$, $Ti_{29}W_{31}C_{40}$, $Ti_{26}W_{39}C_{35}$ and $Ti_{50}W_{15}C_{35}$ for the ternary figure of the Ti—W—C system describe the three dimensional volume;
when the said substituent, Q, is molybdenum, and is substituted for tungsten, the compositional limits $Ti_{56}Mo_9C_{35}$, $Ti_{43}Mo_{22}C_{35}$, $Ti_{40}Mo_{30}C_{30}$, and $Ti_{59}Mo_{11}C_{30}$ for the ternary figure of the Ti—Mo—C system and $Ti_{46.5}W_{13.5}C_{40}$, $Ti_{29}W_{31}C_{40}$, $Ti_{26}W_{39}C_{35}$ and $Ti_{50}W_{15}C_{35}$ for the ternary figure of the Ti—W—C system describe the three dimensional volume;
when the said substituent, Q, is V, and is substituted for tungsten, the compositional limits $Ti_{46.5}W_{13.5}C_{40}$, $Ti_{29}W_{31}C_{40}$, $Ti_{26}W_{39}C_{35}$ and $Ti_{50}W_{15}C_{35}$ for the ternary figure of the Ti—W—C system and $Ti_{54}V_{11}C_{35}$, $Ti_{34.5}V_{30.5}C_{35}$, $Ti_{30}V_{40}C_{30}$ and $Ti_{55}V_{15}C_{30}$ for the ternary figure of the Ti—V—C system describe the three dimensional volume;
when the said substituent, Z, is Nb and is substituted for Ti, the compositional limits $Ti_{46.5}W_{13.5}C_{40}$, $Ti_{29}W_{31}C_{40}$, $Ti_{26}W_{39}C_{35}$ and $Ti_{50}W_{15}C_{35}$ for the ternary figure of the Ti—W—C system and $Nb_{46}W_{21}C_{33}$, $Nb_{31}W_{36}C_{33}$, $Nb_{28}W_{43}C_{29}$, and $Nb_{44}W_{27}C_{29}$ for the ternary figure of the Nb—W—C system describe the three dimensional volume;
the total of the atomic percentages of titanium, tungsten and carbon and the replacements therefore adding up to 100 At. percent.

40. A carbide-metal composition of the elemental formula:

$$Ti_a-(L)_m-W_b-(X)_n-C$$

(a) wherein a, m, n, and b are each 1 or 0, and a+m is either 1 or 2, b+n is either 1 or 2 and
(b) L is at least one member selected from the group consisting of Hf, Zr, Cr, V, Ta, Nb and mixtures thereof;
(c) wherein when L is Cr alone or in combination with any and all of Hf, Zr, V, Nb, and Ta, the maximum At. percent attributable to Cr is 5 At. percent;
(d) wherein when L is either V, Nb, and Ta and mixtures thereof, in combination with each other, or in further combination with any and all of Zr, Hf, and Cr, the maximum At. percent attributable to V, Nb and Ta, either alone or in combination with each other, is 20 At. percent;
(e) the L content of the composition being within the range of 0 to 59 At. percent;
(f) X is at least one member selected from the group consisting of V, Nb, Ta, Mo and Cr, and mixtures thereof;
(g) wherein when X is Cr alone or in combination with V, Nb, Ta, and Mo the maximum At. percent attributable to Cr is 5 At. percent;
(h) the X content of the composition being within the range of 0 to 43 At. percent;
(i) the sum of the contents of the Ti and L constituent(s) being within the range from 26 to 59 At. percent;
(j) the sum of the contents of the tungsten and X constituent members being 9 to 43 At. percent;
(k) the titanium content of the composition being within the range of 0 to 59 At. percent;
(l) the tungsten content of the composition being within the range of 0 to 43 At. percent;
(m) the total Cr content within said composition never being more than 5 At. percent;
(n) the carbon content of said composition being from about 28 At. percent to about 40 At. percent;
(o) the total At. percent of the composition $$Ti_a-(L)_m-W_b-(X)_n-C$$

being 100 At. percent.

41. A carbide-metal composition of the elemental formula $$Ti_r-(Z)_k-Mo_m-(Q)_n-C$$

wherein
titanium is present from about 29 At. percent to about 64 At. percent
molybdenum is present from about 5 At. percent to about 46 At. percent
carbon is present from about 25 At. percent to about 38 At. percent and n, m, r and k are 1 or 0, r+k is either 1 or 2, m+n is either 1 or 2, k+n is either 1 or 0, and Q is one element selected from the group consisting of V, Nb, Ta, and Mo said Q element, when present, being substituted at least in part for Mo in said composition; Z is one element selected from the group consisting of Zr, Hf, V, Nb, Ta, said Z element, when present, being substituted at least in part for titanium in said composition;
whereby said composition falls, when unsubstituted, and n and k are 0, and m and r are 1 within the boxed-in area bounded by the compositional limits of $Ti_{57}Mo_5C_{38}$, $Ti_{39}Mo_{23}C_{38}$, $Ti_{29}Mo_{46}C_{25}$ and $Ti_{64}Mo_{11}C_{25}$ in a planar, ternary compositional diagram where the subscripts of the said compositional limits and said diagram are set forth in atomic percentages; and when n is 1, and r is 1, and k is 0, and m is 1 or 0 and Q is present as a substituent selected from among V, Nb, Ta, and W it replaces Mo as follows:

from 0 up to the maximum amount of Mo present in said composition is replaced by a substituent member selected from the group consisting of niobium, tantalum, vanadium and W;

when n is 0, and m is 1, and k is 1, and r is 1 or 0, and Z is present as a substituent member selected from among Zr, Hf, V, Nb, and Ta, it replaces titanium as follows:

wherein from 0 up to 20 At. percent of titanium, but never more than the titanium content of said composition is replaced by a substituent member selected from the group consisting of niobium, tantalum and vanadium;

from 0 up to the maximum amount of titanium present in said composition, but never more than the titanium content of said composition, is replaced by a substituent member selected from the group consisting of zirconium and hafnium, to form substituted carbide-metal compositions from unsubstituted compositions, which unsubstituted compositions' titanium content varies from about 11 to about 64 At. percent, whose carbon content varies from about 23 to about 44 At. percent, and whose Mo content varies from about 5 At. percent to about 66 At. percent;

and wherein when said composition has at least part of its titanium content or at least part of its Mo content replaced, the substituted composition lies within the compositional volume generated by the three dimensional joining of all the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when the said substituent, Q, is Nb, and is substituted for Mo, the compositional limits $Ti_{55}Nb_7C_{38}$, $Ti_{15}Nb_{47}C_{23}$, $Ti_{11}Nb_{66}C_{23}$ and $Ti_{55}Nb_{22}C_{23}$ for the ternary figure of the Ti—Nb—C system, and $Ti_{57}Mo_5C_{38}$, $Ti_{39}Mo_{23}C_{38}$, $Ti_{29}Mo_{46}C_{25}$ and $$Ti_{64}Mo_{11}C_{25}$$

for the ternary figure of the Ti—Mo—C system describe the three dimensional volume;

when the said substituent, Q, is Ta and is substituted for Mo, the compositional limits $Ti_{60}Ta_5C_{35}$, $Ti_{50}Ta_{15}C_{35}$, $Ti_{38}Ta_{39}C_{23}$ and $Ti_{60}Ta_{17}C_{23}$ for the ternary figure of the Ti—Ta—C system and $Ti_{57}Mo_5C_{38}$, $Ti_{39}Mo_{23}C_{38}$, $Ti_{29}Mo_{46}C_{25}$ and $Ti_{64}Mo_{11}C_{25}$ for the ternary figure of the Ti—Mo—C system describe the three dimensional volume;

when the said substituent, Q, is W and is substituted for Mo, the compositional limits $Ti_{57}Mo_5C_{38}$, $Ti_{39}Mo_{23}C_{38}$, $Ti_{29}Mo_{46}C_{25}$, and $Ti_{64}Mo_{11}C_{25}$ for the ternary figure of the Ti—Mo—C system and $Ti_{62}W_8C_{30}$, $Ti_{51}W_5C_{44}$, $Ti_{30}W_{26}C_{44}$ and $Ti_{15}W_{55}C_{30}$ for the ternary figure of the Ti—W—C system describe the three dimensional volume;

when the said substituent, Q, is V, and is substituted for Mo, the compositional limits $Ti_{57}Mo_5C_{38}$, $Ti_{39}Mo_{23}C_{38}$, $Ti_{29}Mo_{46}C_{25}$ and $Ti_{64}Mo_{11}C_{25}$, for the ternary figure of the Ti—Mo—C system and $Ti_{57}V_6C_{37}$, $Ti_{36}V_{24}C_{37}$, $Ti_{24.5}V_{51.5}C_{24}$ and $Ti_{60}V_{16}C_{24}$ for the ternary figure of the Ti—V—C system describe the three dimensional volume;

when the said substituent, Z, is Nb and is substituted for Ti, the compositional limits $Ti_{57}Mo_5C_{38}$, $Ti_{39}Mo_{23}C_{38}$, $Ti_{29}Mo_{46}C_{25}$ and $Ti_{64}Mo_{11}C_{25}$ for the ternary figure of the Ti—Mo—C system and $Nb_{56}Mo_8C_{36}$, $Nb_{36}Mo_{28}C_{36}$, $Nb_{24}Mo_{51}C_{25}$, and $Nb_{55}Mo_{20}C_{25}$ for the ternary figure of the Nb—Mo—C system describe the three dimensional volume;

the total of the atomic percentages of titanium, molybdenum and carbon and the replacements therefore adding up to 100 At. percent.

42. A carbide-metal composition of the elemental formula:

$$Ti_a—(L)_m—Mo_b—(X)_n—C$$

(a) wherein $a$, $m$, $n$, and $b$ are each 1 or 0, and $a+m$ is either 1 or 2, $b+n$ is either 1 or 2 and (b) L is at least one member selected from the group consisting of Hf, Zr, Cr, V, Ta, Nb and mixtures thereof;

(c) wherein when L is Cr alone or in combination with any and all of Hf, Zr, V, Nb, and Ta, the maximum At. percent attributable to Cr is 5 At. percent;

(d) wherein when L is either V, Nb, and Ta and mixtures thereof, in 64 At. percent; combination with each other, or in further combination with any and all of Zr, Hf, and Cr, the maximum At. percent attributable to V, Nb and Ta, either alone or in combination with each other, is 20 At. percent.

(e) the L content of the composition being within the range of 0 to 64 At. percent;

(f) X is at least one member selected from the group consisting of V, Nb, Ta, W and Cr, and mixtures thereof;

(g) wherein when X is Cr alone or in combination with V, Nb, Ta, and W the maximum At. percent attributable to Cr is 5 At. percent;

(h) the X content of the composition being within the range of 0 to 66 At. percent;

(i) the sum of the contents of the Ti and L constituent(s) being within the range from 11 to 64 At. percent;

(j) the sum of the contents of the Mo and X constituent members being 5 to 66 At. percent;

(k) the titanium content of the composition being within the range of 0 to 64 At. percent;

(l) the Mo content of the composition being within the range of 0 to 66 At. percent;

(m) the total Cr content within said composition never being more than 5 At. percent;

(n) the carbon content of said composition being from about 23 At. percent to about 44 At. percent;

(o) the total At. percent of the composition $$Ti_a—(L)_m—Mo_b—(X)_n—C$$

being 100 At. percent.

43. A carbide-metal composition of the elemental formula $$Ti_r—(Z)_k—Mo_m—(Q)_n—C$$

wherein titanium is present from about 40 At. percent to about 59 At. percent molybdenum is present from about 9 At. percent to about 30 At. percent carbon is present from about 30 At. percent to about 35 At. percent and $n$, $m$, $r$ and $k$ are 1 or 0, $r+k$ is either 1 or 2, $m+n$ is either 1 or 2, $k+n$ is either 1 or 0, and Q is one element selected from the group consisting of V, Nb, Ta, and W said Q element, when present, being substituted at least in part for Mo in said composition; Z is one element selected from the group consisting of Zr, Hf, V, Nb, Ta, said Z element, when present, being substituted at least in part for titanium in said composition;

whereby said composition falls, when unsubstituted, and $n$ and $k$ are 0, and $m$ and $r$ are 1 within the boxed-in area bounded by the compositional limits of $Ti_{56}Mo_9C_{35}$, $Ti_{43}Mo_{22}C_{35}$, $Ti_{40}Mo_{30}C_{30}$ and $Ti_{59}Mo_{11}C_{30}$ in a planar, ternary compositional diagram where the subscripts of the said compositional limits and said diagram are set forth in atomic percentages; and when $n$ is 1, and $r$ is 1, and $k$ is 0, and $m$ is 1 or 0, and Q is present as a substituent selected from among V, Nb, Ta, and W it replaces Mo as follows:

from 0 up to the maximum amount of Mo present in said composition is replaced by a substituent member selected from the group consisting of niobium, tantalum, vanadium and W;

when $n$ is 0, and $m$ is 1, and $k$ is 1, and $r$ is 1 or 0, and Z is present as a substituent member selected from among Zr, Hf, V, Nb, and Ta, it replaces titanium as follows:

wherein from 0 up to 20 At. percent of titanium, but never more than the titanium content of said composition is replaced by a substituent member selected from the group consisting of niobium, tantalum and vanadium;

from 0 up to the maximum amount of titanium present in said composition, but never more than the titanium content of said composition, is replaced by a substituent member selected from the group consisting of zirconium and hafnium, to form substituted carbide-metal compositions from unsubstituted compositions, which unsubstituted compositions' titanium content varies from about 26 to about 59 At. percent, whose carbon content varies from about 28 to about 40 At. percent, and whose Mo content varies from about 9 At. percent to about 41 At. percent;

and wherein when said composition has at least part of its titanium content or at least part of its Mo content replaced, the substituted composition lies within the compositional volume generated by the three dimensional joining of all the individual boxed-in areas of the respective ternary figures, which figures depict the ternary systems which result from the complete replacement of each component of said composition so replaced, by the said substituent if each of the replacements made were the sole replacement to said composition, said boxed-in areas, joined to generate the three dimensional volume, are bounded by the compositional limits for the respective ternary figures as follows:

when the said substituent, Q, is Nb, and is substituted for Mo, the compositional limits $Ti_{52}Nb_{14}C_{34}$, $Ti_{34.5}Nb_{31.5}C_{34}$, $Ti_{30}Nb_{41}C_{29}$ and $Ti_{51}Nb_{20}C_{29}$ for the ternary figures of the Ti—Nb—C system, and $Ti_{56}Mo_9C_{35}$, $Ti_{43}Mo_{22}C_{35}$, $Ti_{40}Mo_{30}C_{30}$ and $$Ti_{59}Mo_{11}C_{30}$$

for the ternary figure of the Ti—Mo—C system describe the three dimensional volume;

when the said substituent, Q, is Ta and is substituted for Mo the compositional limits $Ti_{55}Ta_{13}C_{32}$, $Ti_{47}Ta_{21}C_{32}$, $Ti_{43}Ta_{29}C_{28}$ and $Ti_{55}Ta_{17}C_{28}$ for the ternary figure of the Ti—Ta—C system and $$Ti_{56}Mo_9C_{35}$$

$Ti_{43}Mo_{22}C_{35}$, $Ti_{40}Mo_{30}C_{30}$ and $Ti_{59}Mo_{11}C_{30}$ for the ternary figure fo the Ti—Mo—C system describe the three dimensional volume;

when the said substituent, Q, is W, and is substituted for Mo, the compositional limits $Ti_{56}Mo_9C_{35}$, $Ti_{43}Mo_{22}C_{35}$, $Ti_{40}Mo_{30}C_{30}$, and $Ti_{59}Mo_{11}C_{30}$ for the ternary figure of the Ti—Mo—C system and $Ti_{46.5}W_{13.5}C_{40}$, $Ti_{29}W_{31}C_{40}$, $Ti_{26}W_{39}C_{35}$ and $$Ti_{15}W_{55}C_{30}$$

for the ternary figure of the Ti—W—C system describe the three dimensional volume;

When the said substituent, Q, is V, and is substituted for Mo the compositional limits $Ti_{56}Mo_9C_{35}$, $$Ti_{43}Mo_{22}C_{35}$$

$Ti_{40}Mo_{30}C_{30}$ and $Ti_{59}Mo_{11}C_{30}$ for the ternary figure of the Ti—Mo—C system and $Ti_{54}V_{11}C_{35}$, $Ti_{30}V_{40}C_{30}$, $Ti_{34.5}V_{30.5}C_{35}$ and $Ti_{55}V_{15}C_{30}$ for the ternary figure of the Ti—V—C system describe the three dimensional volume;

when the said substituent, Z, is Nb and is substituted for Ti, the compositional limits $Ti_{56}Mo_9C_{35}$, $$Ti_{43}Mo_{22}C_{35}$$

$Ti_{40}Mo_{30}C_{30}$ and $Ti_{59}Mo_{11}C_{30}$ for the ternary figure of the Ti—Mo—C system and $Nb_{47}Mo_{19}C_{34}$, $$Nb_{37}Mo_{29}C_{34}$$

$Nb_{32}Mo_{39}C_{29}$, and $Nb_{46}Mo_{25}C_{29}$ for the ternary figure of the Nb—Mo—C system describe the three dimensional volume;

the total of the atomic percentages of titanium, molybdenum and carbon and the replacements therefore adding up to 100 At. percent.

44. A carbide-metal composition of the elemental formula:

$$Ti_a—(L)_m—Mo_b—(X)_n—C$$

(a) wherein $a$, $m$, $n$, and $b$ are each 1 or 0, and $a+m$ is either 1 or 2, $b+n$ is either 1 or 2 and
(b) L is at least one member selected from the group consisting of Hf, Zr, Cr, V, Ta, Nb and mixtures thereof;
(c) wherein when L is Cr alone or in combination with any and all of Hf, Zr, V, Nb, and Ta, the maximum At. percent attributable to Cr is 5 at At. percent;
(d) wherein when L is either V, Nb, and Ta and mixtures thereof, in combination with each other, or in further combination with any and all of Zr, Hf, and Cr, the maximum At. percent attributable to V, Nb and Ta, either alone or in combination with each other, is 20 At. percent.
(e) the L content of the composition being within the range of 0 to 59 At. percent;
(f) X is at least one member selected from the group consisting of V, Nb, Ta, W and Cr, and mixtures thereof;
(g) wherein when X is Cr alone or in combination with V, Nb, Ta, and W the maximum At. percent attributable to Cr is 5 At. percent;
(h) the X content of the composition being within the range of 0 to 41 At. percent;
(i) the sum of the contests of the Ti and L constituent(s) being within the range from 26 to 59 At. percent;
(j) the sum of the contents of the Mo and X constituent members being 9 to 41 At. percent;
(k) the titanium content of the composition being within the range of 0 to 59 At. percent;
(l) the Mo content of the composition being within the range of 0 to 41 At. percent;
(m) the total Cr content within said composition never being more than 5 At. percent;
(n) the carbon content of said composition being from about 28 At. percent to about 40 At. percent;
(o) the total At. percent of the composition $$Ti_a—(L)_m—Mo_b—(X)_n—C$$

being 100 At. percent.

References Cited
UNITED STATES PATENTS

| | | | |
|---|---|---|---|
| 1,774,849 | 9/1930 | Schroter | 75—176 |
| 2,977,225 | 3/1961 | Wlodek | 75—176 |
| 3,116,145 | 12/1963 | Semchyshen | 75—176 |
| 3,124,452 | 3/1964 | Kraft | 75—135 |
| 3,528,808 | 9/1970 | Lemkey | 75—135 X |
| 3,542,541 | 11/1970 | Lemkey | 75—135 X |
| 3,554,737 | 1/1971 | Foster | 75—134 |

L. DEWAYNE RUTLEDGE, Primary Examiner

J. E. LEGRU, Assistant Examiner

U.S. Cl. X.R.

75—174, 176